United States Patent [19]
Baydar et al.

[11] Patent Number: 5,717,693
[45] Date of Patent: Feb. 10, 1998

[54] SONET PAYLOAD POINTER PROCESSING AND ARCHITECTURE

[75] Inventors: Ertugrul Baydar, Raleigh; William B. Weeber, Apex, both of N.C.

[73] Assignee: Alcatel Network Systems, Inc., Richardson, Tex.

[21] Appl. No.: 176,309

[22] Filed: Jan. 3, 1994

Related U.S. Application Data

[63] Continuation of Ser. No. 886,755, May 21, 1992, abandoned.

[51] Int. Cl.$^6$ .............................. H04J 3/06; H04J 14/08
[52] U.S. Cl. ..................... 370/514; 370/516; 375/372; 359/135
[58] Field of Search ......................... 370/84, 55, 100.1, 370/102, 105.1, 105.4, 110.1, 112, 105.3, 506, 509, 514, 516, 535, 545; 375/114, 118, 365, 362, 371, 372, 354; 359/115, 135

[56] References Cited

U.S. PATENT DOCUMENTS 4,811,340  3/1989  McEachern et al. ............... 370/102
5,113,395  5/1992  Murakami et al. ............... 370/102
5,119,406  6/1992  Kramer ............................ 375/112
5,142,529  8/1992  Parruck et al. ................... 370/84
5,172,376  12/1992  Chopping et al. ............... 370/102

*Primary Examiner*—Hassan Kizou
*Attorney, Agent, or Firm*—Ware, Fressola, Van Der Sluys & Adolphson

[57] ABSTRACT

A SONET network element receives incoming SONET signals with a receive line interface (2) which stores the incoming data in an elastic store at the recovered line rate while a local interface reads the stored data at the local network element rate, which may vary slightly from the recovered line rate, and which adjusts the received pointers according to the difference between the line and local rates or phase, allowing the payload data to "float" with respect to the boundaries of frames containing both payload data and overhead with pointers; an elastic store monitor performs the comparison between the receive payload rate and the local clock by comparing write addresses at the recovered line rate and read addresses at the local network element rate by a subtraction process which causes pointer adjustments to be made in response to the subtracted difference exceeding selected memory limits. A process for carrying out VT/TU and/or STS/STM pointer interpretation and generation is shown.

3 Claims, 47 Drawing Sheets

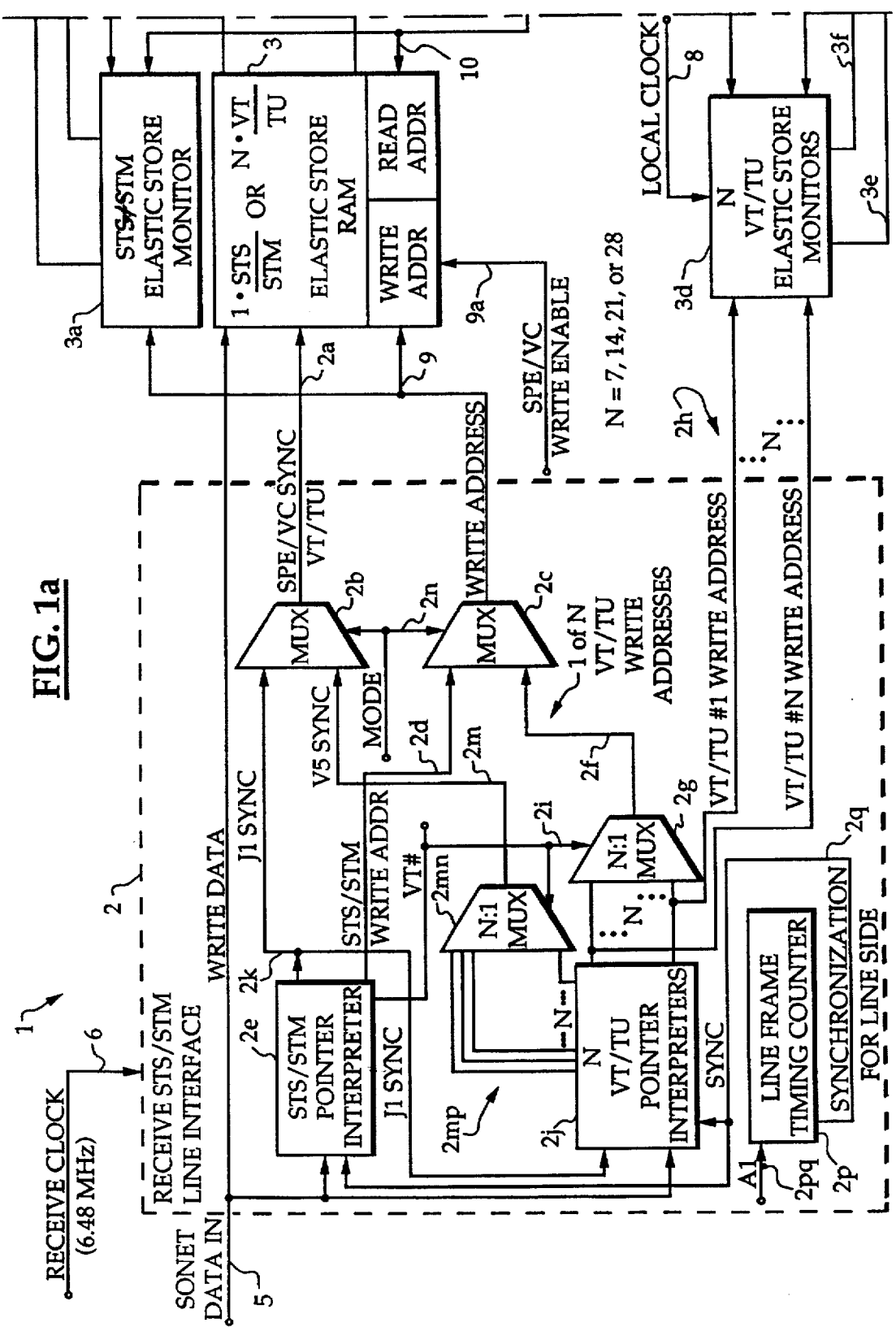

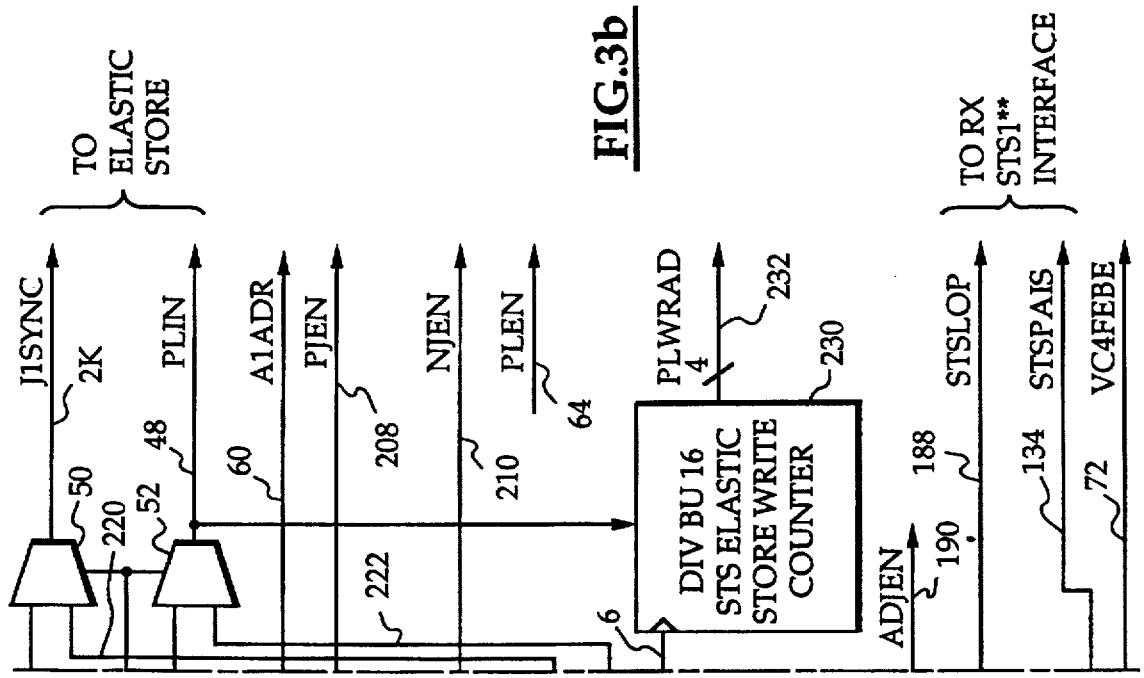

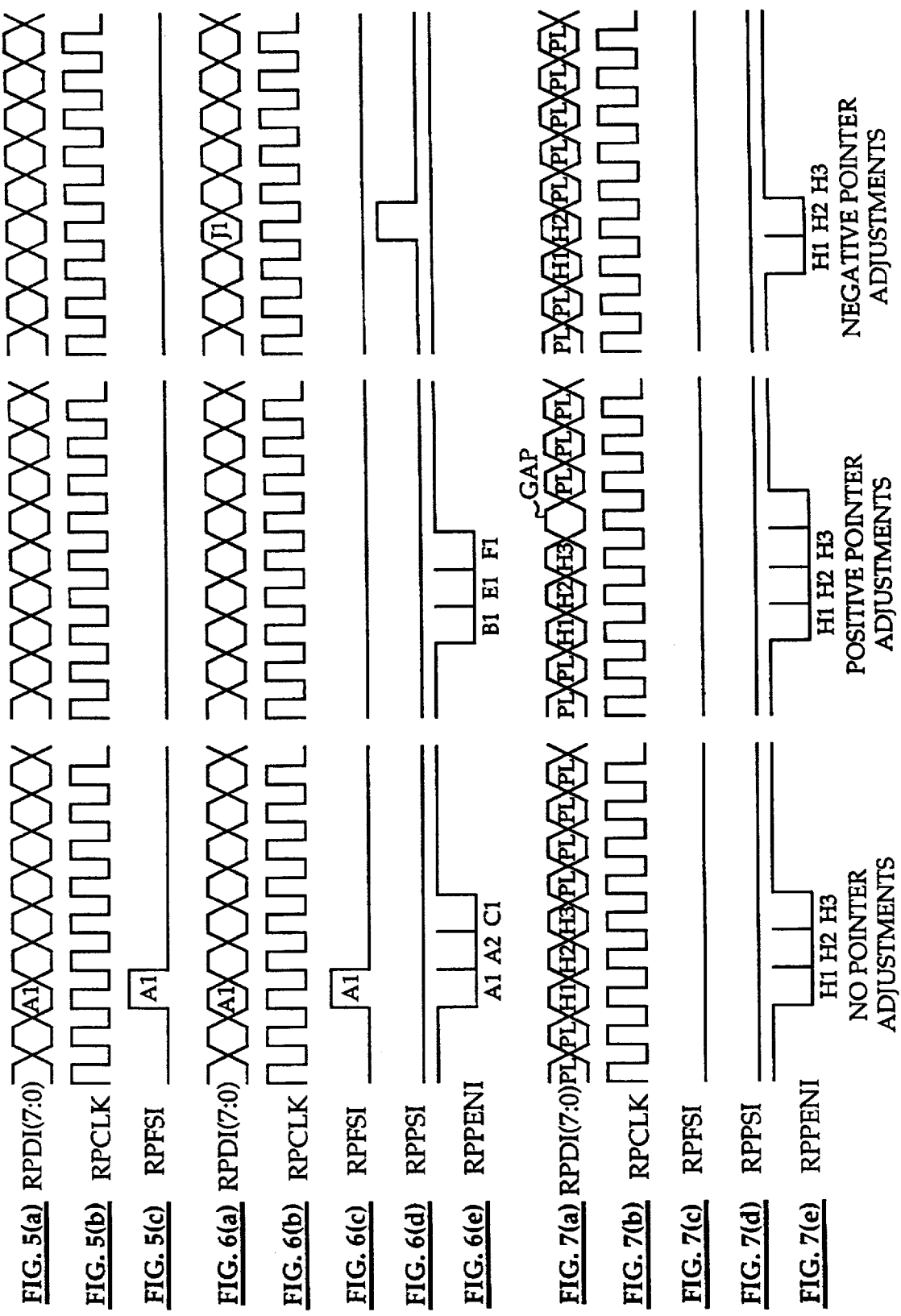

FIG. 9(a)    P1 P1 P1 P1 A1 A1 A1 A1 A1 A1 A1 A1 ... A1 A1 A1 A1 P2 P2 P2 P2 P2 P2 P2 P2 P2 P2 P2 P2 P2
FIG. 9(b) PAIS
FIG. 9(c) LOP

FIG. 10(a)   P1 P1 P1 P1 A1 A1 A1 A1 A1 A1 A1 A1 ... A1 A1 A1 NF P2 P2 P2 P2 P2 P2 P2 P2 P2 P2 P2 P2
FIG. 10(b) PAIS
FIG. 10(c) LOP

FIG. 11(a)   P1 P1 P1 P1 A1 A1 A1 A1 A1 A1 A1 A1 ... A1 A1 A1 P2 P3 P2 P2 P1 P2 P3 P2 P2 P1 P2 P2 P2
FIG. 11(b) PAIS
FIG. 11(c) LOP

FIG. 12(a)   P1 P1 P1 P1 NF NF NF NF NF NF NF NF ... NF NF NF P2 P2 P2 P2 P2 P2 P2 P2 P2 P2 P2 P2 P2
FIG. 12(b) PAIS
FIG. 12(c) LOP

FIG. 13(a)   MATCH
             P1 P1 P1 P1 IP P2 ER P2 IP P3 P3 P3 DP P2 ER DP ER P1 P1 IP P2 P2 IP P3 P3 P3
             1  2  3  4  5  6  7  8  1  2  3  4  5  6  7  8
FIG. 13(b) PAIS
FIG. 13(c) LOP

—IF IN MFLOSS STATE, 4 CONSECUTIVE FRAMES IN SEQUENCE TO GO TO H4SYNC STATE

—IF IN H4SYNC STATE, 4 CUMULATIVE NO MATCHES WITH NO CONSECUTIVE 4 MATCHES TO GO TO MFLOSS STATE

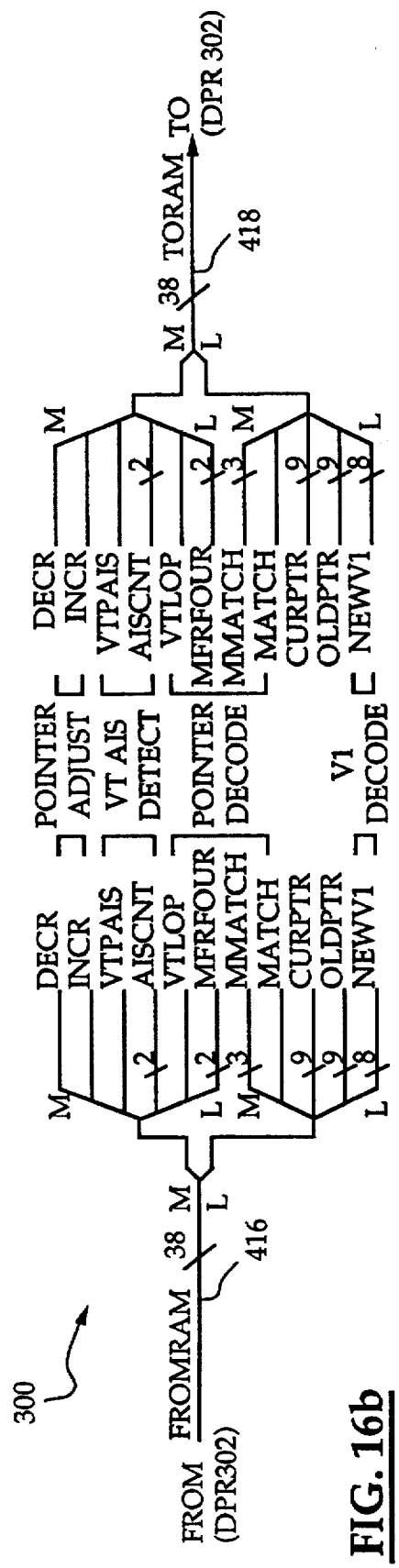

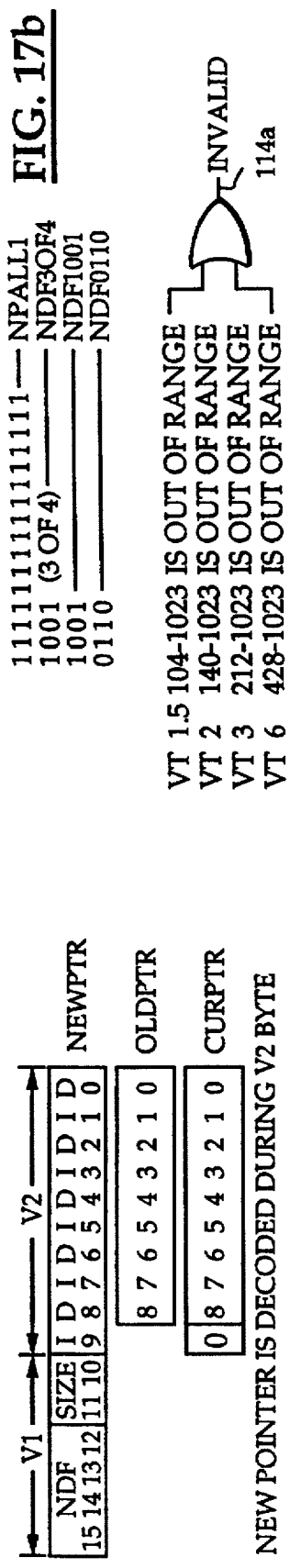

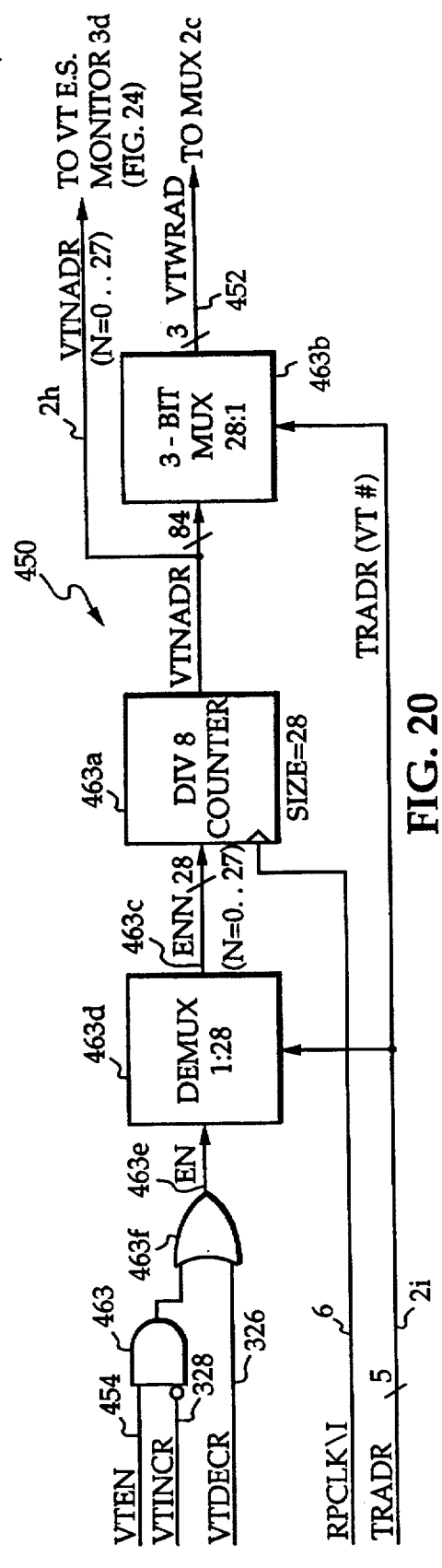
FIG. 20

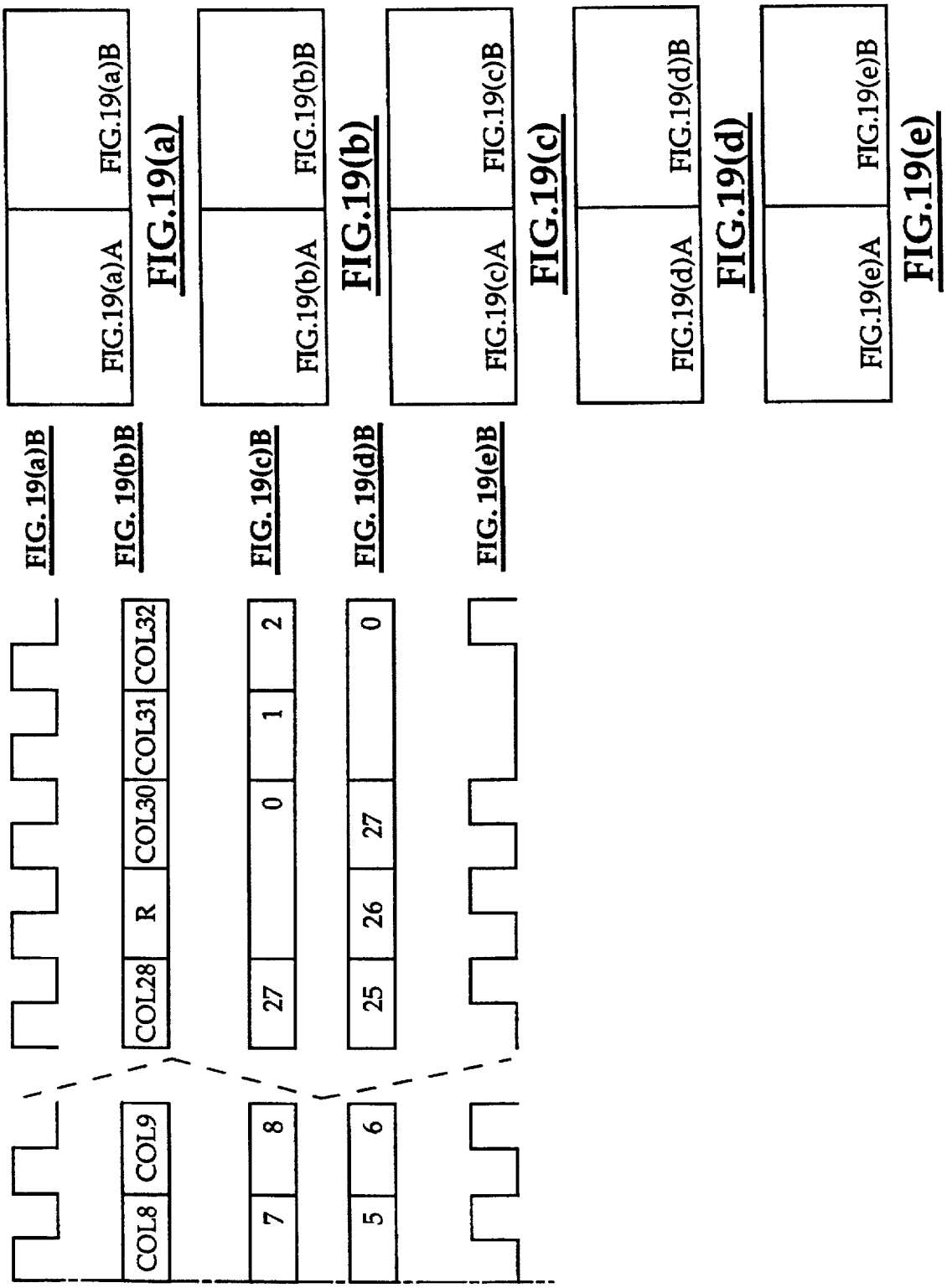

| | 8 | 7 | 6 | 5 | 4 | 3 | 2 | 1 | 0 | BIT NO: | ADDRESS |
|---|---|---|---|---|---|---|---|---|---|---|---|
| VT #0 | V5 SYNC | MSB DATA BIT7 | DATA BIT6 | DATA BIT5 | DATA BIT4 | DATA BIT3 | DATA BIT2 | DATA BIT1 | LSB DATA BIT0 | 0 | VT POINTER PROCESSING MODE ELASTIC STORE 8*28=224 |
| VT #0 | V5 | VT PAYLOAD DATA | | | | | | | | 1 | |
| VT #0 | | | | | | | | | | . | |
| VT #0 | | | | | | | | | | . | |
| VT #0 | V5 | VT PAYLOAD DATA | | | | | | | | 7 | |
| VT #1 | V5 | VT PAYLOAD DATA | | | | | | | | 8 | |
| | | | | | | | | | | . | |
| VT #27 | V5 | VT PAYLOAD DATA | | | | | | | | 223 | |
| SPE | J1 | STS PAYLOAD DATA | | | | | | | | 224 | STS POINTER MODE E.S. |
| . | | | | | | | | | | . | |
| SPE | J1 | STS PAYLOAD DATA | | | | | | | | 239 | |
| | UNUSED RAM DATA | | | | | | | | | 240 ... 255 | NOT USED |

FIG. 22

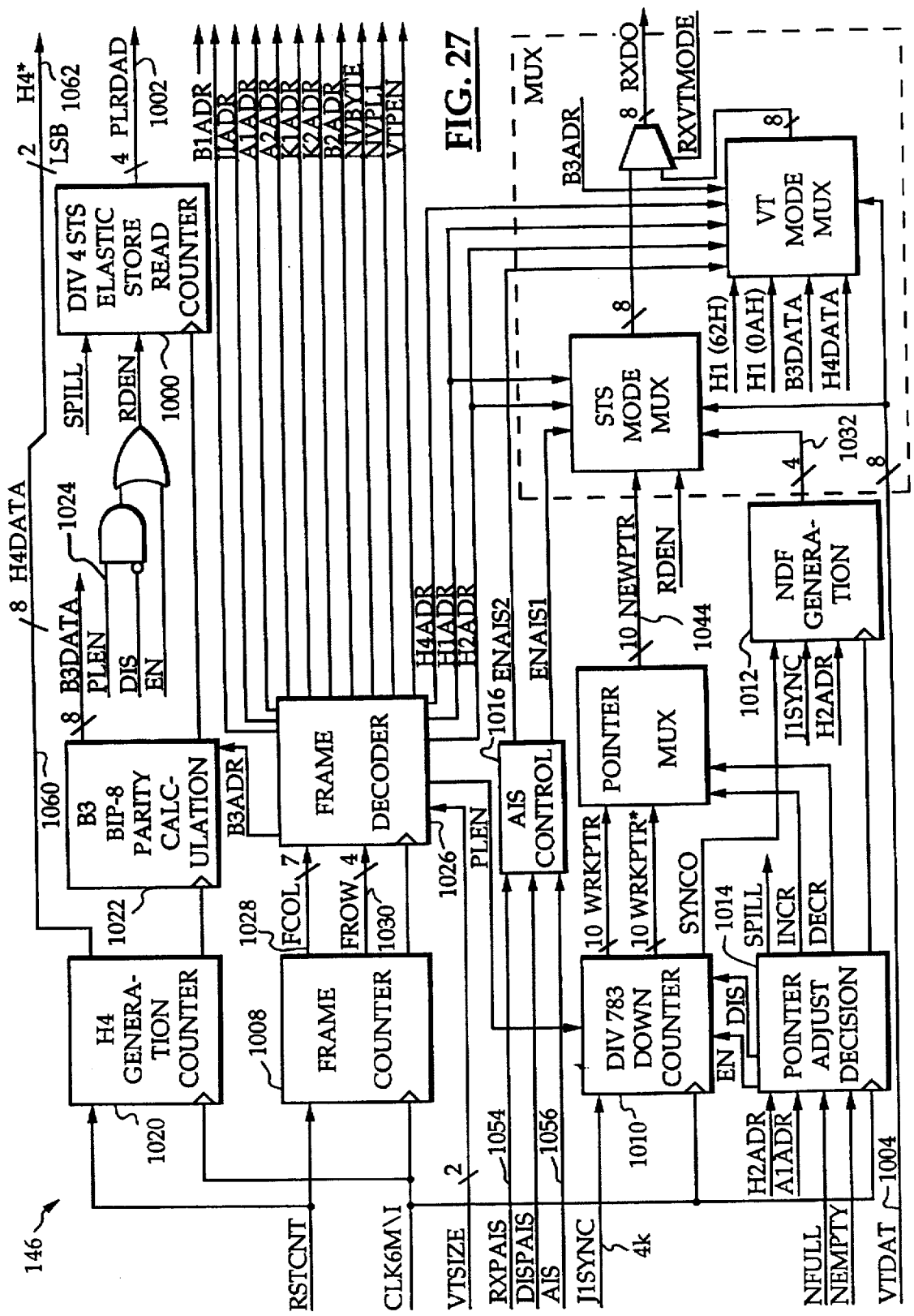

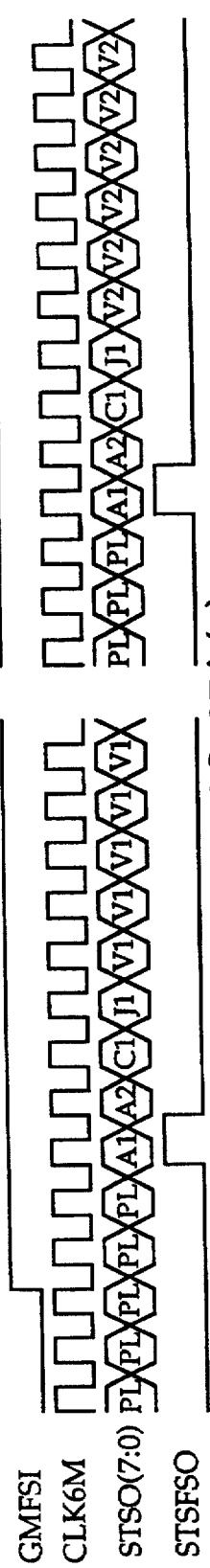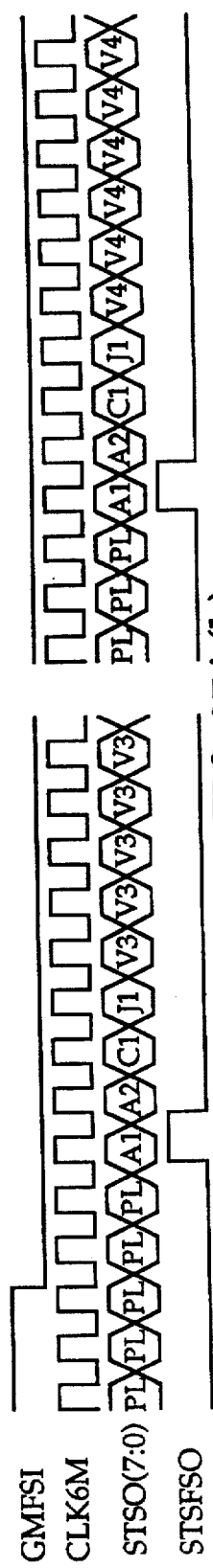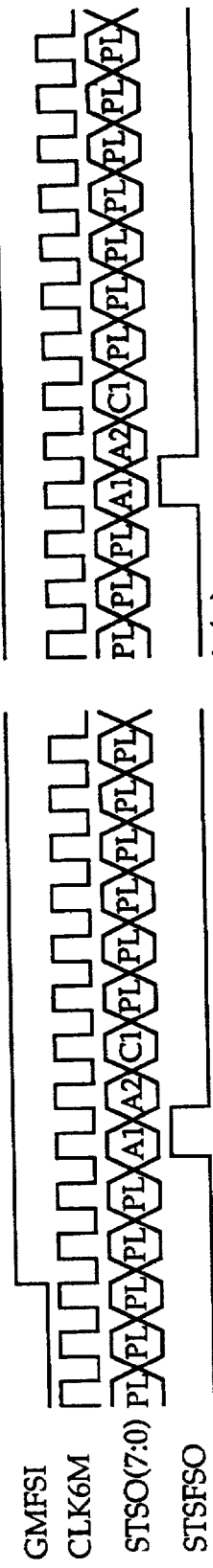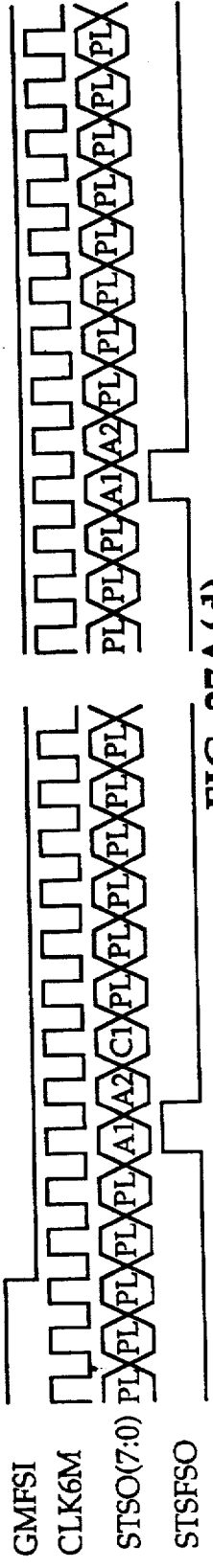
FIG. 27A(a)
FIG. 27A(b)
FIG. 27A(c)
FIG. 27A(d)

FIG. 29

| ROW\COLUMN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | A1 | A2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | B1 | 0 | 0 | B3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 |   | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | H1 | H2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 12 | B2 | K1 | K2 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 13 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 14 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 |   | 0 | 0 | H4 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 16 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 17 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 18 |   | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 19 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 20 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 21 |   | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 22 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 23 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 24 |   | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 25 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 26 |   |   |   | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 30

| ROW\COLUMN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | A1 | A2 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | B1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 12 | B2 | K1 | K2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 13 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 14 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 16 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 17 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 18 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 19 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 20 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 21 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 22 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 23 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 24 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 25 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 26 | | | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

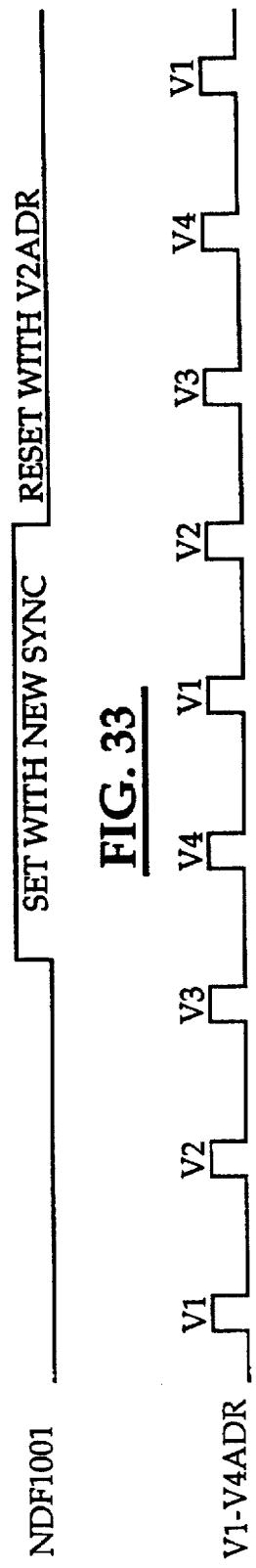
FIG. 33
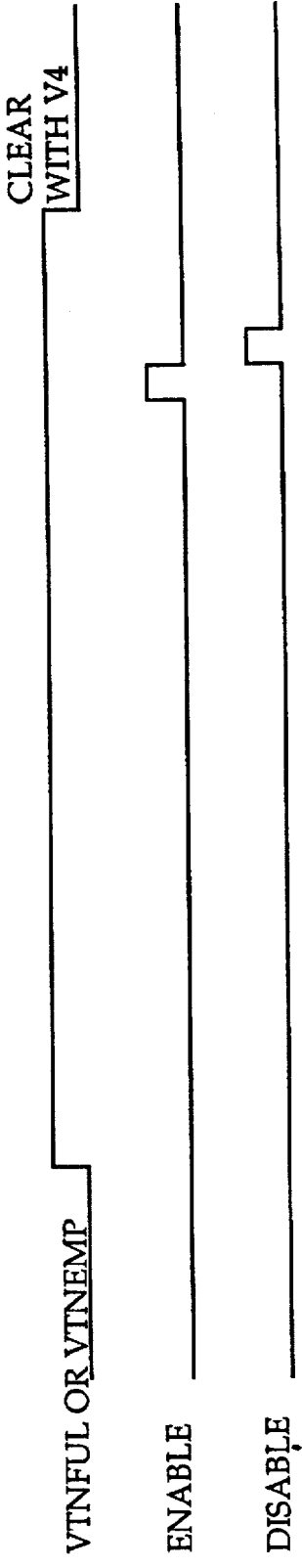
FIG. 34

SONET PAYLOAD POINTER PROCESSING AND ARCHITECTURE

This is continuation of application a Ser. No. 07/886,775 filed on May 21, 1992, now abandoned.

CROSS REFERENCE TO RELATED APPLICATION

This patent specification discloses subject matter which is disclosed and claimed in co-owned patent applications U.S. Ser. Nos. 07/887,348; 07/887,156; 07/886,723; 07/886,724; and 07/886,789 and filed the same date as this application and application U.S. Ser. No. 771,038 filed Oct. 2, 1991 which are hereby incorporated by reference.

TECHNICAL FIELD

This invention relates to telecommunications, and, more particularly, to overhead pointer processing for a synchronous optical network (SONET).

BACKGROUND ART

In SONET specifications, various synchronous transport modules (STM) or signals (STS) are defined at various levels, depending on the standards group applicable in a given country. For example, in the United States there is defined a level 1 (STS-1) signal, a level 3 (STS-3) signal and various other level signals are defined. In Europe and elsewhere, there is no equivalent to level 1 in the United States, but the equivalent to the U.S. level 3 (STS-3) signal is a level 1 (STM-1) signal. These various synchronous optical network signals contain payload pointers which provide a method of allowing flexible and dynamic alignment of the synchronous payload envelope (SPE), so-called in the U.S., or virtual container (VC), as called in Europe, within the envelope or container capacity, independent of the actual contents of the envelope or container.

Dynamic alignment means that the STS or STM respective SPE or VC is allowed to 'float' within the STS/VC envelope capacity/container. Thus, the pointer is able to accommodate differences not only in the phases of the STS/STM SPE/VC and the transport overhead (first three n columns of an STS-N/STM 3N frame), but in the frame rates as well.

Although the remainder of the specification will tend to be disclosed primarily in terms of an embodiment particularly applicable to the SONET standard defined by ANSI in its Standard T1.105-1990 which is hereby incorporated by reference, and in particular to an STS-1 level signal, it should be understood that the principles apply equally as well to other level signals as well as to the signals defined by the CCITT or any other comparable standard.

The STS payload pointer contained in the H1 and H2 bytes of the line overhead designates the location of the payload byte where the STS SPE begins. In other words, the SPE can begin in any byte position within the STS-1 payload envelope. The exact location of the beginning of the SPE (byte J1 of the path overhead) is specified by a pointer in bytes H1 and H2 of the STS line overhead. This means that an SPE typically overlaps two STS-1 frames.

The use of a pointer to define the location of the SPE frame location has two significant advantages. First, SPE frames do not have to be aligned with higher-level multiplex frames. It may be that when first generated, an SPE is aligned with the line overhead at the originating node (i.e., the pointer value is 0). As the frame is carried through a network, however, it arrives at intermediate nodes (e.g., multiplexers or cross-connects) having an arbitrary phase with respect to the outgoing transport framing. If the SPE had to be frame-aligned with the outgoing signal, a full SPE frame of storage and delay would be necessary. Thus, the avoidance of frame alignment allows SPEs on incoming links to be immediately relayed to outgoing links without artificial delay. The location of the SPE in the outgoing payload envelope is specified by setting the H1, H2 pointer to the proper value (0-782).

The second advantage of the pointer approach to framing SPE signals is realized when direct access to sub-channels such as DS1s is desired. Because the pointer provides immediate access to the start of an SPE frame, any other position or timeslot within the SPE is also immediately accessible. This capability should be compared to the procedures required to demultiplex a pre-SONET, asynchronous DS3. In a DS3 signal, there is no relationship between the higher level framing and the lower level DS2 and DS1 framing positions. In essence, two more frame recovery processes are needed to identify a DS0 timeslot. The use of pointers in the SONET architecture eliminates the need for more than one frame recovery process when accessing lower-level signals.

Although it is generally intended that SONET equipment be synchronized to each other or to a common clock, allowances must be made for the interworking of SONET equipment that operates with slightly different clocks. Frequency offsets imply that an SPE may be generated with one clock rate but be carried by a SONET transport running at a different rate. The means of accommodating a frequency offset is to accept variable SPE frame rates using dynamic adjustments in the SPE pointer adjustment. Pointer adjustments allow SPE frames to float with respect to the transport overhead to maintain a nominal level of storage in interface elastic stores.

If there is a frequency offset between the frame rate of the transport overhead and that of the STS SPE, then the pointer value will be incremented or decremented, as needed, accompanied by a corresponding positive or negative stuff byte.

If the frame rate of the STS SPE is too slow with respect to the transport overhead, then the alignment of the envelope must periodically slip back in time, and the pointer must be incremented by 1. This operation is indicated by inverting selected odd bits (I-bits) of the pointer word to allow five-bit majority voting at the receiver. A positive stuff byte appears immediately after the H3 byte in the frame containing inverted I-bits. Subsequent pointers will contain the new offset. Consecutive pointer operations must be separated by at least three frames in which the pointer value remains constant. This implies a very wide tolerance of clock accuracy required for maintaining SPE data, i.e., ±320 ppm. In comparison, a SONET node is specified to maintain a minimum timing accuracy of 20 ppm if it loses its reference.

If the frame rate of the STS SPE is too fast with respect to that of the transport overhead, then the alignment of the envelope must be periodically advanced in time, and the pointer must be decremented by 1. This operation is indicated by inverting selected even bits (D-bits) of the pointer word to allow five-bit majority voting at the receiver. A negative stuff byte appears in the H3 byte in the frame containing the inverted D-bits. Subsequent pointers will contain the new offset.

These positive and negative STS-1 pointer adjustment operations are illustrated in FIGS. 34 and 35 of the above-referenced ANSI Standard.

There are various rules specified for generating the STS-1 pointer and for interpreting the STS-1 pointer as specified in the above-referenced ANSI Standard, at Sections 10.1.5 and 10.1.6, respectively.

To facilitate the transport of lower-rate digital signals, the SONET standard uses sub-STS payload mappings, referred to as virtual tributary (VT) structures. (The CCITT calls these tributary units or TUs.) This mapping divides the SPE (virtual container) frame into seven equal-sized sub-frames or VT (TV) groups with 12 columns (108 bytes) in each. Two different modes of operation are defined for the VT structures: locked and floating. In locked byte-synchronous mode, every byte (DS0 channel) of the STS SPE is assigned to a specific byte position in the SPE.

The floating mode of operation defines pointers to a VT-SPE payload in the same fashion as pointers to SPE payloads are defined at the STS-1 level. Thus, the floating VT-SPE mode allows for minimal framing delays at intermediate nodes and for frequency justification of VT-SPEs undergoing transitions between timing boundaries. The floating VT-SPE structure for DS1 signals is described in the above-referenced ANSI Standard in Section 10.2 thereof.

Since SONET provides an entirely new way of transmitting signals and since pointer processing is an entirely new area to be developed, the question arises as to how to implement the pointer processing task.

DISCLOSURE OF INVENTION

An object of the present invention is to provide a SONET pointer processor.

According to the present invention, a receive device for a synchronous optical network (SONET) element comprises a receive line interface, responsive to an incoming SONET signal for providing a write address signal, an elastic store, responsive to said write address signal and said incoming SONET signal and to a read address signal, for providing a data output signal having the local clock signal rate; an elastic store monitor, responsive to said write and read address signals, for providing a near full signal and a near empty signal; and a receive local interface, responsive to said data output signal, said near full and near empty signals, for providing a data output signal having pointer value and adjustments.

In further accord with the present invention, the receive line interface may provide either an STS/STM write address signal or a VT/TU write address signal, according to a selected mode. Similarly, the receive local interface may provide a STS/STM read address signal or a VT/TU read address signal, according to the mode selected.

An elastic store, according to the present invention, can be designed to be used by an interface in either an STS or VT operational mode, multiplexing the RAM addresses and synchronization generated by STS or VT pointer processors, depending upon the operational mode.

Thus, according further to the present invention, an STS pointer processor and a twenty-eight VT pointer processor performs either (i) STS and VT pointer termination, rolling the incoming line rate STS pointer adjustments and VT pointer adjustments into outgoing Network Element VT pointer adjustments and generating a fixed STS pointer; or (ii) STS pointer termination, rolling the line rate STS pointer adjustments into the network element rate STS pointer adjustments. Only one elastic store is needed, according to this approach.

The STS pointer could be terminated at the line rate and be converted into the network rate using an STS elastic store. Twenty-eight separate VT pointer processors would then have another elastic store that could be connected serially to perform the VT pointer processing function. However, such an approach would require two levels of elastic stores, one for STS and the other for VT payload which requires more routing space and gates on any particular integrated circuit which one might choose to design. Such would add significant delay into the detection time of the failure conditions.

By taking advantage of the fact that the STS and VT pointer processors may be implemented in the same integrated circuit, e.g., application specific integrated circuit (ASIC), the elastic store may be designed inside a single RAM and may be shared by two pointer processors multiplexing the RAM addresses generated by different pointer processors, depending on the operational mode selected.

Furthermore, by taking advantage of the fact that the pointer interpreter, elastic store and pointer generator are designed in the same CMOS gate array, the circuit may be designed more efficiently using a minimum number of gate counts, passing maximum information from one side to the other, by decoding the elastic store read and write counters and comparing each address strobe independently with the decoded read strobe.

Thus, the STS payload pointers are detected at the line speed and they are regenerated at the network element speed after transferring the data from the line rate clock into the network element rate clock using an elastic store. The payload pointer value, AIS and loss of payload pointer are detected in the pointer interpreter and data is transferred into the pointer generator function along with a payload synchronization signal using an elastic store. The new pointer is generated depending on the sync signal coming out of the elastic store. The elastic store is monitored to generate the pointer adjustments as a result of the incoming pointer adjustments or the frequency difference between the line clock and the network element (local) clock.

Whereas the pointer, AIS and loss of pointer detection, the elastic store monitoring function, the pointer generation, the new data flag and AIS insertion circuits could have been designed using several different algorithms for interpreting the SONET specification, the present invention provides an easily understood, gate efficient and modular design.

These and other objects, features and advantages of the present invention will become more apparent in light of the detailed description of a best mode embodiment thereof, as illustrated in the accompanying drawing.

BRIEF DESCRIPTION OF THE DRAWING

FIG. 1a and 1b, when viewed together in the orientation indicated by FIG. 1, show is a simplified block diagram of a receive section 10, according to the present invention, of a SONET pointer processing integrated circuit;

FIG. 3a and 3b, when viewed together in the orientation indicated by FIG. 3, show a receive STS-1 timing block, according to the present invention;

FIGS. 5–7 show receive parallel interface timing, according to the invention;

FIGS. 9–13 show various path AIS and LOP scenarios, according to the invention;

FIG. 16a and 16b, when viewed together in the orientation indicated by FIG. 16, show the VT pointer detection block in more detail, according to the invention;

FIG. 17a and 17b, when viewed together in the orientation indicated by FIG. 17, show the VT pointer interpretation algorithm, according to the present invention, in more detail;

FIGS. 19(b)A and 19(b)B show VT pointer interpretation RAM timing, according to the present invention when viewed together in the orientation indicated by 19(b);

FIGS. 19(c)A and 19(c)B show VT pointer interpretation RAM timing, according to the present invention when viewed together in the orientation indicated by 19(c);

FIGS. 19(d)A and 19(d)B show VT pointer interpretation RAM timing, according to the present invention when viewed together in the orientation indicated by 19(d);

FIGS. 19(e)A and 19(e)B show VT pointer interpretation RAM timing, according to the present invention when viewed together in the orientation indicated by 19(e);

FIG. 19A shows the elastic store according to the invention;

FIGS. 19Aa, 19Ab, 19Ac and 19Ad when viewed together in the orientation indicated by FIG. 19A, shows how the RAM is used as an elastic store;

FIG. 20 shows VT elastic store counters, according to the present invention;

FIG. 22 shows the elastic store RAM utilization, according to the present invention;

FIG. 27 shows receive STS** interface timing, according to the present invention;

FIG. 27A also shows receive STS1** interface timing, according to the present invention;

FIG. 29 shows AIS insertion in VT pointer processing mode, according to the present invention;

FIG. 30 shows AIS insertion in STS pointer processing mode, according to the present invention;

FIGS. 33 and 34 show VT pointer generation block timing, according to the present invention;

BEST MODE FOR CARRYING OUT THE INVENTION

Figure 1B:
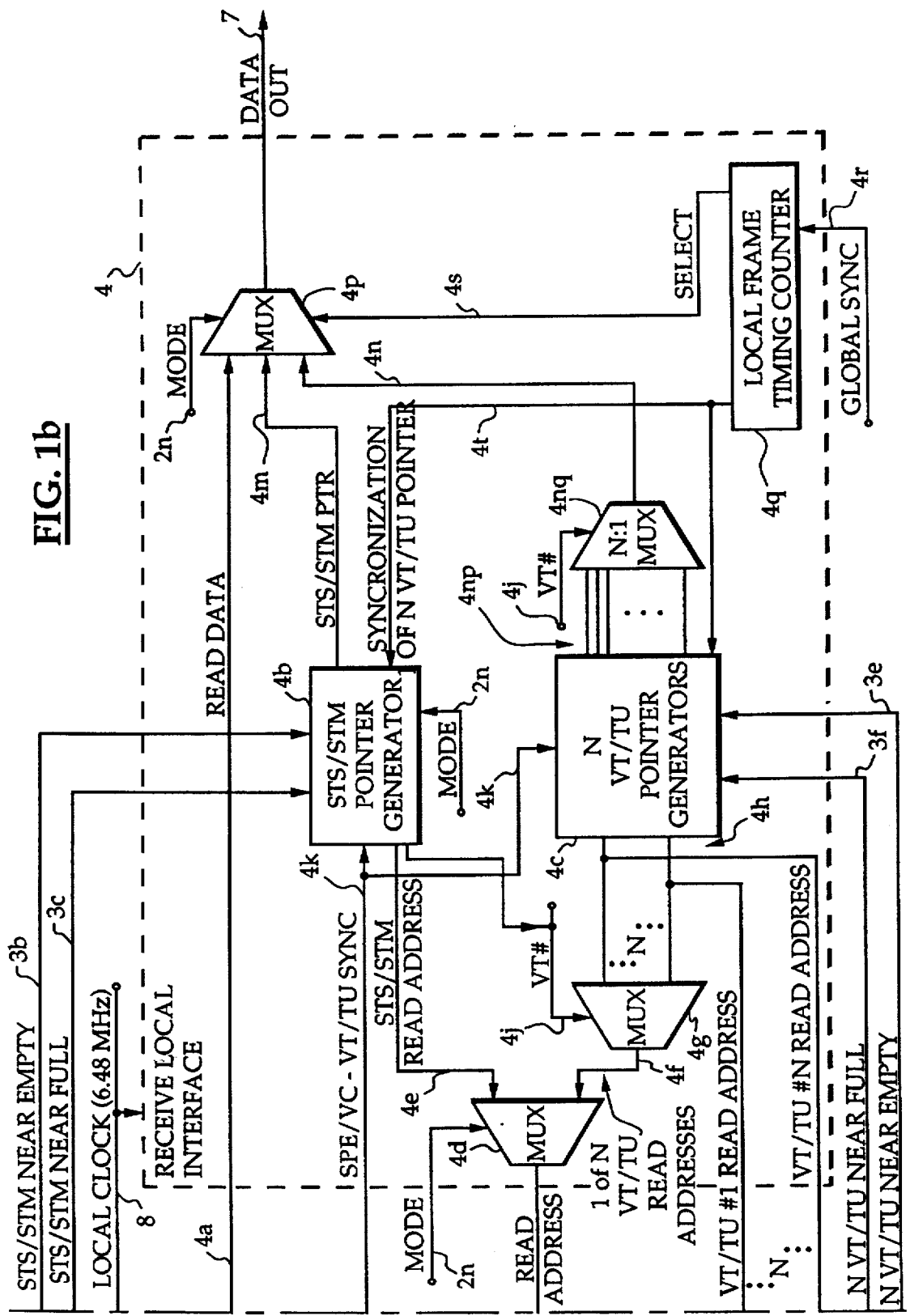

FIGS. 1a and 1b, when viewed together in the orientation indicated by FIG. 1, show a simplified block diagram of a receive section 1, according to the present invention, of a SONET pointer processing integrated circuit. The receive section (1) includes a Receive Line Interface 2, a Receive Elastic Store 3, and a Receive Local Interface 4. They function in combination either as a line terminating or path terminating device. The Receive Section 1 receives parallel data on a line 5 having byte boundaries defined according to the particular SONET standard utilized and performs STS/STM pointer processing or VT/TU pointer processing, and providing the data received on the line 5 at a line rate 6 as outgoing data on a line 7 at a network element (NE) rate 8. As mentioned, this disclosure will be disclosed primarily in terms of STS-1 and VTs, according to the above cited ANSI standard but is generally applicable to other standards including the comparable CCITT standard.

A transmit part of the IC, that is not shown, receives outgoing signals in a STS-1** transmit interface from drop modules or cross-connects. Also not shown are various support devices for serial bus interfaces and a microcontroller interface providing access to internal registers from a microcontroller on a printed board assembly upon which the IC containing the receive section 1 is mounted, according to one application of the present invention.

The receive section 1 can be provisioned by software to be in STS pointer processing or VT pointer processing mode. In STS pointer processing mode, the payload received on the line 5 at the line rate is converted to the local network clock rate using the elastic store 3. In this mode, STS payload pointer interpretation is performed in the block 2 to write the data on the line 5 as addressed by a write address signal on a line 9, enabled by a write enable signal on a line 9a, and as synchronized by a synchronous payload envelope (SPE) or virtual container (VC) synchronization signal or a virtual tributary (VT) or Tributary Unit (TU) synchronization signal on a line 2a selected by a multiplexer 2b into the elastic store 3. The write address signal on the line 9 is provided by a multiplexer 2c which receives an STS/STM write address signal on a line 2d from an STS/STM pointer interpreter 2e and a "one of N" VT/TU write address signal on a line 2f from a multiplexer 2g responsive to N write address signals on lines 2h from an "N" VT/TU pointer interpreter 2j which comprises N VT/TU pointer interpreters.

The multiplexer 2b is responsive to a J1SYNC signal on a line 2k from the STS/STM pointer interpreter 2e and to a 1 of N VT5 SYNC signal on a line 2m from a multiplexer 2mn which selects one of N V5 sync signals 2mp from the N VT/TU pointer interpreters 2j in response to the VT# select signal on the line 2i.

The STS/STM pointer interpreter 2e provides the J1SYNC signal to the multiplexer 2b and to the N VT/TU pointer interpreter 2j for the purpose of generating VT/TU write addresses and for the purpose of providing the synchronization signal on the line 2a to the elastic store 3.

Both multiplexers 2b, 2c are responsive to a mode signal on a line 2n for the purpose of selecting either STS/STM or VT/TU mode. This may be provisioned from software. All of the devices in the line interface 2 are dependent for their timing on a recovered receive clock signal on the line 6 which is nominally at 6.48 MHz. A line frame timing counter 2p is responsive to the receive clock on the line 6 and to an A1 sync on a line 2pq and provides a synchronization signal on a line 2q for use within the line interface 2. The multiplexer 2g is responsive to the VT count signal 2i provided by the STS/STM pointer interpreter 2e.

The elastic store RAM 3 receives write addresses from the line interface 2 for each byte of the incoming data frame. As indicated, the elastic store 3 is responsive to a write enable on the line 9a based on the receive clock and the line interface and is also responsive to a read address signal on a line 10 from the receive local interface 4 for reading out data stored previously at the line rate but read out on the line 4a at the local clock rate.

Either an STS/STM pointer generator 4b or an N VT/TU pointer generator 4c provides the read address on the line 10 by means of a multiplexer 4d responsive to the mode signal on the line 2n for selecting either an STS/STM read address signal on a line 4e or a one of N VT/TU read address signals on a line 4f from a multiplexer 4g. It will be realized in connection with the detailed description below that the multiplexer 4g need not exist, as the N VT/TU Pointer Generator function may be embodied in hardware that is shared by the VT/TUs. In that case only one VT/TU read address is provided and there is no need for a multiplexer 2g. In that case the multiplexing function is a multiplexing of hardware inside the pointer generator as claimed in copending application Ser. No. (Atty. Docket No. 907-122). For purposes of the present invention, however, these alternative multiplexing means and methods are equivalent. Thus, either one VT/TU read address or N VT/TU read addresses are provided on lines 4h by the "N" VT/TU pointer generator 4c and the appropriate VT/TU address is selected by a VT number signal on a line 4j provided to the multiplexer 4g by the STS/STM pointer generator 4b. Both the STS/STM pointer generator 4b and the "N" VT/TU pointer generator 4c are responsive to an SPE/VC-VT/TU sync signal on a line 4k read out from the elastic store 3 read out each frame for each VT at the local clock rate.

The STS/STM pointer generator 4b provides an STS/STM pointer capable of having pointer adjustments therein on a line 4m and the "N" VT/TU pointer generator 4c provides a "1 of N" VT/TU pointer signal capable of having adjustments therein on a line 4n. A multiplexer 4p is responsive to the mode signal on the line 2n for selecting either the STS/STM pointer signal on line 4m or the VT/TU pointer signal on the line 4n to be multiplexed into the read data stream provided on the line 4a in order to provide a data signal with pointers on a line 11.

A local frame timing counter 4q is responsive to a global sync signal on a line 4r for providing a select signal on a line 4s to multiplexer 4p and also for providing a synchronization signal on a line 4t to the pointer generators 4b, 4c.

An STS/STM elastic store monitor 3a is responsive to the write address signal on the line 9 and the read address signal on the line 10, as well as the local clock on the line 8 for providing a STS/STM near empty signal on a line 3b and an STS/STM near full signal on a line 3c. The function of the STS/STM elastic store monitor 3a is to compare the write address with the read address to determine when pointer adjustments are needed to prevent elastic store overflow or underflow. If there is a significant difference between the rate at which the data is being written in by the receive clock 6 and the rate at which it is being read out by the local clock 8, then, to make an adjustment, a near empty signal on the line 3b or a near full signal on the line 3c is provided to the STS/STM pointer generator 4b in order to make a pointer adjustment which will cause the synchronous payload envelope or the virtual container to change its relative position with respect to the outgoing frame.

Similarly, an "N" VT/TU elastic store monitor 3d is provided to perform a similar function while in the VT/TU mode. Thus, an N VT/TU near empty signal on a line 3e and an N VT/TU near full signal on a line 3f are provided to the respective "N" VT/TU pointer generator 4c for causing the read address signal on the line 10 to compensate as required by pointer adjustments, and for reflecting those pointer adjustments in the VT/TU pointer signal on the line 4n.

The payload pointer for the outgoing data on the line 4m is generated by the Receive Local Interface 4 by counting, in STS mode, the number of bytes between an H1, H2 pointer bytes and the bytes where the J1 signal on the line 4k appears at the output of the elastic store 3. In this mode, STS payload pointer interpretation is performed in the STS Interface 2 to write the data on line 5 and J1 payload synchronization on lines 2k, 2a into the elastic store 3. Again, the payload pointer 4m is generated by calculating the value between the H1, H2 pointer byte and the byte where the J1 signal appears active at the output of the elastic store. The multiplexer 4p combines the data on the line 25h with the pointers generated by either the STS pointer generator 25e or the 28 VT pointer generator 25f, depending on the mode, at the appropriate byte locations in order to provide the STS1** output signal on the line 19.

Figure 2:
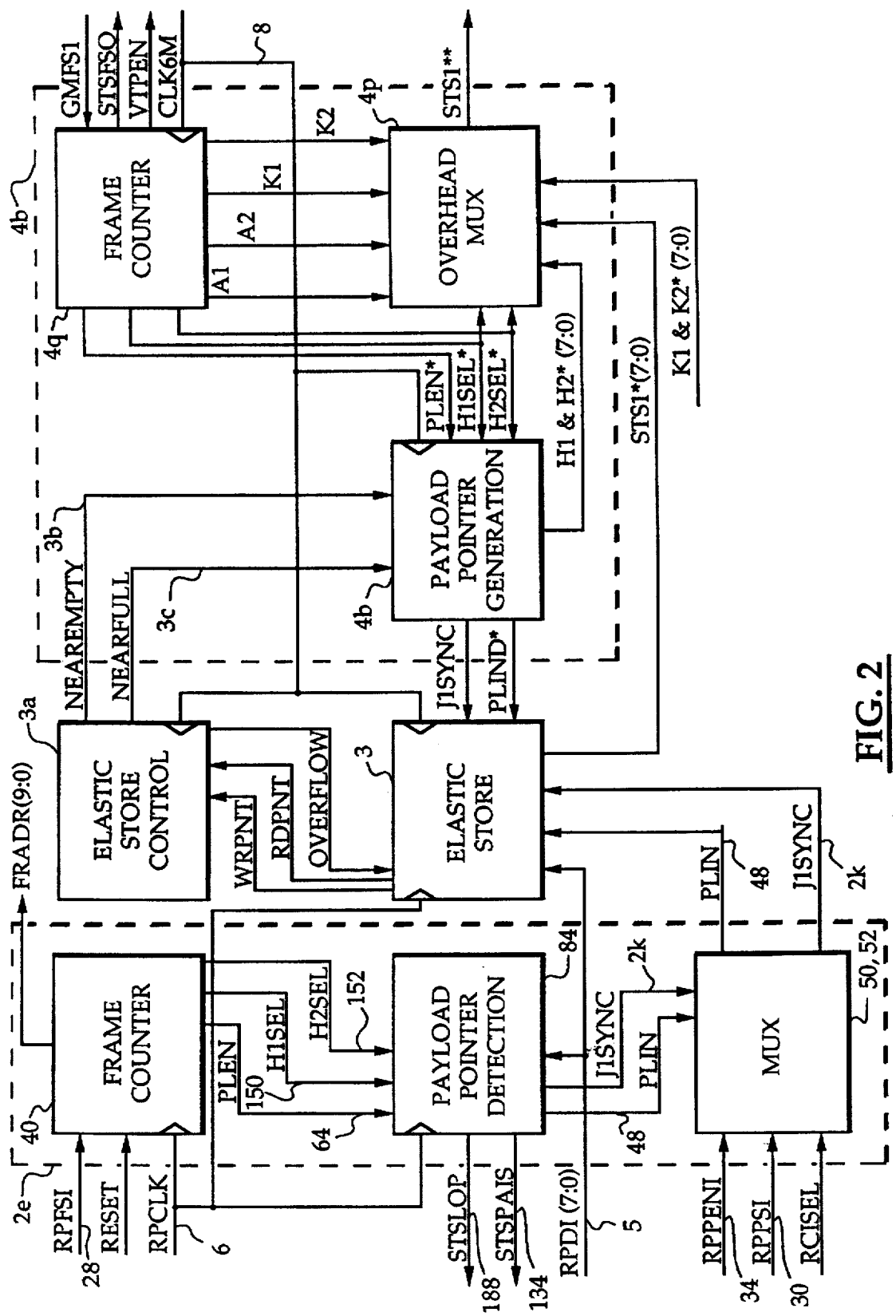
FIG. 2 shows STS pointer processing mode, according to the present invention.

The functions performed by the receive section 1 in the STS pointer processing mode are shown in FIG. 2.

The main characteristics of STS pointer processing mode are:

Incoming pointer adjustments may cause outgoing pointer adjustments.

The STS pointer processor converts the jitter (short-term variations of the significant instants of a digital signal from their ideal positions in time) in the line rate 6 into the STS pointer adjustments in the network element rate 8 payload.

The wander (low-frequency jitter, where the incoming clock rate and local clock rate are exactly the same but where there is a phase shift in time between the frames) received in the STS payload is accumulated in the elastic store and converted into the STS pointer adjustments in the network element rate payload.

When an active AISGEN signal is received from upstream to make possible AIS insertion on the STS1** signal, or STS LOP or STS path AIS is detected, an STS path AIS is generated in the data going to the cross-connect or drop modules.

In FIG. 2, showing STS Pointer Processing in the device 1, parallel data (RPDI) is received on the line 5 in eight-bit parallel form on byte boundaries. It is clocked in with the rising edge of an RPCLK clock signal on the line 6, which may, for example, be a 6.48 MHz receive clock input. This clock may be generated outside the device 1 by dividing the recovered clock from the incoming data signal on the line 5. The rising edge of this recovered clock may also be used to latch an RPFSI signal on a line 28, being a receive frame sync input which is active high when the A1 byte is received on the line 5 (clocked in with using edge of RPCLK) and also an RPPSI signal on a line 30, being a receive payload sync input which is active high when the J1 byte is received on the line 5. The RPPSI signal on the line 30 is used, in the embodiment shown, when the integrated circuit within which device 10 is embodied is being used to interface an STS-3 signal.

Figure 3A:
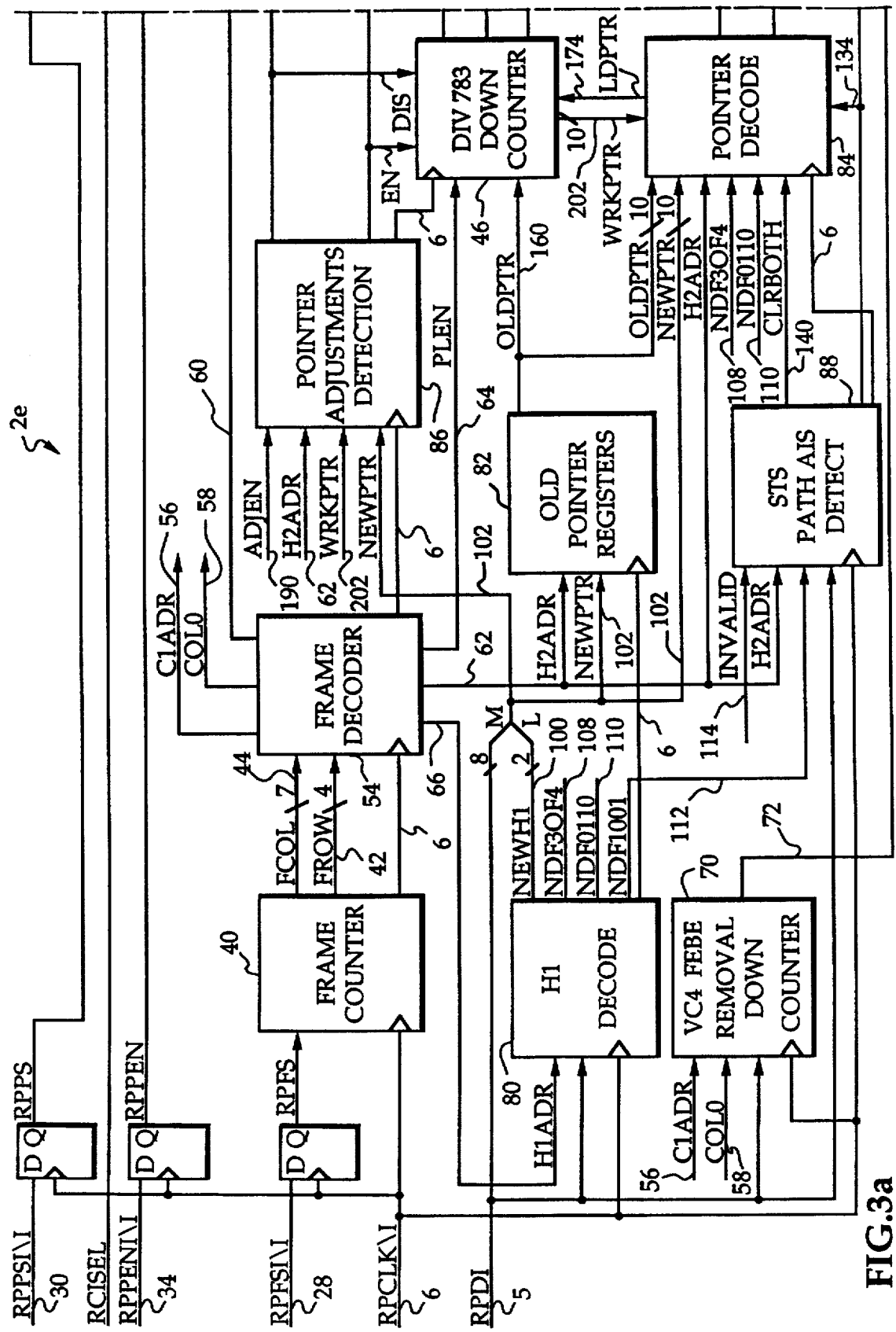
Figure 4A:
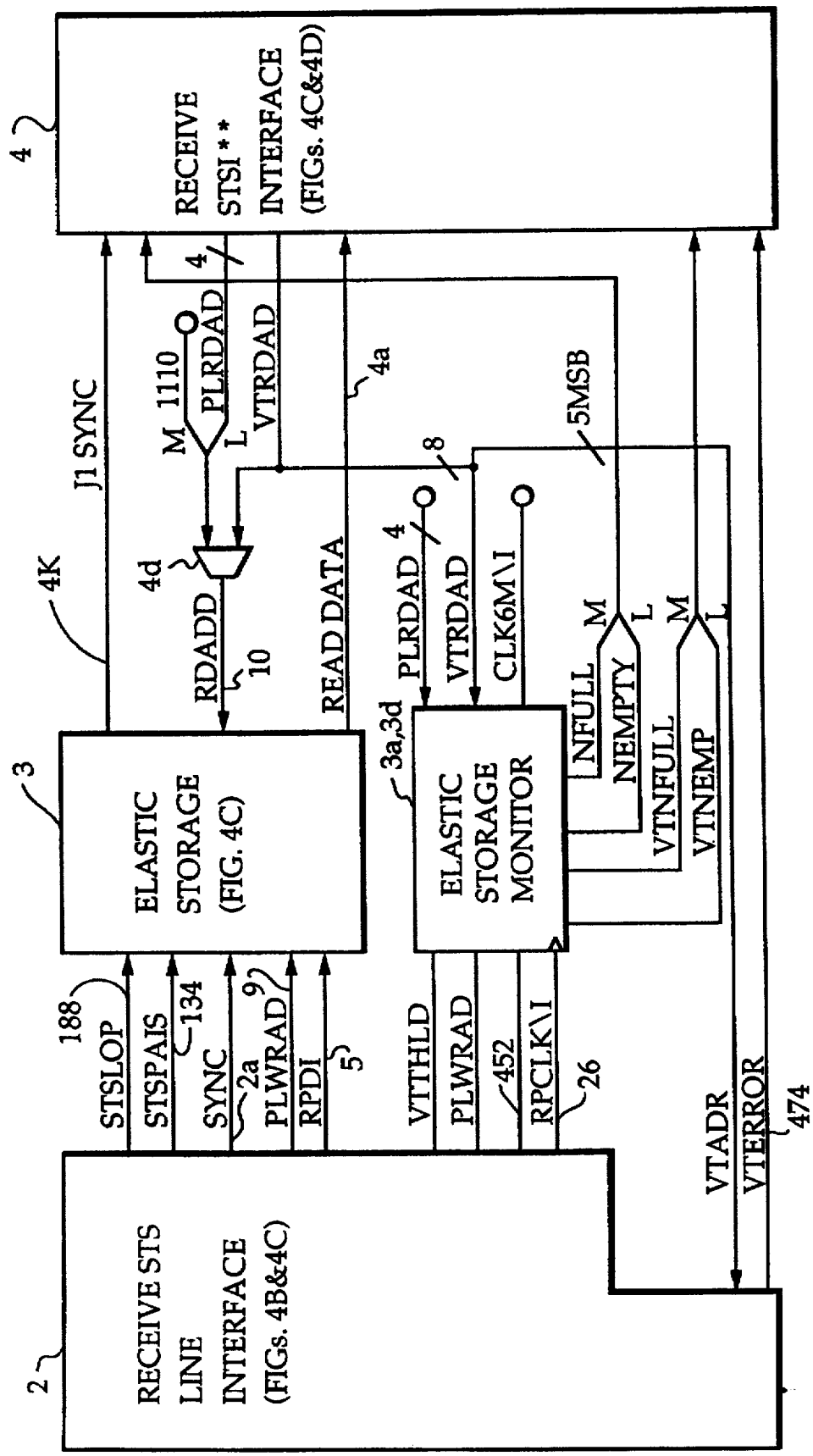
FIG. 4A shows the receive device of FIG. 1 in more detail, referring to FIGS. 4B, 4C and 4D.

It should be realized that FIG. 2 generally shows the major functions related only to the STS pointer processing mode as carried out across the entire receive section 1 of FIG. 1a. Blocks describing the actual circuitry implemented for the STS Pointer interpretation function 2e, in an embodiment of the present invention and included in the Receive STS Line Interface 2 side of FIG. 1a, is shown in more detail in FIGS. 3a and 3b. There, a receive STS-1 timing circuit 2e is shown in detail. Referring also to FIG. 4A for the receive line interface 2, and particularly to FIG. 4B, the receive STS-1 timing circuit 2e is shown in more detail as part of the receive STS line interface 2 of FIG. 1a. We will hereinrefer back and forth between FIG. 2 and other Figures and will now concentrate on the details of the receive STS-1 timing circuit 32, as shown in detail in FIG. 3a. There, eight-bit data on the line 5 and some synchronization signals in byte boundaries at a 6.48 megabit/second line rate including a 6.48 MHz recovered line clock on the line 6 are provided thereto. All of the input signals at the receive parallel interface previously described in connection with FIG. 2 are also shown in FIG. 3a. In addition, those not discussed so far include a Receive Payload Enable Input (RPPENI) signal on a line 34, which is active low during the first three columns of a received STS-1 frame. This input thus points to the first three columns of an incoming STS-1 frame and is clocked in with the rising edge of the RPCLK signal on the line 26. It may also be used to point to the payload envelope including pointer adjustments. It is active high at the payload locations and active low at the overhead locations.

Timing for the input interface of the device 10 is shown in FIG. 5. FIG. 5(a) represents the input data on the line 18. FIG. 5(b) represents the recovered clock signal at 6.48 MHz on the line 6. The rising edge of this clock latches RPPSI, RPFSI, RPDI and RPPENI signals into the device 1. This clock is also used to write the data into the receive elastic store 3. FIG. 5(c) shows an RPFSI signal which is a receive frame sync input (A1) and which is active high when the A1 byte is received on the receive parallel data bus 5. It is clocked in with the rising edge of RPCLK. Needless to say, the waveforms shown in FIGS. 5(a), (b) and (c) share a common time line. FIG. 6 shows section overhead pointer adjustments and FIG. 7 shows line overhead pointer adjustments. In FIGS. 6 and 7, two additional signals are shown. For the device of FIG. 1a and 1b, another mode exists where the STS pointer interpreter 2e is bypassed and a pair of signals RPPSI and RPPENI provide STS payload synchronization and pointer adjustment information from an STS pointer interpreter in another device (not shown). The RPPSI signal on the line 30 in FIG. 3a indicates the SPE J1 byte location. The RPPENI signal on the line 34 is active high during SPE bytes and active low during overhead locations including pointer adjustments, as shown in the figures.

Figure 4B:
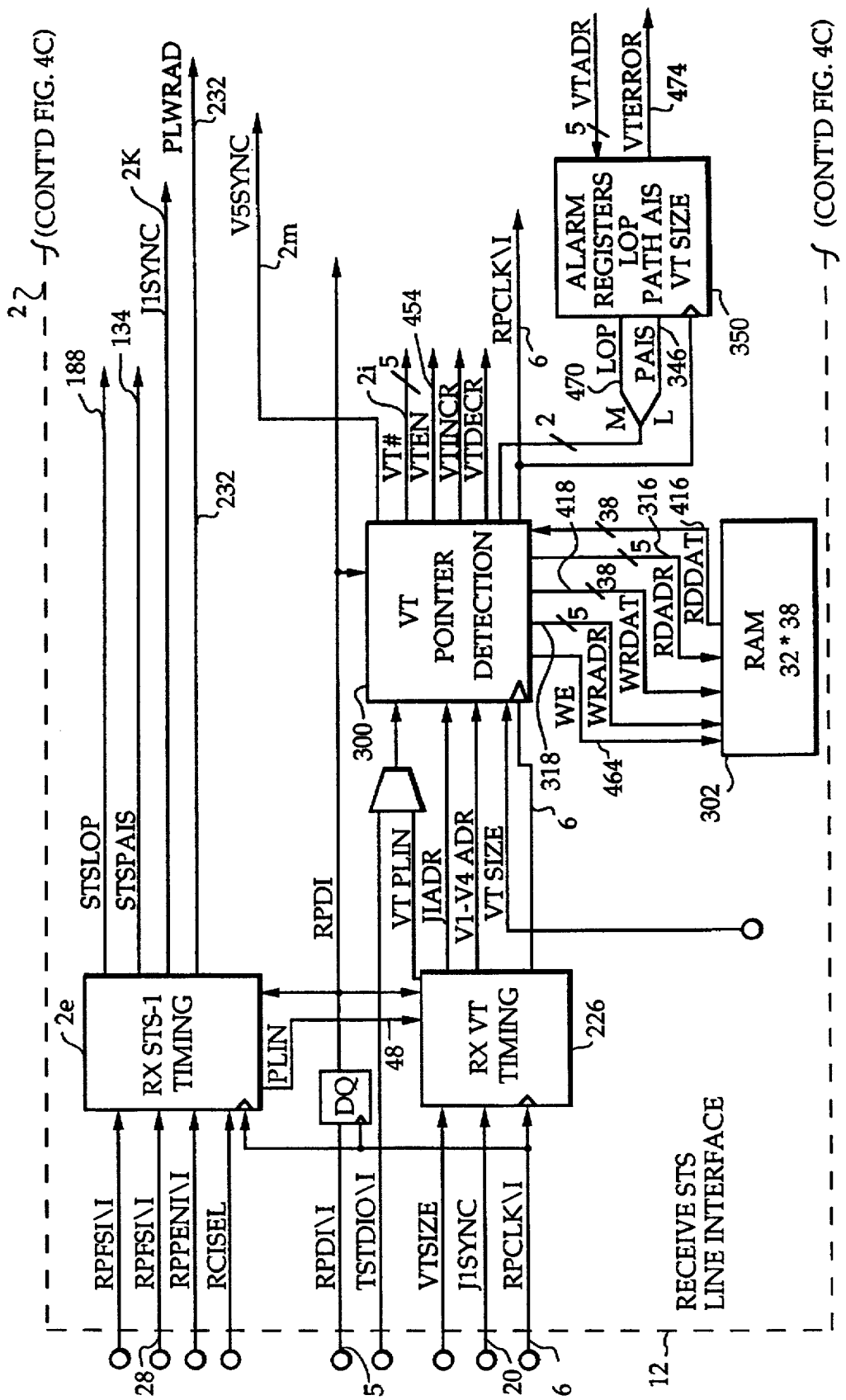
FIG. 4B shows the receive STS line interface in more detail.

The timing block 2e of FIGS. 3a and 4B is responsive to the incoming eight-bit parallel 6.48 MHz data on the line 5 and the 8-kHz frame synchronization signal (A1) on the line 28, along with their clock on the line 6.

The overall functions contained in the receive STS-1 timing block 2e are as follows:
Retiming of input signals and data.
STS-1 frame counting.
SPE downcounting for payload pointer interpretation.
new data flag (NDF) and normal NDF detection of payload pointers.
STS pointer increment and decrement detection.
STS path AIS detection.
STS loss of pointer detection.
VC4 FEBE removal from C1 overhead byte location.
SPE elastic store write address counter.

As for retiming, the incoming parallel data and synchronization signals are retimed with the clock received from the same interface.

As for the STS-1 frame counting, the 8 kHz (A1) frame sync signal on the line 28 is used to reset a frame counter 40 which generates STS-1 frame row and column addresses on lines 42, 44, respectively, as shown in FIG. 3a, and the payload enable signal on the line 34 is used for payload pointer processing and a payload counter-function when provided as a payload indicator (PLIN) signal on a line 48 (see also FIG. 2).

Two multiplexers 50, 52 are controlled by a microcontroller interface (not shown) which selects the payload start (J1) sync signal on the line 2k and the payload indicator on the line 48, either from the STS pointer interpretation circuit's DIV 783 down counter 46 or from the IC inputs 30, 34. MUXs are used to bypass the STS pointer interpretation circuit when the IC is provisioned to be in an STM (AU Pointer) interpretation mode.

The frame address counter 40 of FIG. 3a counts row and column addresses of the STS-1 frame as synchronized with the RPFSI signal on the line 28 which is an 8 kHz sync input. The row counter counts between 0–8 to indicate one of the nine rows of the frame and an FROW signal is provided on the line 42 indicative thereof, and a column counter counts between 0–89 to indicated one of the 90 columns of a frame and an FCOL signal is provided on the line 44 indicative thereof. Because of the way the STS-1 SPE is transmitted row by row (See FIG. 11 of ANS1 T1.105-1988), the column counter is incremented every clock cycle. It is reset to 0 when it reaches 89. The row counter is incremented when the column counter is being reset, and it is cleared when the column address is 89 and the row address is 8. An active RPFSI input on the line 28 will reset the column counter to 1 and the row counter to 0.

A frame decoder 54 decodes the column and row signals on the lines 44, 42 and provides several internal strobe signals on lines 56, 58, 60, 62, 64. An A1ADR signal on the line 60 is active during row 0, column 0; a C1ADR signal on the line 56 is active during row 0, column 2; an H1ADR signal on the line 66 is active during row 3, column 1; a COL0 signal on the line 58 is active during column 0, and the payload enable (PLEN) signal on the line 64 is active during columns 3–89.

A VC-4 (AU-4) Far End Block Error (FEBE) removal downcounter (70) is responsive to the C1ADR signal on line 56 (which is active during row 0 of column 2), and the COL0 signal on line 58 (active during column 0), and also responsive to the data signal on line 18, as well as the clock signal on line 26. AU-4 FEBEs are loaded into a four-bit downcounter when they are received from the bits 7-4 of RPDI data inputs during the C1 byte, which is in row 0 in the third column of the transport (section) overhead of an STS-1 frame. It should be realized that the bit position numbering in ANSI T1.105 and that used in the present IC design is different. The mapping between the two numbering schemes is the reverse of each other. In other words, in the standard, the most significant bit is numbered 1, with successively less significant bits numbered higher, so that the least significant bit is numbered 8. In the IC implementation of the present invention, on the other hand, the most significant bit is numbered 7, while less significant bits are numbered with lesser numbers down to the least significant bit being numbered 0. In both cases, the most significant bit is always transmitted first in serial links. The counter 70 is decremented once every row, and an output pulse is generated on a line 72 during column 0 until it reaches 0. The output pulse is stretched for one extra clock period and sent to a TX FEBE conversion block (not shown).

Figure 8:
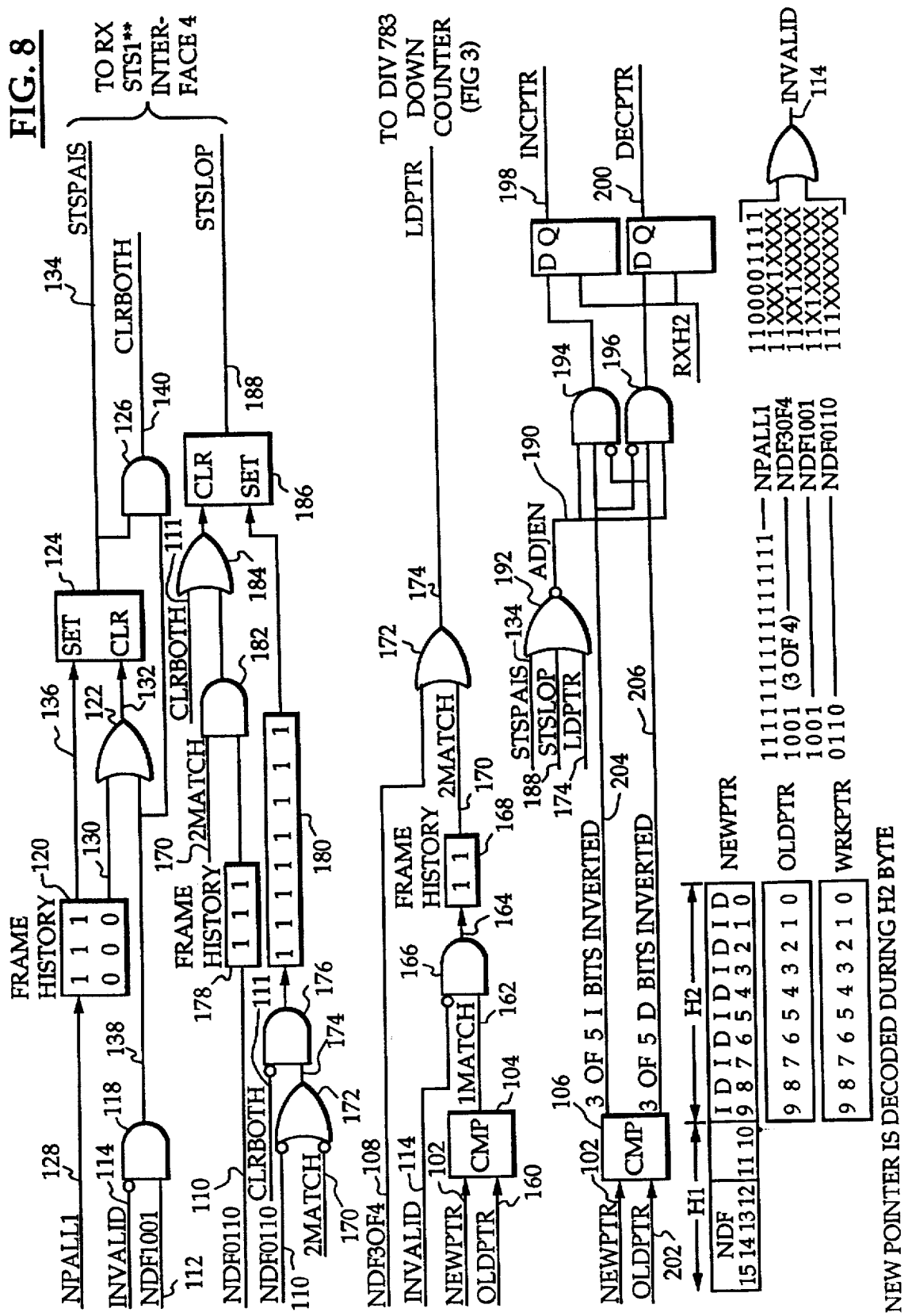
FIG. 8 shows STS pointer interpretation, according to the present invention.

Turning for a moment to FIG. 8, there is shown an STS pointer interpretation algorithm which is disclosed in further detail in copending application Ser. No. 771,038 is implemented in a distributed manner in FIG. 3a in a block H1 DECODE 80, a block OLD POINTER REGISTERS 82, the DIV 783 DOWNCOUNTER block 46, a POINTER DECODE block 84, a POINTER ADJUSTMENTS DETECTION block 86 and an STS PATH AIS DETECT block 88.

For STS payload pointer interpretation, according to the algorithm of FIG. 8, as shown implemented by the functional blocks of FIGS. 3a and 3b, STS payload pointer interpretation is carried out according to the rules for interpreting the STS pointer as specified in Bellcore TR-TSY-000253. Of course, it should be realized that the present invention is not restricted to T1/Bellcore constraints and is equally applicable to CCITT applications where the pointer locates the start of the STM virtual container within the container. The same sort of comment applies to the remaining rules as well even though the rules may be different.

According to copending application U.S. Ser. No. 07/771,038 entitled "SONET Pointer Interpretation System and Method," hereby incorporated by reference, SONET equipment will enter a loss of pointer (LOP) state on an STS if a valid pointer is not found in eight consecutive frames by using the pointer interpretation rules described above, or if eight consecutive NDFs are detected as set to '1001' but not including concatenation indicator.

FIGS. 9-13 show various LOP and path AIS scenarios. In each of the FIGS. 9-13, a common time line is used to indicate in sub-figures (a), (b) and (c) the relationship of the PAIS signal (b) and the LOP signal (c) for various detected pointer conditions (a), as set forth in the following table:

TABLE I

| | |
|---|---|
| P1, P2, P3 | unique pointer values with normal new data flag. |
| A1 | all 1s in H1 and H2. |
| IP | increment pointer command. |
| DP | decrement pointer command. |
| ER | error in pointer value or error in new data flag. |
| NF | new data flag set to 1001. |

Referring back to FIGS. 3a and 3b, it will be seen that the H1 decode block 80 is responsive to the H1 ADR signal on the line 66 and the RPDI data signal on line 5, as well as the clock signal on line 6. In response thereto, the Hi decode block 80 monitors the H1 byte in the incoming data frames on line 18 to determine when a new H1 pointer has arrived and outputs a 2-bit NEWH1 signal on a line 100. This is combined with the H2 byte on line 18 in the next arriving byte and they are together provided as a NEWPTR signal on a line 102 to the pointer adjustments detection block 86, as shown in FIG. 3a and also shown in FIG. 8 as being provided to a compare block 104 and also a compare block 106.

The H1 decode block 80 also provides an NDF3OF4 signal on a in 108 when a majority of the most significant four bits of the H1 pointer provide a '1001'2. An NDF 0110 signal on a line 110 is provided when the four most significant bits (NDF) of the H1 byte are detected in the configuration 0110. Similarly, an NDF 1001 signal is provided on a line 112 when the NDF bits are detected having a value of 1001.

The NDF 1001 signal on the line 112 is provided to the STS path AIS detect block 88 along with the H2 ADR signal on the line 62 and an INVALID signal on a line 114 derived as shown in FIG. 8.

The function of the STS path AIS detect block of FIG. 3a is shown in FIG. 8 as being carried out by a gate 118, a frame history block 120, an OR gate 122, an SC flip-flop 124 and an AND gate 126. The frame history block 120 comprises a means of counting consecutive events and is responsive to an all "ones" condition in the STS pointers H1, H2, as indicated by a 'signal' on a line 128. If the pointers H1, H2 are detected with all "ones" for three consecutive frames, as indicated by the 'signal' on the line 128, the frame history block 120 will provide a high signal on a line 136 and a low signal on a line 130, thereby causing the signal on the line 134 to go high, indicating an STS path alarm indication signal has occurred. The signal on the line 134 is used by an OR gate 142 as shown in FIG. 4D within the receive STS-1 interface 4 to provide an alarm indication signal on a line 144, to which a receive STS-1 interface timing block 146 is responsive. The STS PAIS signal on the line 134 is also shown in FIG. 2 being provided by the payload pointer detection block 84, which is responsive to the data signal on the line 5, the clock signal on the line 6, the PLEN signal on the line 64 and H1, H2 SEL signals on lines 150, 152, respectively. Thus, it will be seen that the payload pointer detection block 84 of FIG. 2 represents, in part, the functions already described in connection with FIG. 3 regarding the frame decoder 54, the H1 decode block 80 and the STS path AIS detect block 88. Thus, in connection with FIG. 2, the payload detection pointer function 84, in part, may be viewed as checking the H1, H2 pointers in each frame, as described by the algorithm already described in FIG. 8, for generating an STS PAIS signal on the line 134 for use in the receive STS-1 interface timing circuit 16 of FIG. 4A, 4C & 4D, where it is used for control of AIS insertion, depending on STS or VT mode, in STS-1 overhead insertion and retiming, as described in more detail below.

Referring back to FIG. 8, it will be seen that an old pointer (OLDPTR) signal is there described as being made up of, in a fashion similar to that of the NEWPTR signal on the line 102, the two least significant bits of the H1 byte and all of the bits of the H2 pointer byte. It represents the pointer value of the previous frame. The OLDPTR signal is shown on a line 160 as being provided by the old pointer registers 82 in response to the clock signal on the line 6, the NEWPTR signal on the line 102 and the H2ADR signal on the line 62. The function of the old pointer registers 82 is to store the NEWPTR signal on the line 102 in response to an indication by the H2ADR signal on the line 62. In the next STS-1 frame, when the H2 pointer is again indicated, the previously-stored NEWPTR signal value will be output on the line 160, indicating the previous frame H2 pointer value.

In this way, the OLDPTR signal on the line 160 and the NEWPTR signal on the line 102 may be compared in the comparator 104 of FIG. 8 to see if there is a match or not. If there is a match, as indicated by a signal on a line 162, and if the conditions necessary to create an invalid signal on the line 114 are not present, then a signal is provided on a line 164 by a gate 166 to a frame history block 168 for a determination as to 3-consecutive valid matching pointers on a 2MATCH line 170. If this condition is satisfied, then the 2MATCH signal is provided on a line 170 to an OR gate 172 also responsive to the NDF3OF4 signal on the line 108. If either the 2MATCH signal on the line 170 or the NDF3OF4 signal on the line 108 are present, then the OR gate 172 provides a LDPTR signal on a line 174 to the DIV 783 DOWNCOUNTER 46 of FIG. 3a. The function of the LDPTR signal is to indicate loading of the pointer value into the downcounter during H2.

The 2MATCH signal on the line 170 is also provided to a gate 172 along with the NDF0110 signal on the line 110. The gate 172 is part of a circuit including a gate 176, a frame history block 178, 180, an AND gate 182, an OR gate 184 and an SC flip-flop 186 for providing an STS loss of pointer (STSLOP) signal on a line 188, which function is shown as being carried out in the POINTER DECODE block 84 of FIG. 3a, the PAYLOAD POINTER DETECTION block 84 of FIG. 2 and the RX STS-1 timing block 2e of FIGS. 4A & 4B.

Also carried out in the POINTER DECODE block 84 of FIG. 3a is the provision of an ADJEN signal on a line 190 by a NOR gate 192, as shown in FIG. 8, in response to the STSPAIS signal on the line 134, the STSLOP signal on the line 188 and the LDPTR signal on the line 174. This is an adjustment enable signal used by a pair of gates 194, 196 to provide an increment pointer (INCPTR) signal on a line 198 or a decrement pointer (DECPTR) signal on a line 200 in response to a comparison by a comparator 106 of the NEWPTR signal on the line 102 with a WRKPTR signal on a line 202. The WRKPTR (working pointer) signal indicates the value of the pointer that was last loaded into the DIV 783 DOWNCOUNTER 46, as shown in FIG. 3a. In FIG. 8, the comparator 106 provides a signal on a line 204 if three of five I-bits are inverted in the comparison carried out by the comparator 106. It provides a signal on a line 206 if three of five D-bits are inverted. The pointer adjustments detection block 86 provides a PJEN signal on a line 208 or an NJEN signal on a line 210 in response to the INCPTR signal on the line 198 or the DECPTR on the line 200, respectively. The DIV 783 DOWNCOUNTER 46 is responsive to the signals for the purpose of providing a J1SYNC signal on a line 220 for the elastic store and a PLIN signal for a receive VT timing circuit 226 to be described in connection with FIGS. 4B and 14.

Figure 4C:
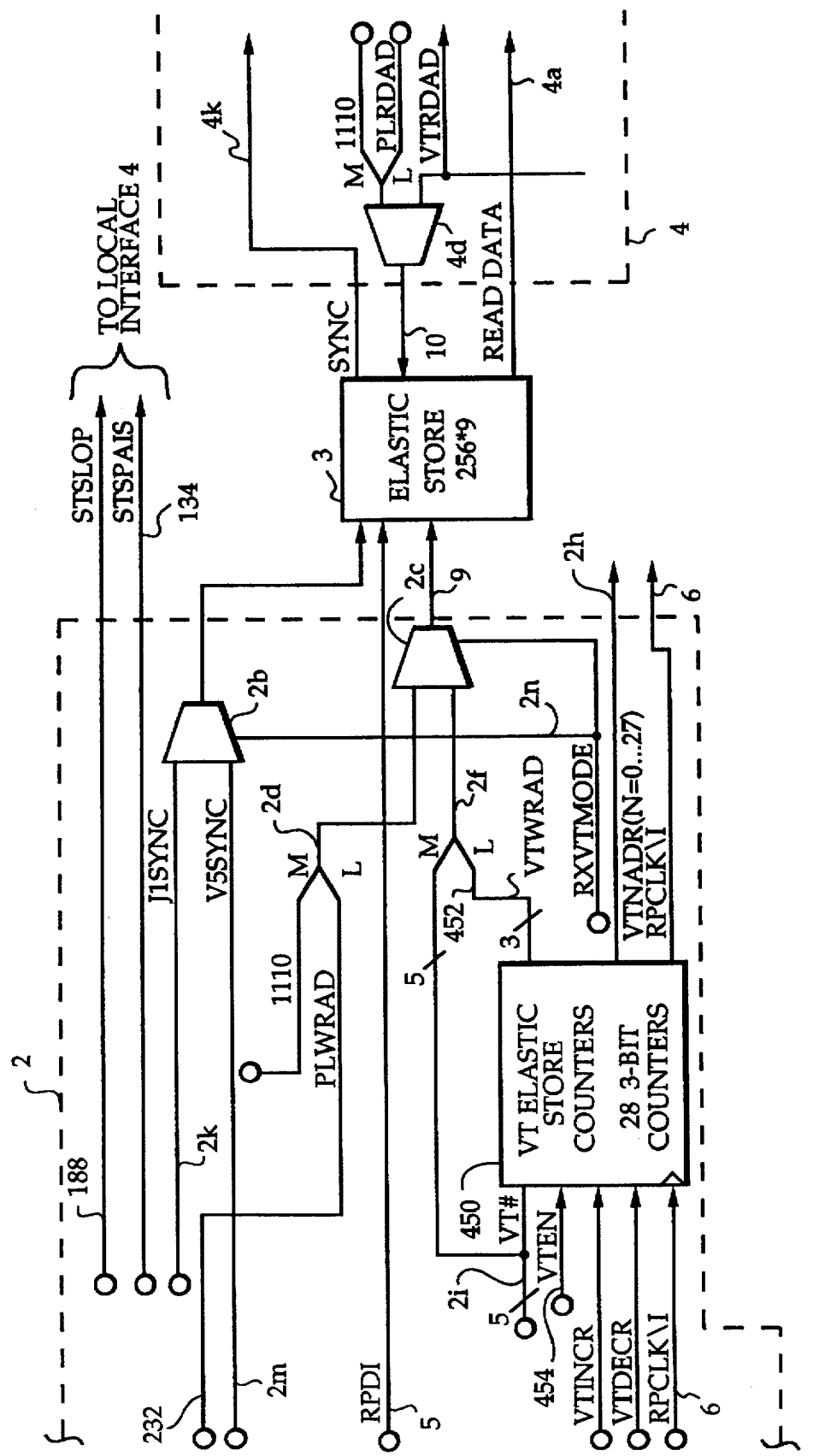
FIG. 4C shows the elastic store in more detail.
Figure 4D:
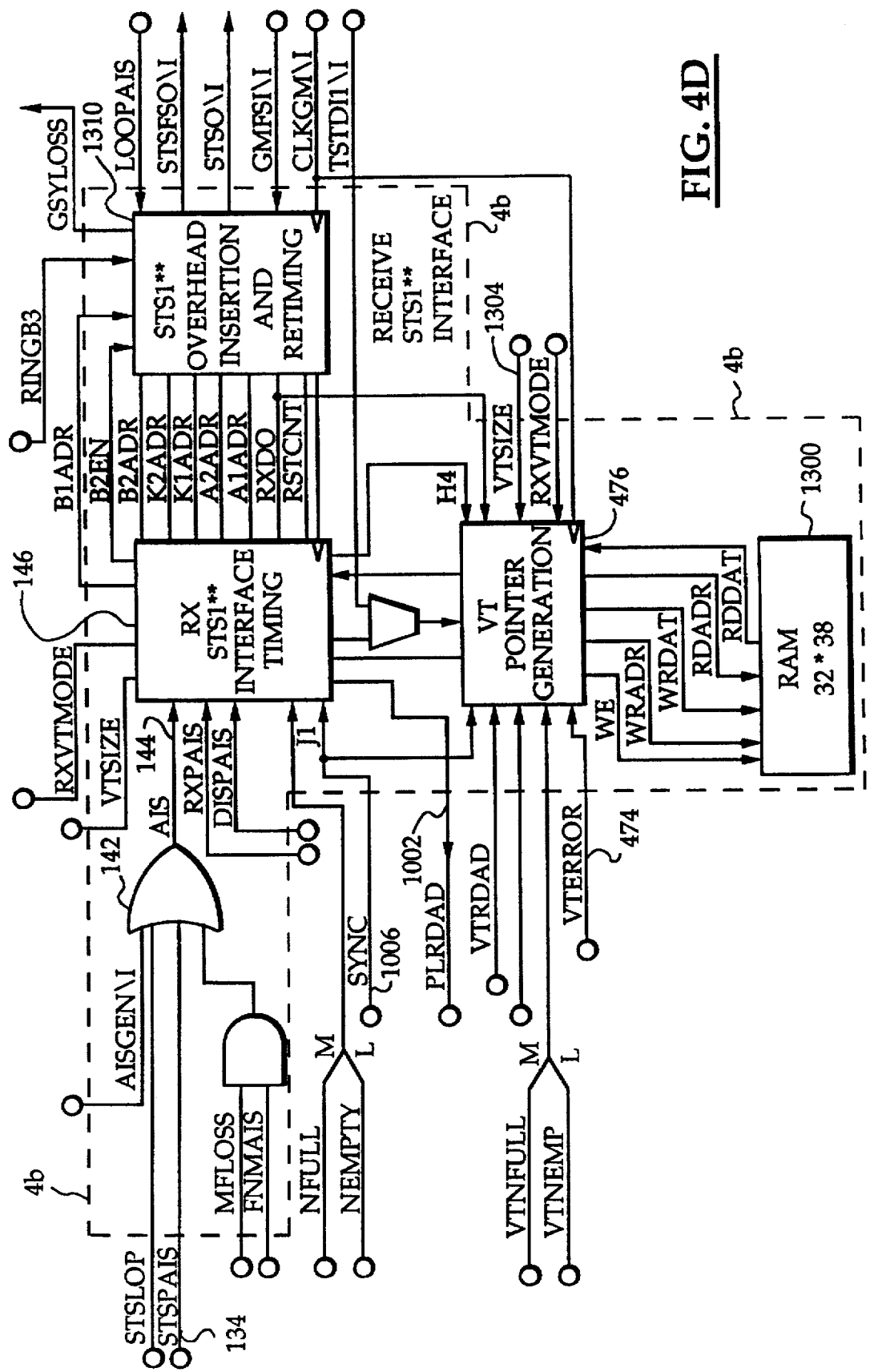
FIG. 4D shows the receive STS1** interface in more detail.

A divide-by-16 STS elastic store write counter 230 is shown in FIG. 3b as being responsive to the PLIN signal on the line 48 and to the clock signal on the line 6 for providing a payload write address (PLWRAD) signal on a line 232 which is shown in FIG. 4C being provided as the four least significant bits of an eight-bit signal on a line 234 having '1110' as the most significant four bits and together being provided as the signal on the line 2d, also shown in FIG. 1, to a multiplexer 2c also responsive to a similar signal on the line 2f from the VT pointer interpreter 2j to be described in more detail below. (The VT pointer interpreter 2j of FIG. 1 is shown in FIGS. 4B & 4C as being made up of blocks 226, 300, 302, 350 and 450.) One or the other of these signals 2d, 2f provides a write address signal on a line 9 to the elastic store 3 for the purpose of storing an incoming byte at the indicated write address.

Thus, to recap the STS timing block 2e functions, we have disclosed in FIG. 3, line rate frame counting, line and section overhead address decoding, AU-4 FEBE removal for TX AU-4 FEBE, RX STS loss of pointer detection, RX STS PATH AIS detection, RX STS pointer interpretation, STS3RC interface selection and STS elastic store write addressing.

Figure 14:
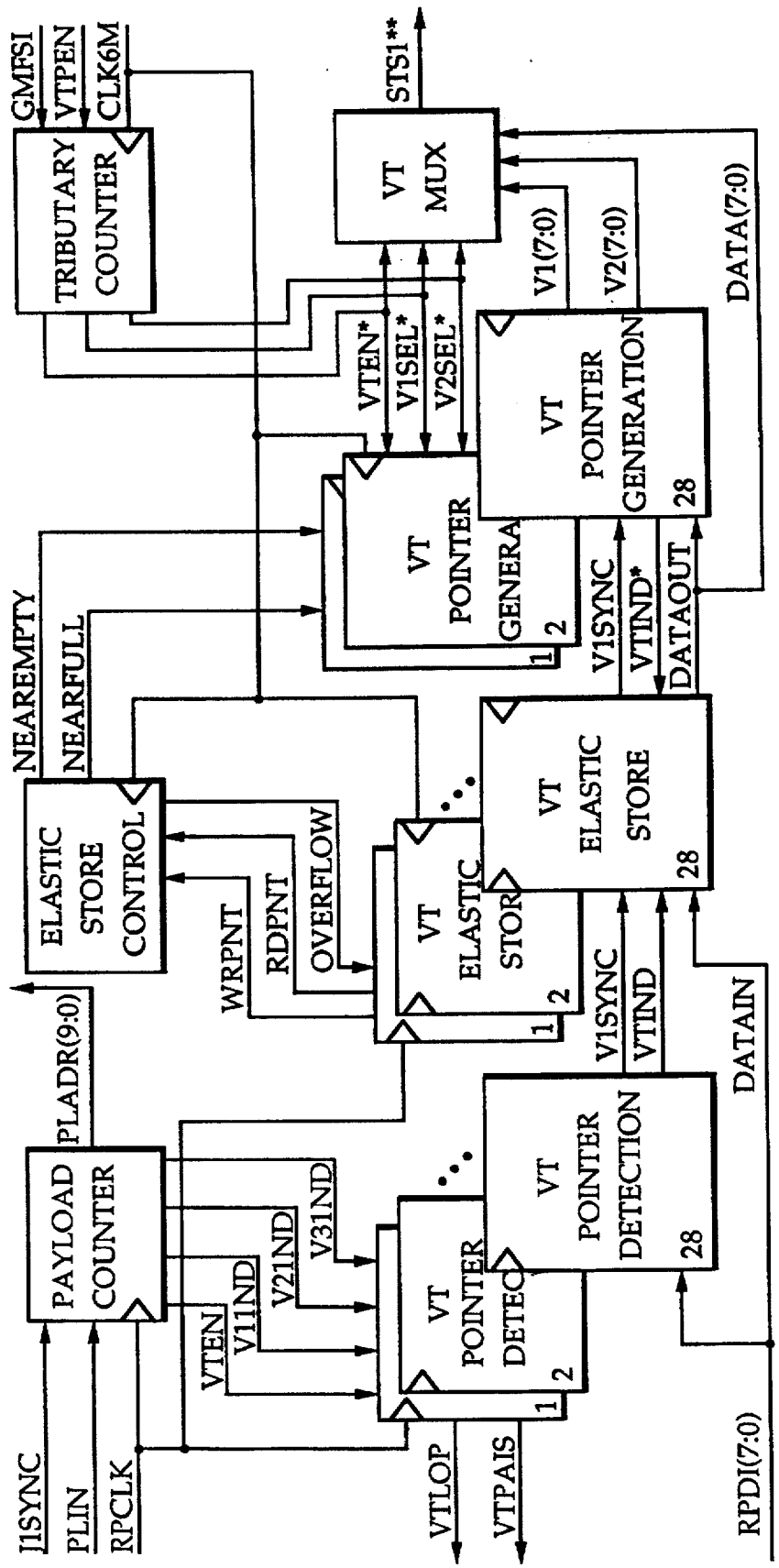
FIG. 14 shows VT pointer processing mode, according to the invention.

In the VT pointer processing mode, the VT pointers are terminated and the elastic store 3 is used to store the V5 synchronization signal and VT payload data for every VT as shown in FIG. 14. The VT pointers are generated by calculating the value between the V2 pointer address and the V5 signal when it appears at the output of the elastic store. As in the STS mode, the reading rate of the elastic store is adjusted to prevent overflows by VT pointer justification. The value of the H1, H2 pointer is set ("locked") to a fixed value in the STS-1** frame, e.g., "522", chosen to make J1 occur after C1. Another choice could as easily be made. The functions related to the VT pointer processing mode are shown in FIG. 14. The main characteristics of VT pointer processing are:

Incoming STS and/or VT pointer adjustment may cause outgoing adjustments in the VT line pointer.

The VT pointer processor converts the jitter in the line rate into the VT pointer adjustments in the network element rate payload.

The wander received in the STS and VT payload is accumulated in the elastic store and converted into the VT pointer adjustments in the network element rate payload.

When a VT LOP or VT path AIS is detected, a VT path AIS is generated in this VT payload data going to the cross-connect or drop modules.

When an active AISGEN input signal is received, or STS LOP or STS path AIS is detected, a VT path AIS is generated for all of the VT payload in the data going to the cross-connect or drop modules.

It should be realized that FIG. 14 merely shows the functions related to the VT pointer processing mode. Actual hardware for carrying out these functions will now be described in detail in connection with FIGS. 4A–4D and other figures. In FIG. 4B, the receive VT timing block 226 will now be discussed in detail in connection with FIG. 15A. The receive VT timing block of FIG. 15A processes the floating payload frame inside the STS-1 frame and detects B3 BIP-8 errors and G1 FEBE counts (reflected BIP-8 errors).

The functions contained in this block are:

STS payload counter 250;

H4 multiframe byte tracking 252;

V1, V2, V3 V4 address decoding 254;

B3 error detection 256, 257 as TX FEBEs;

STS path FEBE removal 258 from G1 path overhead byte; and

STS path yellow detection 260 from G1 path overhead byte.

An 8-bit register 262 is also used to store the C2 path overhead byte.

The J1 sync signal on the line 2k received from the input interface or the STS pointer interpretation circuit 2e resets the STS payload counter 250. The payload addresses are generated to find the STS path overhead and tributary pointer locations. The payload counter 250 counts row and column addresses for 783 bytes of the SPE frame as synchronized with the payload start J1SYNC signal coming from the receive STS-1 timing block 32. It is enabled only during STS payload locations indicated by the PLIN signal on the line 48. A row counter provides a PROW signal on a line 270 which counts between 0–8 to indicate one of the nine rows of an SPE frame and a column counter provides a column count signal on a line 272 which counts between 0–86 to indicate one of the columns of an SPE frame.

The column counter is incremented in every clock cycle when PLIN is active and it is reset to zero when it reaches 86. The row counter is incremented when the column counter is being reset and it is cleared when the column address is 86 and row address is 8. An active J1SYNC input will reset the column counter to 1, and the row counter to zero.

A payload decoder 274 decodes some internal strobe signals from the payload counter row and column addresses. They are active during the row and column numbers given in Table II below.

TABLE II

| | | |
|---|---|---|
| J1ADR | : | row 0, column 0, |
| B3ADR | : | row 1, column 0, |
| C2ADR | : | row 2, column 0, |
| G1ADR | : | row 3, column 0, |
| H4ADR | : | row 5, column 0, |
| COL40 | : | column 40, |
| P782L | : | row 8, column 86, |
| POHIND | : | row 0, 4, 6, 7, 8, column 0, |
| VTPLIN | : | column 1–28, column 30–57, column 59–86, |
| VBYTE | : | column 1–28 for VT1.5, column 1–21 for VT2, column 1–14 for VT3, and column 1–7 for VT6 indicated by VTSIZE inputs, row 0. |
| VPL1 | : | column 30–57 for VT1.5, column 22–28 and 30–43 for VT2, column 15–28 for VT3, and column 8–14 for VT6 indicated by VTSIZE inputs, row 0. |

Figure 15:
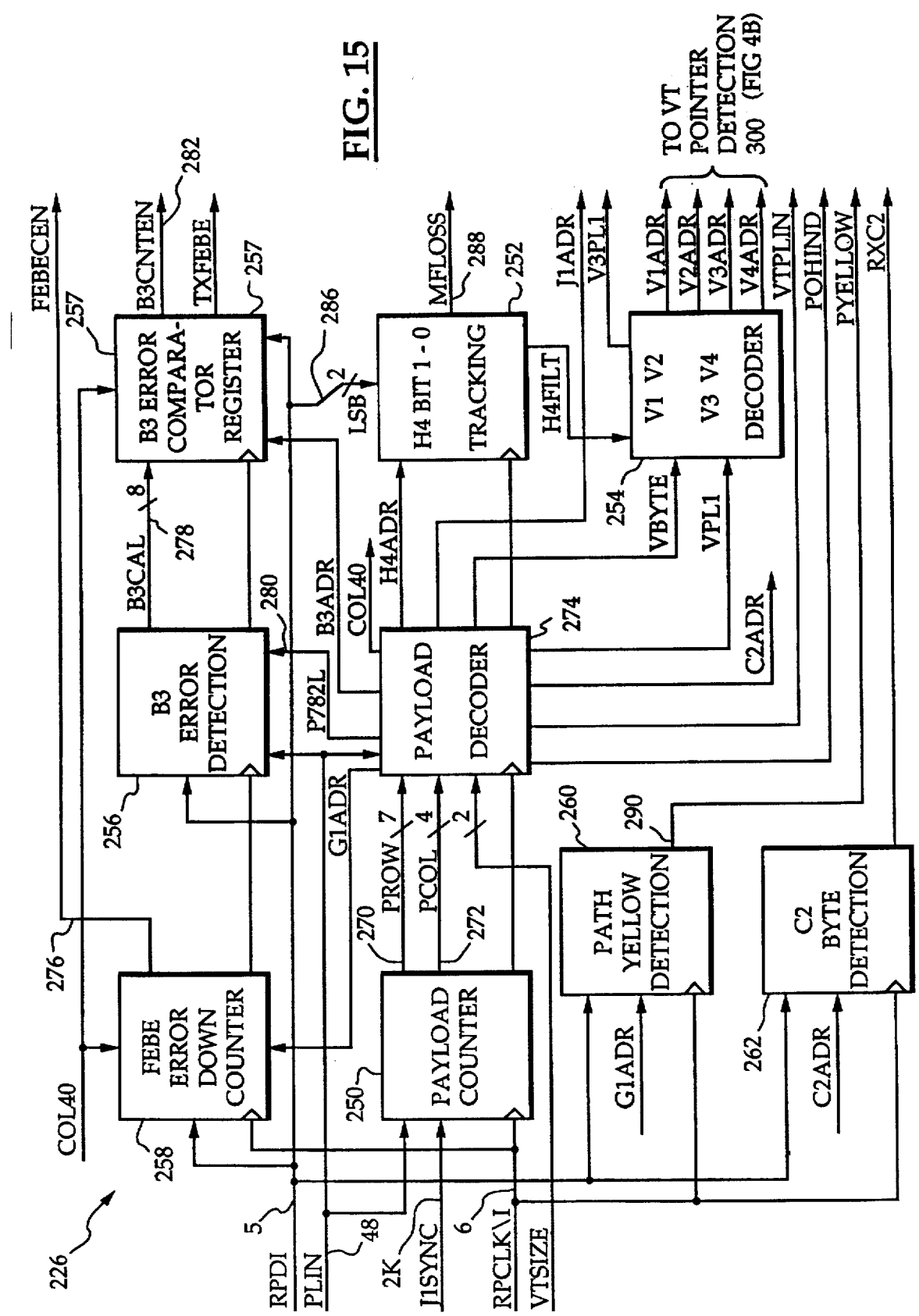
FIG. 15A shows the receive VT timing block, according to the invention.
FIG. 15B shows the H4 pointer tracking algorithm, according to the invention.
Figure 15B:
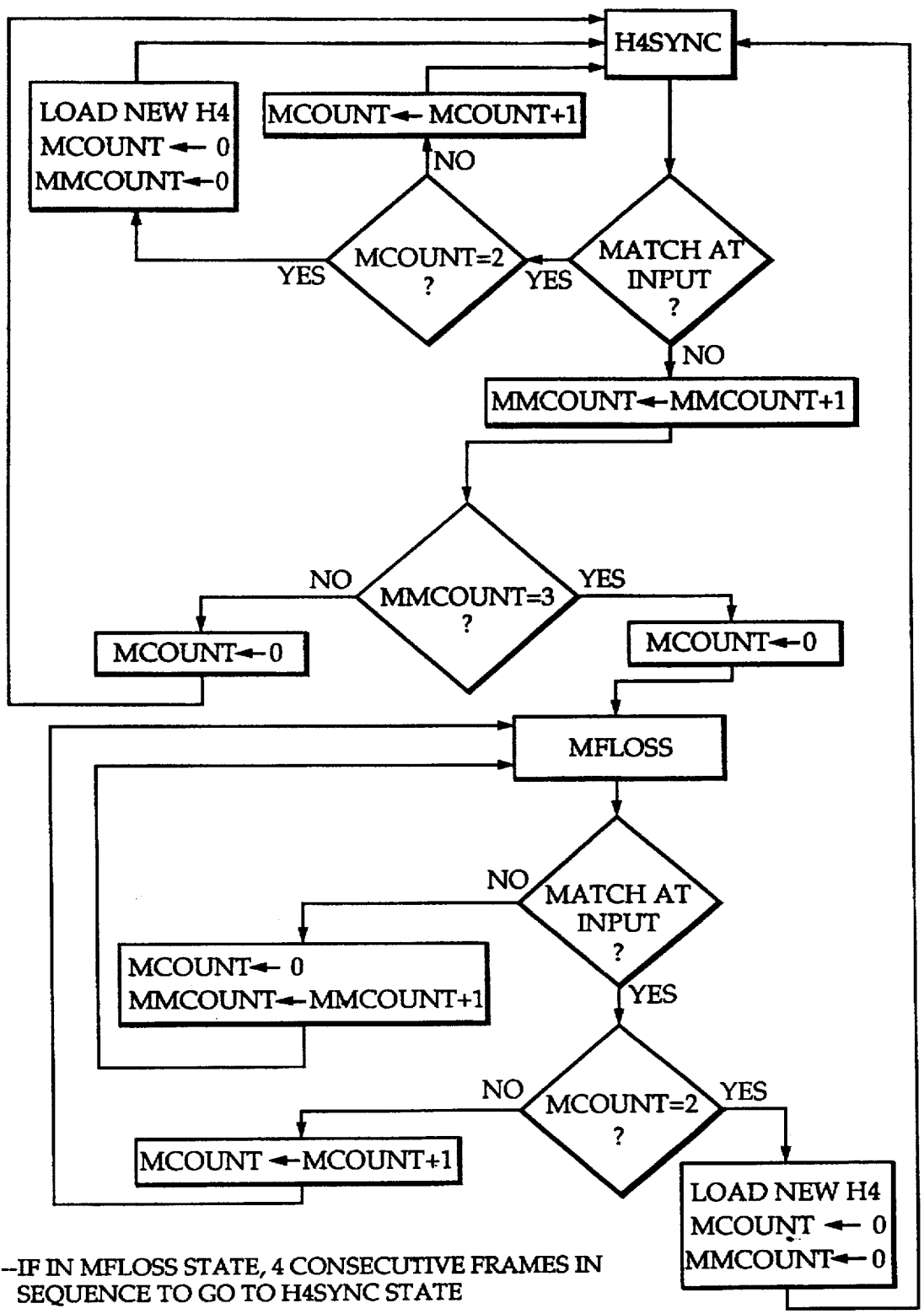

These strobe signals are shown in FIG. 15. The FEBE error down counter 258 receives STS path FEBEs from the incoming data on line 5.

B3 BIP-8 parity is calculated in block 256 on all 783 STS payload bytes when the PLIN signal on the line 48 is active high. A B3 CAL signal is provided on a line 278 to the comparator register 257. An output pulse B3CNTEN on a line 282 is sent to the performance monitoring block, and it is stretched for one extra clock.

The H4 multiframe byte is read from the received data on a line 286 by the tracking block 252. The outputs of a two byte counter therein are synchronized with the received H4 value used as a multiframe indicator. Loss of multiframe is detected if four successive H4 bytes are not correct in sequence. This is indicated by a MFLOSS signal on a line 288.

The V1, V2, V3, V4 decoder block 254 decodes V1, V2, V3, and V4 addresses using the row zero of payload addresses and two byte multiframe indicator for VT pointer processing.

The path yellow detection block 260 is received in the G1 byte bit three position which falls into the SONET G1 byte bit 5. It is filtered for ten consecutive frames and reported to software as indicated by a signal line 290. As indicated previously, an eight bit register 262 is also used to store the C2 path overhead byte.

Turning back to FIG. 4B, it will be seen that the V1–V4 ADR signals from the decoder 254 of FIG. 15A are provided to a VT pointer detection block 300 which will now be described in detail in connection with FIGS. 16–19.

Figure 16A:
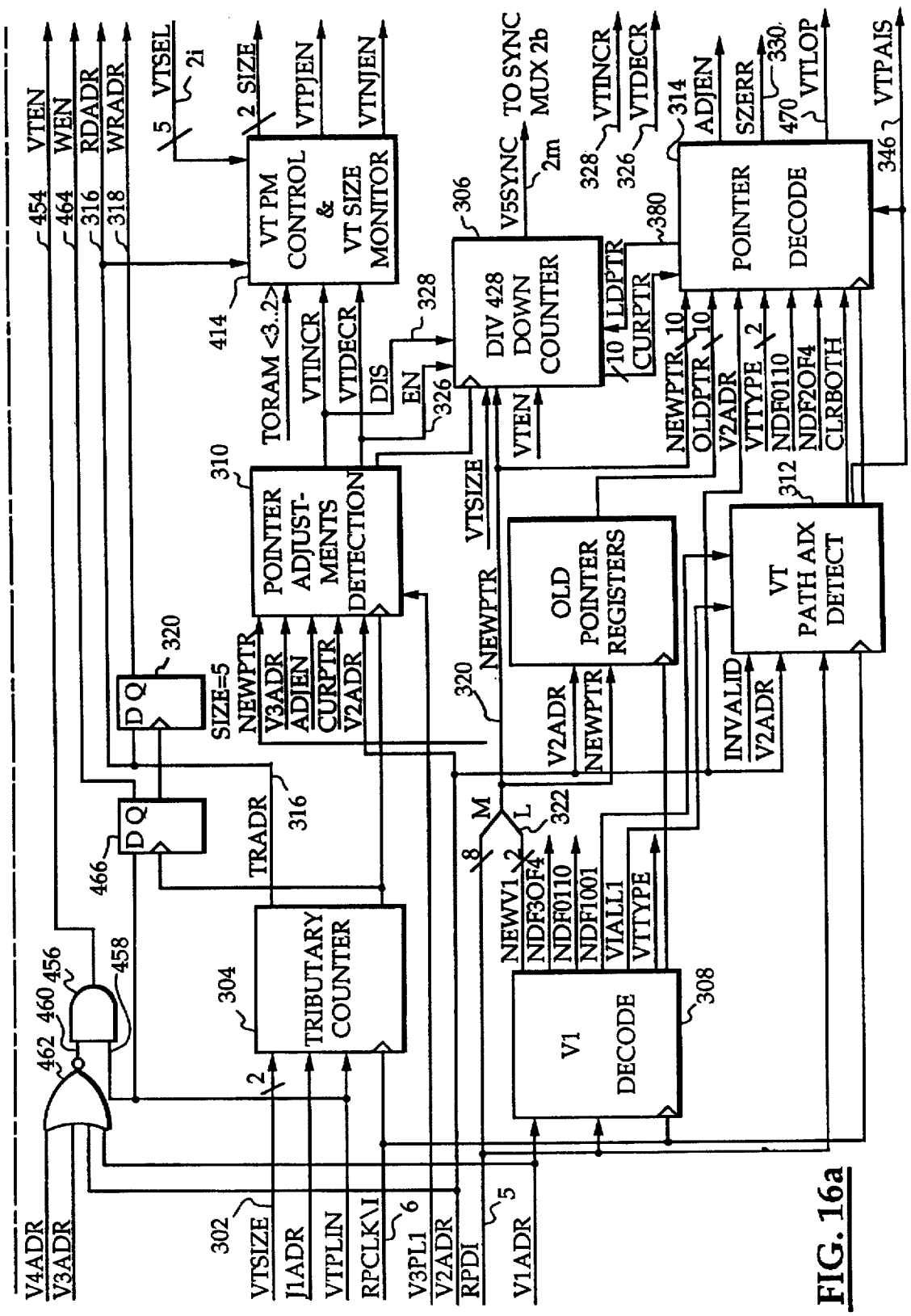

Referring now to FIG. 16a, the VT pointer detection block 300 is shown in detail. The interpretation of the received VT payload pointers are performed in this block 300 in conjunction with a random access memory (RAM) 302 shown in FIG. 4B which may be configured as 32*38 where 28*38 is required in this embodiment.

Figure 18:
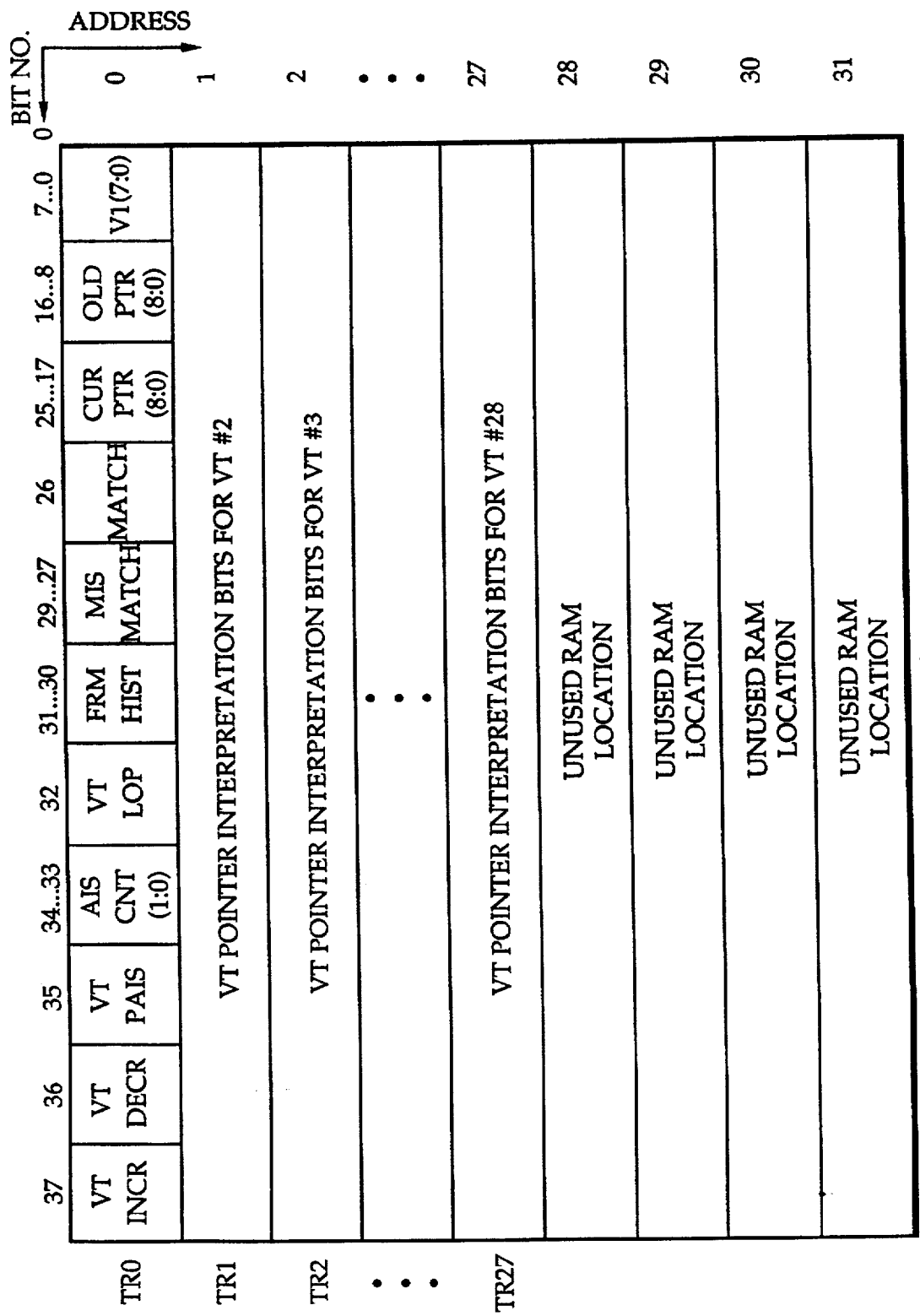
FIG. 18 shows VT pointer interpretation RAM utilization, according to the present invention.
Figure 19A:
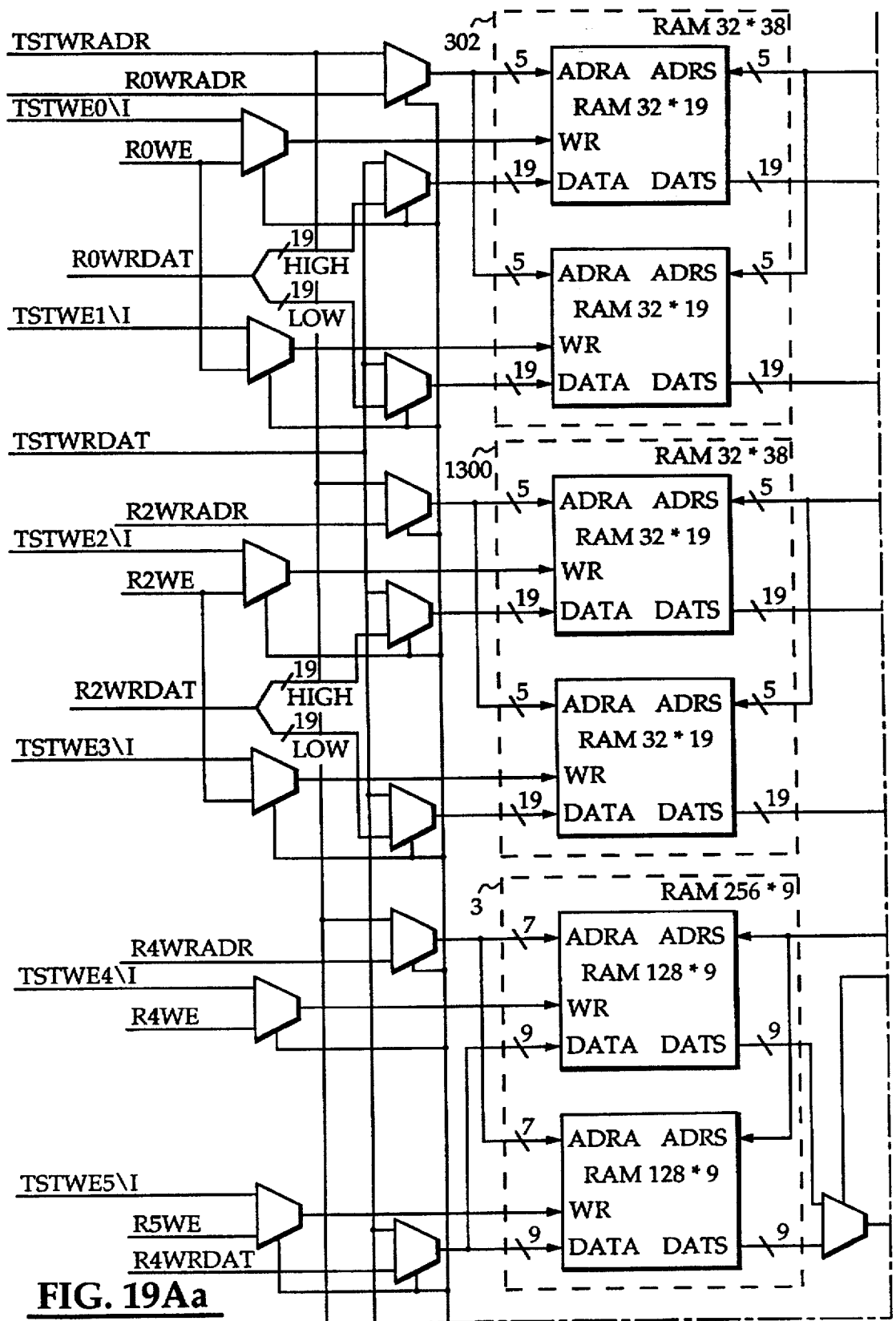
FIGS. 19(a)A and 19(b)B show VT pointer interpretation RAM timing, according to the present invention when viewed together in the orientation indicated by 19(e)
Figure 19A:
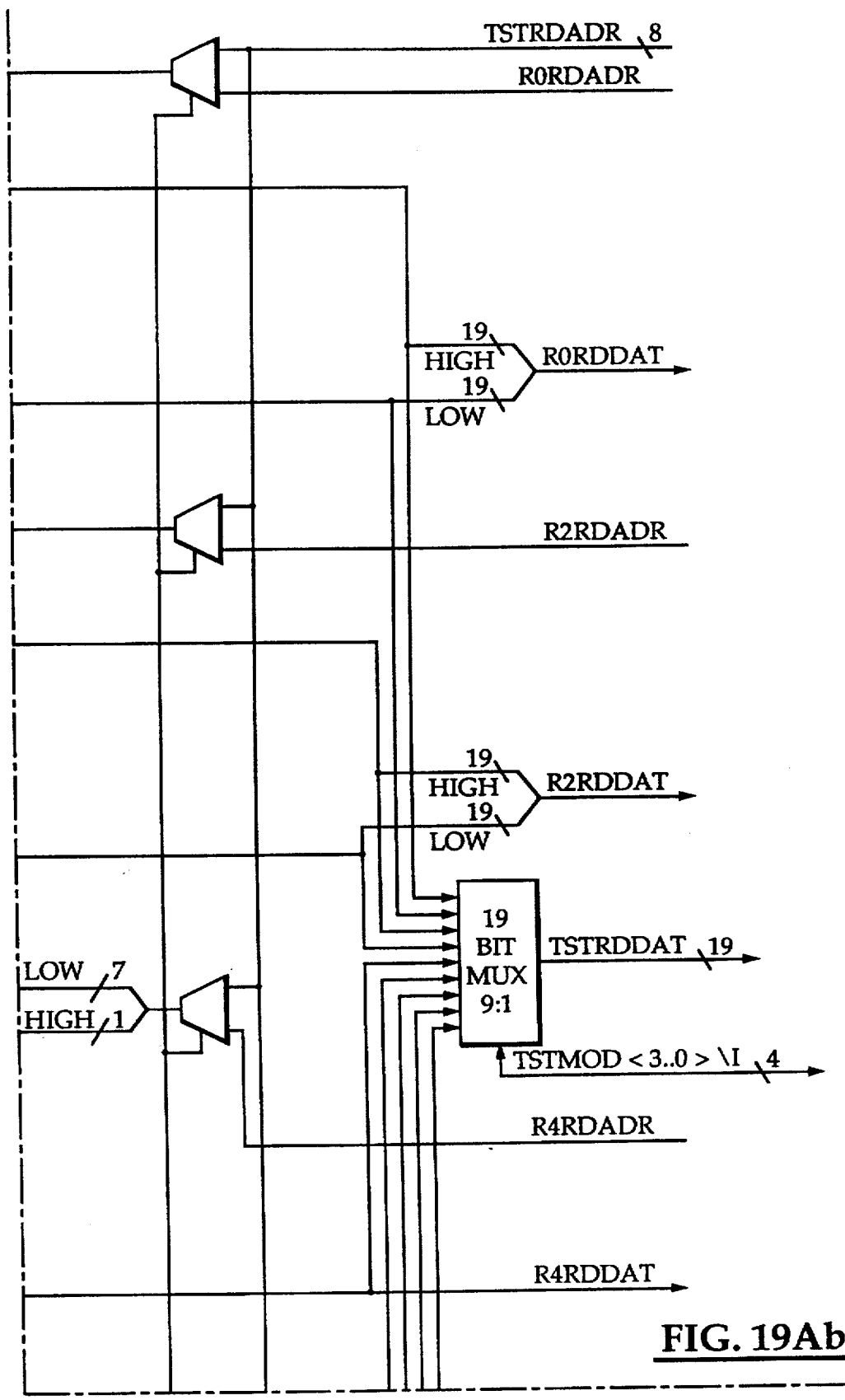
Figure 19A:
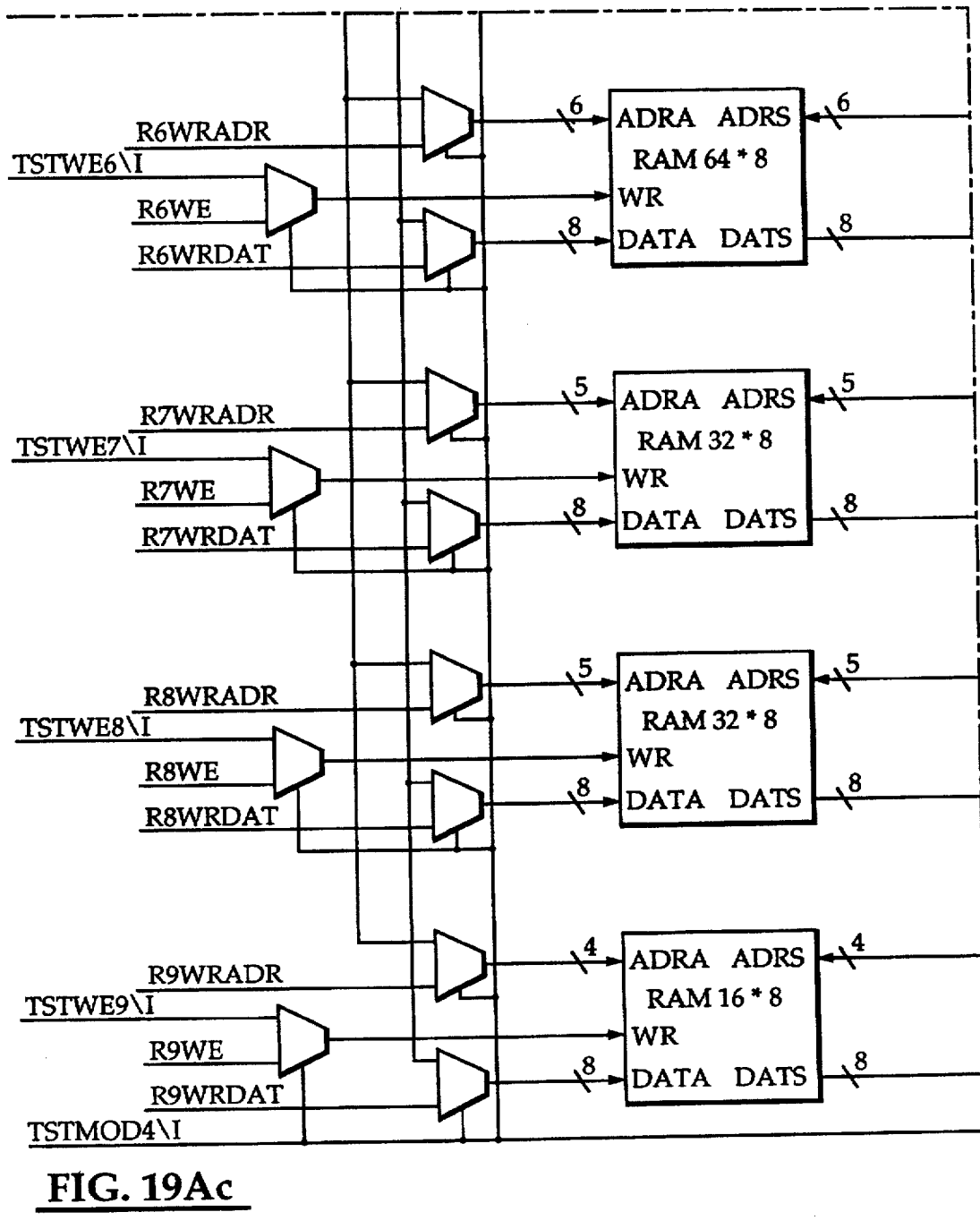
Figure 19A:
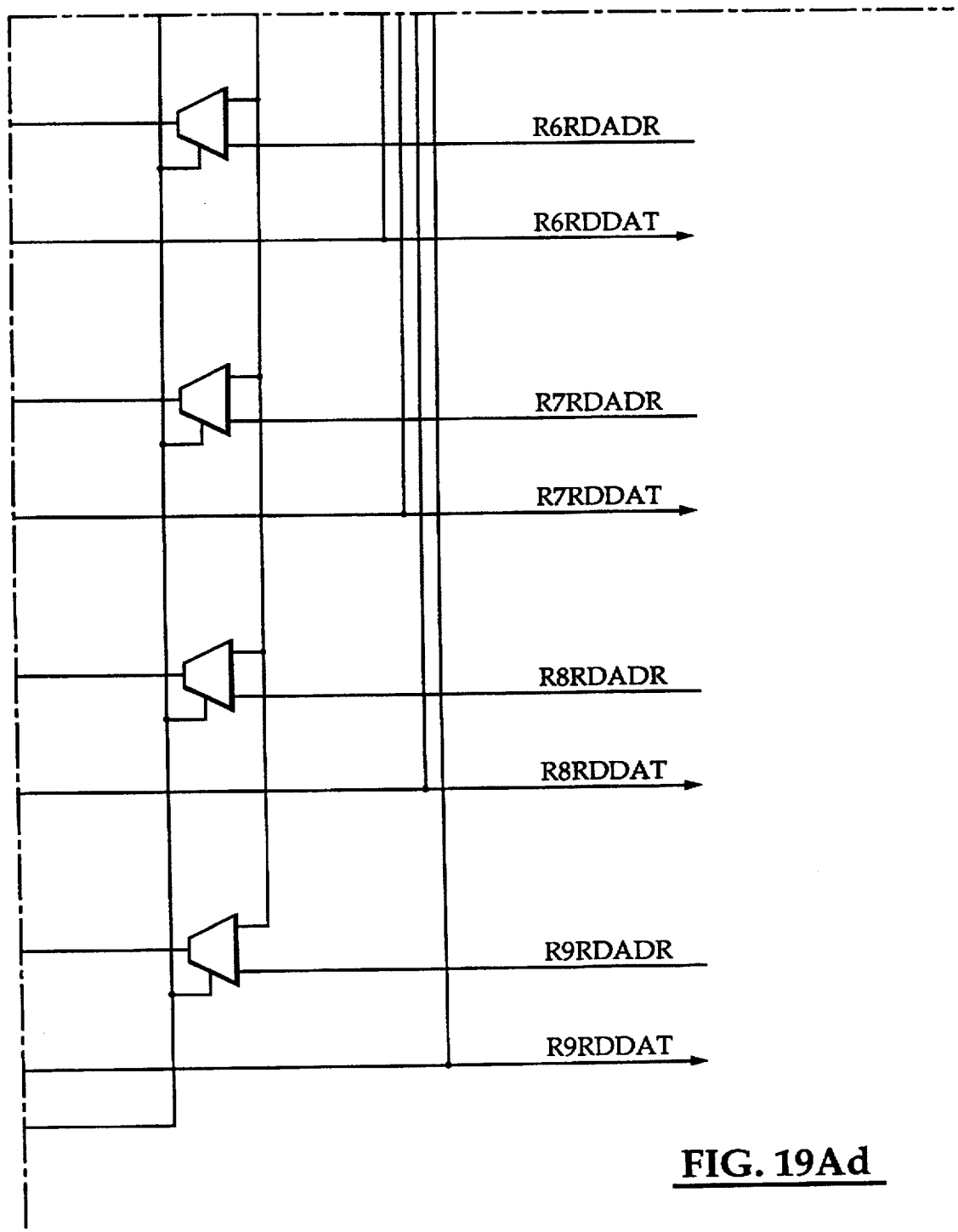

The VT pointer processing circuit 300 of FIG. 16a will be shared by all the tributaries in the payload up to 28 as may be conceptualized by reference to FIG. 14 showing VT pointer detection for the up to 28 separate tributaries in the payload. Each RAM location will store the states of the VT pointer interpretation circuit for a VT. The content of a location may be stored as shown in FIG. 18. The timing of the RAM is shown in FIG. 19 and the RAM organization is shown in FIG. 19A. The RAM contents will be read first and processed and written back one clock later while the other tributary states are being read.

Thus, the circuit 300 may perform up to 28 VT pointer interpretations. Two provisioning bits shown on a line 302 in FIG. 16a define the VT payload as VT 1.5, VT 2, VT 3 or VT 6 payloads. Different size VT groups cannot be processed in the same STS-1 payload.

The functions contained in the circuit 300 are:
tributary counting in a block 304;
VT payload down counting in a block 306 for VT pointer interpretation;
NDF and normal NDF detection of VT pointers in a V1 decode block 308;
VT pointer increment and decrement detection in a block 310;
VT path AIS detection in a block 312; and
VT loss of pointer detection in a block 314.

Thus, VT pointer processing is done individually for each VT. Instead of repeating the same circuit 28 times for VT 1.5, 21 times for VT 2, 14 times for VT 3 or 7 times for VT 6, one circuit is implemented, according to the invention claimed in the above cited copending application "Time Division Multiplexed (TDM) Pointer Processor Architecture and "TDM VT Elastic Store Control", and states related to each tributary are stored in a RAM location. For example, the 28 RAM locations are used for VT 1.5 tributaries.

The tributary counter 304 is a 5 bit programmable counter used to generate the tributary addresses as indicated by a line 316 which will be used as dual port RAM read and write addresses as shown by a read address signal line RDADR on the line 316 and a write address signal line 318 provided by five D flip-flops 320. The counter counts up to 28 for VT 1.5, 21 for VT 2, 14 for VT 3, and 7 for VT 6 indicated by VT SIZE information on line 302 provisioned by software. Thus, the tributary counter is reset with J1 ADR from the Payload Decoder 274 of FIG. 15A and it is enabled only during VT payload locations. The maximum count is 28, 21, 14 or 7, depending on the size of the VT. This counter's outputs are used to address the dual port RAM 302 of FIG. 4B (as previously mentioned). A single port RAM could have been used but would have required address multiplexing and a 2× clock. The VT payload down counter 306 is loaded with the detected V1, V2 pointer value during the V2 byte as provided on a NEWPTR signal on a line 320 being a combination of the RPDI receive parallel data input signal 18 and the two bit NEWV1 signal on a line 322 from the V1 decode block 308. The V5 synchronization signal on the line 2m is provided by the VT payload down counter 306 when it reaches zero. It is enabled only during VT payload locations as controlled by an enable signal on a line 326 and a disable signal on a line 328 from the pointer adjustments detection block 310.

The same rules for STS pointer interpretation apply to VT pointer interpretation, as mentioned in TR-TSY-000253 as modified according to copending application Ser. No. 771, 038.

The VT size is indicated with the bits 3-2 of the V1 byte. Of course, if more sizes need to be designated, such as TO-22 then another bit would be needed. The circuit 300 can interpret the VT payload pointers in four sizes, defined below in Table III.

TABLE III

| Size | CCITT Designation | T1/Bellcore Designation | VT Pointer Range |
|------|-------------------|-------------------------|------------------|
| 00   | TU-21             | VT6                     | 0-427            |
| 01   | no equivalent     | VT3                     | 0-211            |
| 10   | TU-12             | VT2                     | 0-139            |
| 11   | TU-11             | VT1.5                   | 0-103            |

The circuit 300 detects VT path AIS and VT LOP for every tributary, but a separate VT size error will not be generated. Software is able to monitor the size bits of a VT pointer and detect a VT size error condition.

When the data flag (NDF) is set it indicates a new pointer value. It is detected using a majority logic in the block 308. NDF active is 1001 and normal NDF is 0110 in the most significant four bit positions of V1. The active NDF decoding shall be performed by accepting NDF set to "1001" if at least three bits match.

Figure 17A:
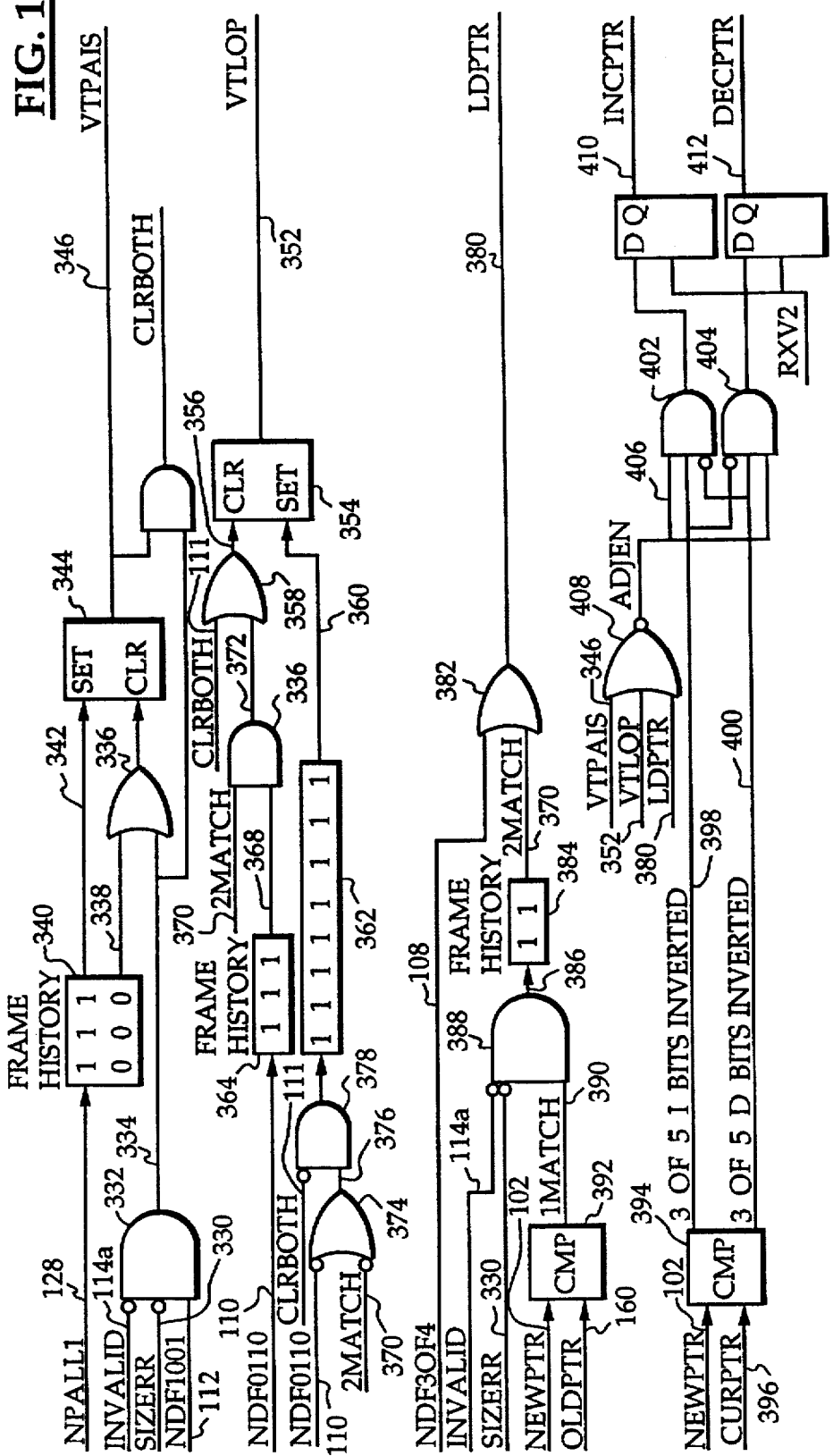

FIGS. 17a and 17b together show the VT pointer interpretation algorithm which is implemented in the circuit 300 of FIG. 16a. Thus, the algorithm for providing the outputs of the V1 decode block 308 is shown in FIG. 17b wherein the V1 decode block 308 is responsive to the V1ADR signal from the V1, V2, V3, V4 decoder 254 of FIG. 15A and is also responsive to the data signal on the line 18 and the clock signal on the line 6. Upon detecting any of the conditions satisfying the NDF30F4 condition, the NDF1001 condition or the NDF0110 condition, the appropriate signal will be provided as shown in FIG. 16a from the block 308 and as used as inputs in the algorithm shown in FIG. 17b.

Thus, the new data flag NDF1001 on the line 112 is provided along with the invalid signal on the line 114 and a SIZERR signal on a line 330, indicative of a size error in the pointer, to a gate 332 for providing a trouble signal on a line 334 to an OR gate 336 which receives another input on a line 338 from a frame history block 340. The NPALL1 signal on the line 128 is provided to the frame history block 340 for providing an output signal on a line 342 in the event that three consecutive "all ones" have occurred in the pointer bytes. The signal on the line 338 is provided in the event that three consecutive "not all ones" have occurred. The signal on the line 342 is provided to a SC flip-flop 344 to the set terminal while the output of the OR gate 336 is provided to the clear input. The output of the flip-flop 344 is a VTPAIS signal on a line 346 which is provided by the VT path AIS detect block 312 to the pointer decode block 314 and also several bits of which are provided on a line 348 as shown in FIG. 4 to an alarm registers LOP path AIS VT size block 350. A VTLOP signal on a line 352 is provided as shown in FIG. 17a in response to the NDF 0110 signal on the line 110, i.e., the normal NDF being the most significant four bit positions of V1 in the configuration "0110". The VTLOP signal on the line 352 is provided by a SC flip-flop 354 responsive to a signal on a line 356 from an OR gate 358 and a set signal on a line 360 from a frame history block 362. The VTLOP signal on the line 352 is detected if three consecutive matching pointers have not been observed for eight consecutive opportunities or eight consecutive pointers received as NDF is set as shown in the block 362. Also, the SONET equipment shall exit at an LOP state when a valid pointer with normal NDF is detected in three consecutive VT superframes as shown in another frame history block 364. This is transmitted to an AND gate 366 by a signal on a line 368 which is ANDed with a 2MATCH signal on a line 370 for providing a signal on a line 372 to the OR gate 358 which is also responsive to the CLRBOTH signal on the line 111. The CLRBOTH signal is from AND gate and indicates removal of VTPAIS due to active NDF. The 2MATCH signal on the line 370 is generated during the LDPTR generation process in the pointer decode block 314, will be described subsequently and signifies occurrence of three consecutive matching valid pointers. It is combined with the signal on the line 368 from the frame history block 364 in the AND gate 366 to indicate same with three consecutive normal NDF. The NDF0110 signal on the line 110 is combined with the 2MATCH signal on the line 370 in a gate 374 to provide a signal on a line 376 indicative of same, or normal NDF not observed, to a gate 378.

An LDPTR signal on a line 380 is provided by the pointer decode block 314 of FIG. 16a and as also shown in FIG. 17a. There, an OR gate 382 is responsive to the NDF 3 of 4 signal on the line 108 and the 2MATCH signal on the line 370 from a frame history block 384 responsive to a signal on a line 386 from a gate 388. A 1MATCH signal on a line 390, the SIZERR signal on the line 330 and the INVALID signal on the line 114a are all provided to the gate 388 in order to provide the signal on the line 386 which signifies the occurrence of two consecutive matching valid pointers with correct size bytes to the frame history block 384. The 1MATCH signal on the line 390 will be provided by a comparator 392 in response to a comparison between the NEWPTR signal on the line 102 and the OLDPTR signal on the line 160 indicating occurrence of two consecutive matching pointers. If either the 2MATCH signal on the line 370 or the NDF 3 of 4 signal on the line 108 indicate the pointer value is acceptable then the LDRPTR signal on the line 380 is provided to the DIV428 down counter block 306 as shown in FIG. 16a. This provides the down counter with new synchronization or reinforcement of existing synchronization.

Similarly, a comparator 394 is responsive to the NEWPTR signal and a CURPTR signal on a line 396 which represents a test of the incoming pointer and the last accepted pointer for synchronization and provides a 3 OF 5 I BITS INVERTED signal on a line 398 in the event pointer increment or a 3 of 5 D bits inverted signal on a line 400 in the event pointer decrement signifying 3 of 5 bit majority vote.

The signal on the line 398 is provided to a gate 402 and the signal on the line 400 is provided to a gate 404 for the purpose of being gated with an ADJEN signal on a line 406 being to prevent increment or decrement from taking place during AIS, LOP or resynchronizing conditions. An NOR gate 408 provides the ADJEN signal on the line 406 in response to any one of the signals VTPAIS on line 346, VTLOP on the line 352 or LDPTR on the line 380 being present. The gate 402 is also responsive to an inverted signal from the line 400 and the gate 404 is responsive to an inverted version of the signal on the line 398. Thus, the gate 402 or the gate 404 will provide an INCPTR signal on a line 410 or a DECPTR signal on a line 412 if it is found that both increment and decrement are not detected at the same time. These represent the same signals as the VTINCR signal on the line 328 in FIG. 16a and 16b and the VTDECR signal on the line 326 in FIG. 16a and signify a pointer adjustment should take place and cause the elastic store to become more full or empty. These signals are provided to both the DIV 428 down counter 306 and a VTPM control and VT size monitor block 414 in FIG. 16a.

The signals represented at the top of FIG. 16b from RAM on a line 416 and to RAM on a line 418 are for the purpose of storing the state of each VT until the next frame so that the hardware may be reused by each VT without having to replicate it 7, 14, 21 or 28 times.

The VT performance monitoring control block 414 of FIG. 16b selects the pointer increment and decrement indication pulses for one virtual tributary determined by the 5-bit VT Number signal 2i from a microcontroller (not shown) and sent to the performance monitoring block. The selected tributary numbers are given in Table IV below and are related to VTSEL information on the line 2i at the microcontroller interface. The increment and decrement pulses 328, 326 will increment VT positive justification or VT negative justification counters in the performance monitoring block for the selected VT.

TABLE IV

| VTSEL | VT NO | VTSEL | VT NO |
|---|---|---|---|
| 00000 | VT #1 | 00001 | VT #2 |
| 00010 | VT #3 | 00011 | VT #4 |
| 00100 | VT #5 | 00101 | VT #6 |
| 00110 | VT #7 | 00111 | VT #8 |
| 01000 | VT #9 | 01001 | VT #10 |
| 01010 | VT #11 | 01011 | VT #12 |
| 01100 | VT #13 | 01101 | VT #14 |
| 01110 | VT #15 | 01111 | VT #16 |
| 10000 | VT #17 | 10001 | VT #18 |
| 10010 | VT #19 | 10011 | VT #20 |
| 10100 | VT #21 | 10101 | VT #22 |
| 10110 | VT #23 | 10111 | VT #24 |
| 11000 | VT #25 | 11001 | VT #26 |
| 11010 | VT #27 | 11011 | VT #28 |

The size bits of any VT pointer V1 byte can be monitored using the same VTSEL information bits mentioned above. Software is required to filter the VT performance monitoring information following the reading of a VT size.

Referring back to FIG. 4, each tributary will have a part of the elastic store 3 organized as 8*9 to store 8-bit data on the line 5 and a 1-bit V5 SYNC on the line 2m. A separate 3-bit counter is provided for each of the 28 VTs in a VT elastic store counters block 450. Since a single dual port RAM (DPR) is organized as 28 elastic stores, the outputs of these counters are multiplexed (shown in FIG. 20) to output one 3-bit partial RAM address at a time on a line 452. The 3-bit partial RAM address on the line 452 is combined with a 5-bit VT Number signal on the line 2i to form a complete RAM address on the line 2f. Thus, the multiplexer 2g of FIG. 1a may be implemented in this manner. Also provided by the VT pointer detection block 300 is a VTEN signal on a line 454 being provided by an AND gate 456 in response to a VTPLIN signal from the payload decoder 274 of FIG. 15A on a line 458 signifying VT payload time slots excluding V1, V2, V3 and V4 time slots, and a signal on a line 460 from a NOR gate 462 being responsive to the V1–V4 ADR signals from the receive VT timing block 226, as previously discussed. It is provided to the VT Elastic Store Counters 450 and the purpose of the VTEN signal is to enable the counter to increment during those time slots.

The VT elastic store counters are shown in detail in FIG. 20. Twenty-eight 3-bit counters 463a are used to generate the twenty-eight 3-bit VT elastic store addresses on the 84-bit line 2h. Since 28 VT elastic stores are built in a single dual port RAM of FIGS. 19A a multiplexer 463b is used to output one 3-bit partial RAM address at a time. Each of the 28 counters 463a is incremented in its VT time slot by a hard-wired pulse on a line 463c from a demultiplexer 463d which is responsive to the VT# (TRADR) signal on the line 2i and to an enable (EN) signal on a line 463e.

The VTEN signal on the line 454 provides the EN signal on the line 463e in the presence of a VTINCR signal on the line 328 as provided by an OR gate 463f and a gate 463. The presence of a VTDECR signal on the line 326 will result in the EN signal on line 463e being provided by virtue of OR gate 463f.

The VTINCR and VTDECR signals of FIG. 16a on the lines 328, 326, respectively, from the pointer adjustments detection block 310 provide the counters block 450 with the above described signals for the purpose of writing the V3 byte into the elastic store in the case of a decrement, or not writing the VT byte after V3 (V3 plus 1) in the case of an increment.

A write to enable (WEN) signal on a line 464 of FIG. 16a is provided by the VTPLIN signal from a D flip-flop 466 as triggered by the RPCLK/1 signal on the line 26. The WEN signal on the line 464 is provided for the purpose of enabling a write operation to the State RAM 302 and the timing thereof is shown in FIG. 19(e).

Additional VT pointer interpretation RAM timing is shown in FIG. 19(a)–(d).

Figure 31A:
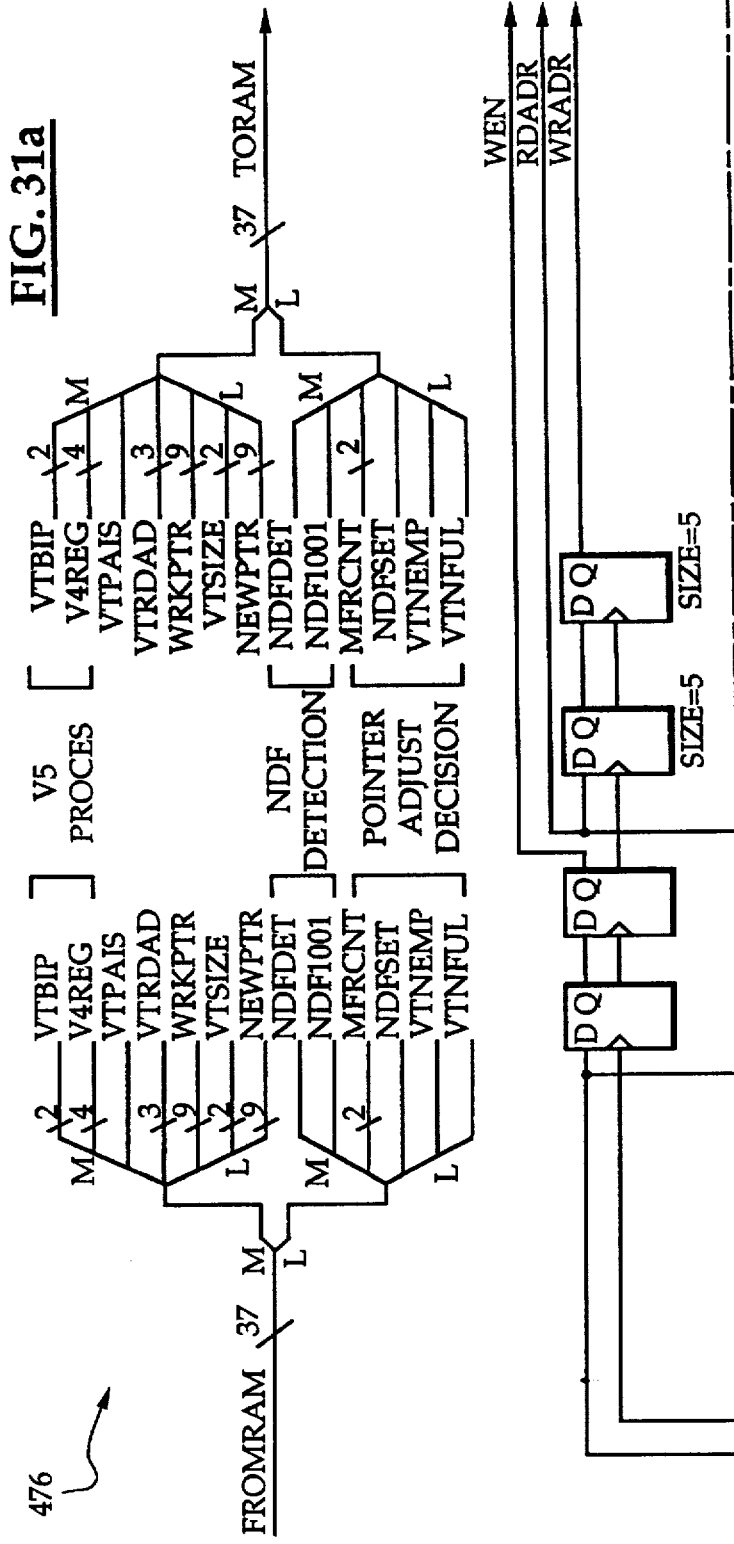
FIGS. 31a, and 31b when viewed together in the orientation indicated by FIG. 31, show the VT pointer generation block in more detail, according to the present invention.
Figure 31B:
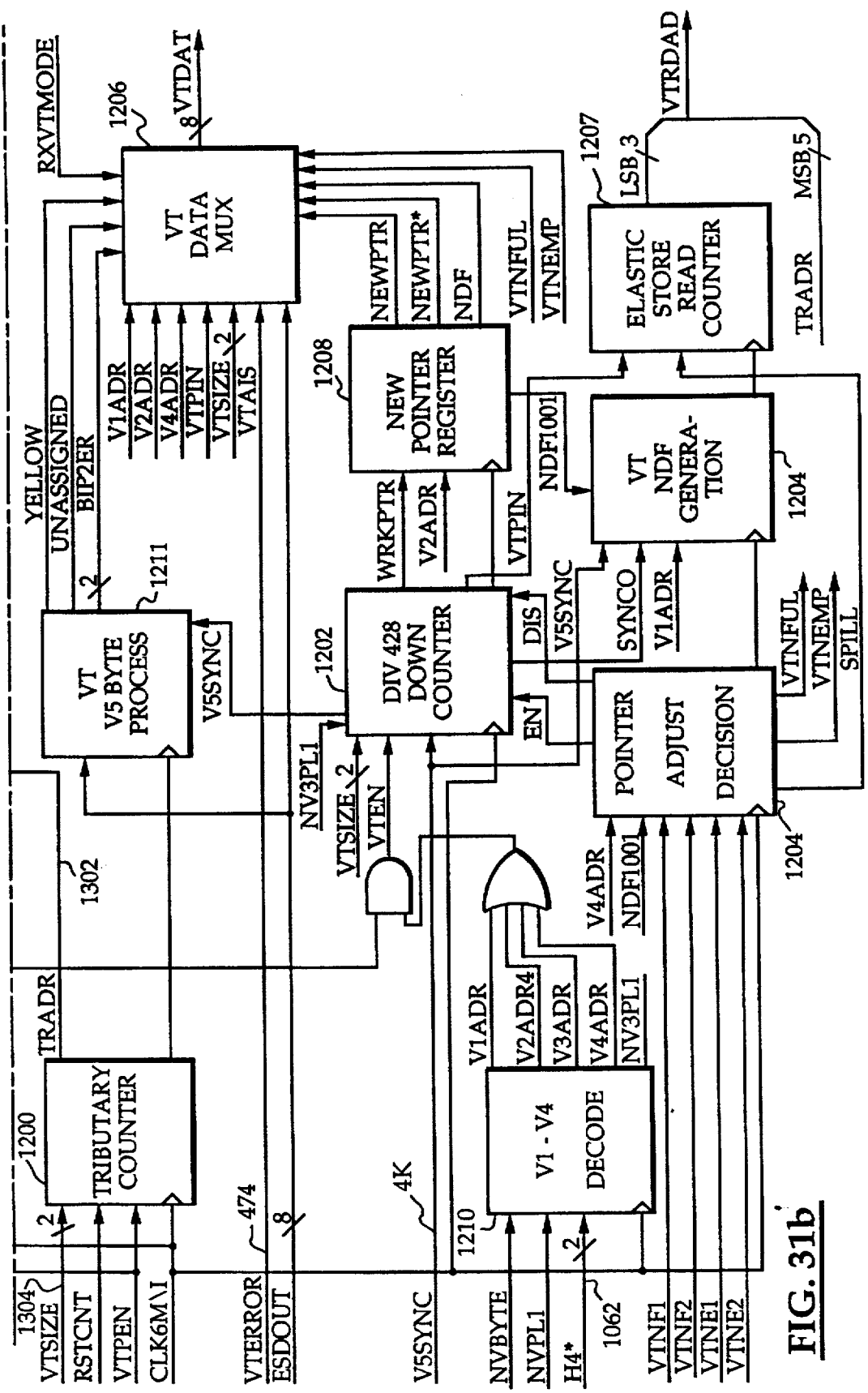

Returning to FIG. 4, the VT alarm registers block 350 stores two alarm signals for each independent VT pointer. VT path AIS on the line 346 and VTLOP on a line 470 are stored into flip-flops synchronously in the corresponding VT time slots. Once these flip-flops are set, they are not reset until they are read. They are read out on a line by the microprocessor interface as 4-bit groups carrying information for two VTs. If one of the VT path AIS or VTLOP bits is active, a VT error is generated and stored in a separate register set whose outputs are provided on a line 474 and multiplexed with the tributary addresses in a VT Data Multiplexer of a VT pointer generation block 476 shown in FIG. 4D and FIG. 31b in detail.

Figure 21:
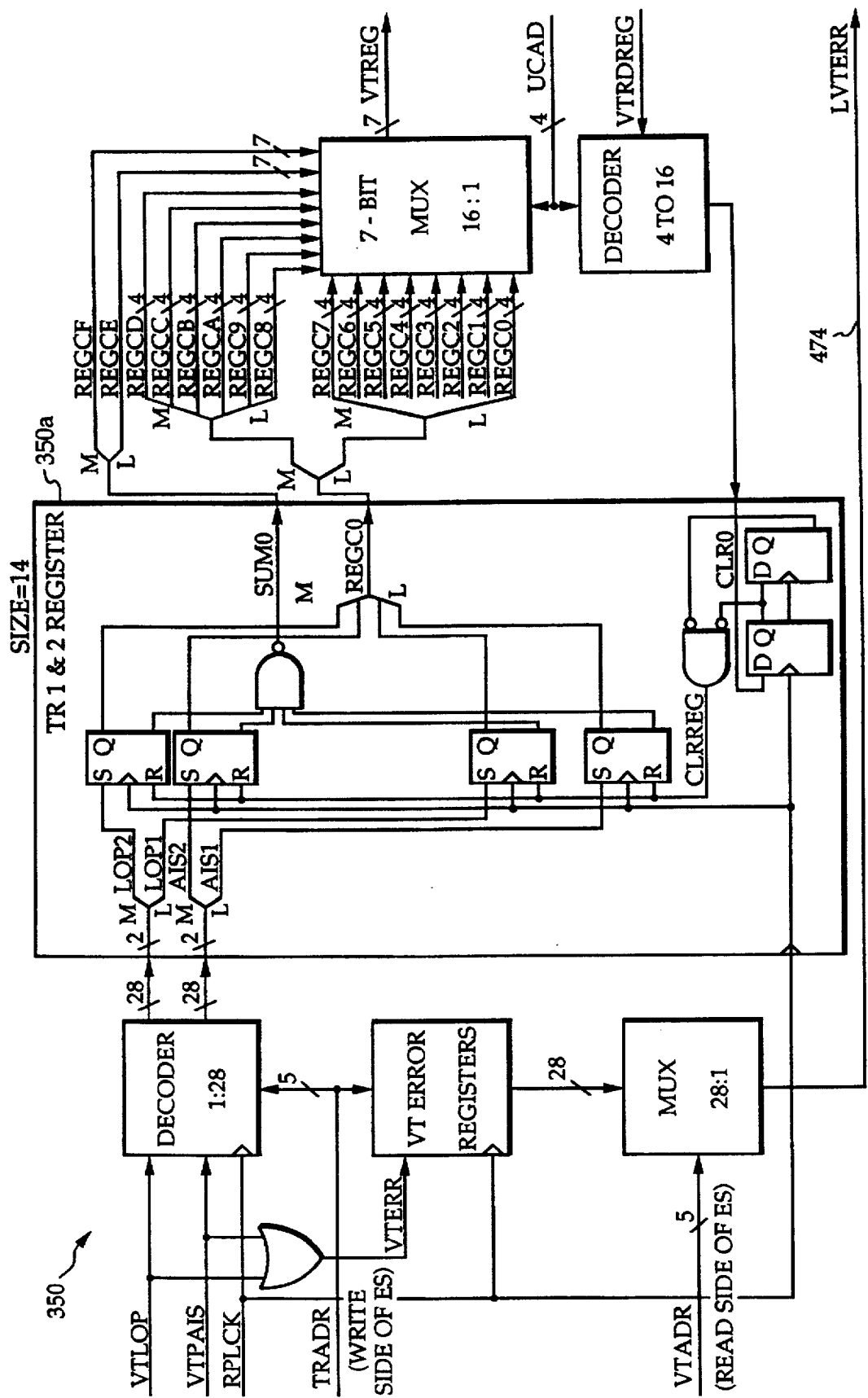
FIG. 21 shows a VT alarm register block, according to the present invention.

The 2-bit error information is stored in Registers 350a for each VT for microcontroller interface: VTLOP and VTPATH AIS. Registers 350a are each configured to contain information on two VT's in one byte for a total of 14 bytes and they are cleared with a microcontroller read access. A summary bit is generated for every byte and they are configured as bits of two microcontroller interface address locations as shown in FIG. 21. The VTLOP and VTPATH AIS are combined and stored separately to generate a VT error to force VT path AIS insertion in the VT pointer generation block 476.

The elastic store block 3 utilizes a 256*9 RAM as 1 STS or 28, 21, 14 or 7 independent VT elastic stores as shown in FIG. 19A(a). The RAM is partitioned so every VT has eight, 9-bit wide locations. In the STS pointer processing mode, another 16 RAM locations are used while the last 16 locations are not used.

Two separate elastic store monitors 3a, 3d are used to monitor the elastic store 3 for STS pointer processing and VT pointer processing modes. In the STS pointer processing mode, a write address is decoded to generate one window for near-full detection and another window for near-empty detection. This window is compared with the read side address. An STS pointer justification request is generated if the read address reaches eight during one of the write windows.

A dual port RAM configured as 256*9 is used as an elastic store as shown in FIG. 19Aa. The address locations between 0–223, as shown in FIG. 18, are configured as 28 VT elastic stores and 224–239 as STS elastic stores.

Figure 23:
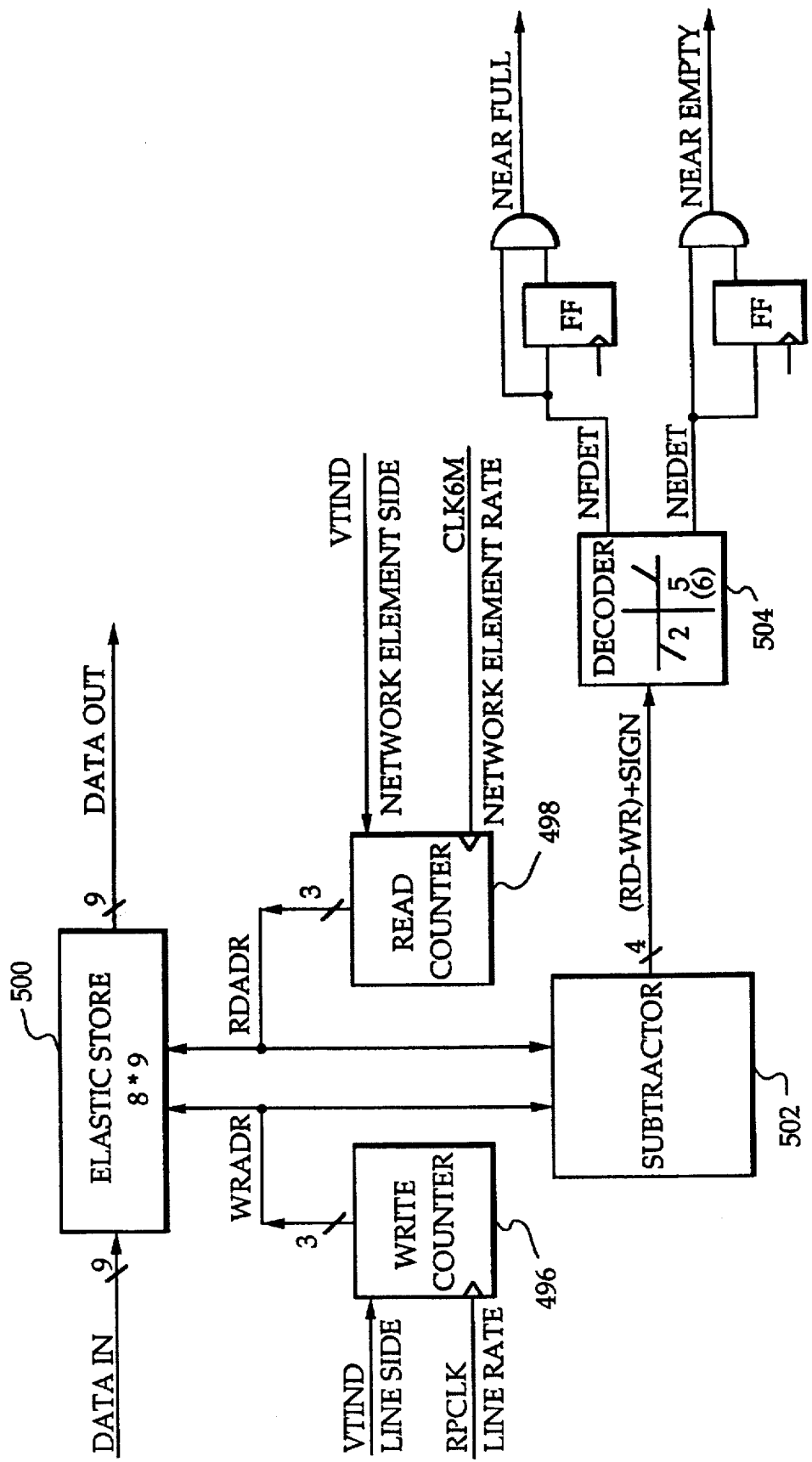
FIG. 23 shows VT elastic store and control, according to the present invention.

FIG. 23 shows a control algorithm for a VT elastic store 500, being a part of the elastic store 3 shown in FIG. 19Aa.

Figure 24:
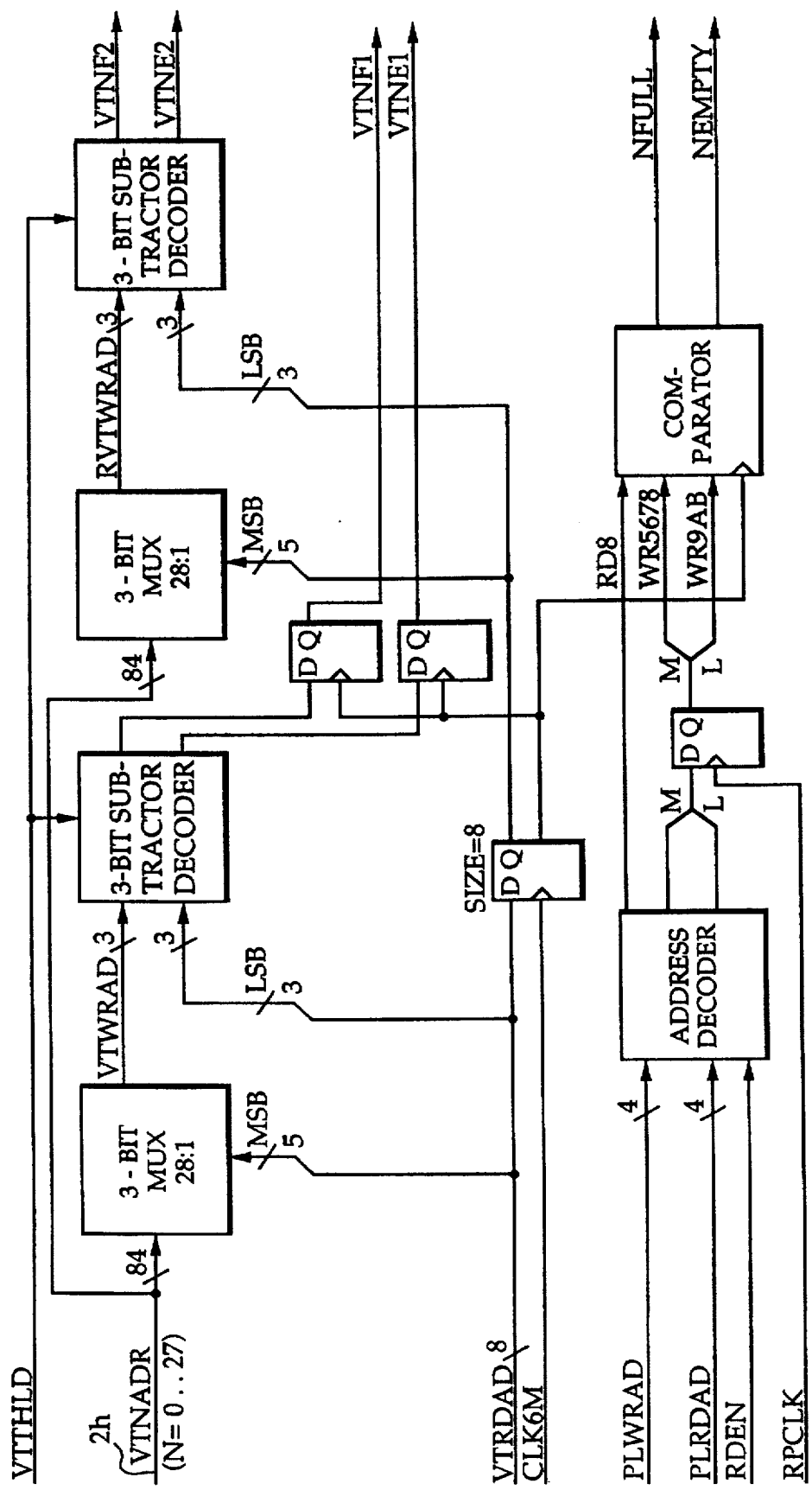
FIG. 24 shows elastic store monitor block, according to the present invention.

One VT elastic store control circuit is shared by 28 VTs. The near-full and near-empty detections 501 are performed two times on the same VT as represented in FIG. 23 and as shown in detail in FIG. 24. A pointer increment or decrement decision will be given if this condition presists for two consecutive clock periods.

As shown in a subtractor 501 block in FIG. 23, VT elastic store write addresses from write counter 496 are subtracted from the read addresses during the period when a particular VT is addressed in the network rate STS1** frame and the result is sent to a decoder (filter) 502. Near-full and near-empty decisions are given related to the subtraction result. If the result is 0–1 a near-full decision is given; if the result is 6–7 a near-empty decision is given. The decoder can also be controlled with a provisioning bit VTTHLD so the near-empty condition is detected if the result is 5, 6, 7.

Similarly, the STS elastic store control circuit compares the window generated during the write addresses 5 5, 6, 7 and 8 with the read pointer value 8 and overlap causes to near-full detection. The near-empty decision is given if the window generated during the write address is 9, 10, and 11 overlaps with the read pointer value 8.

Figure 25A:
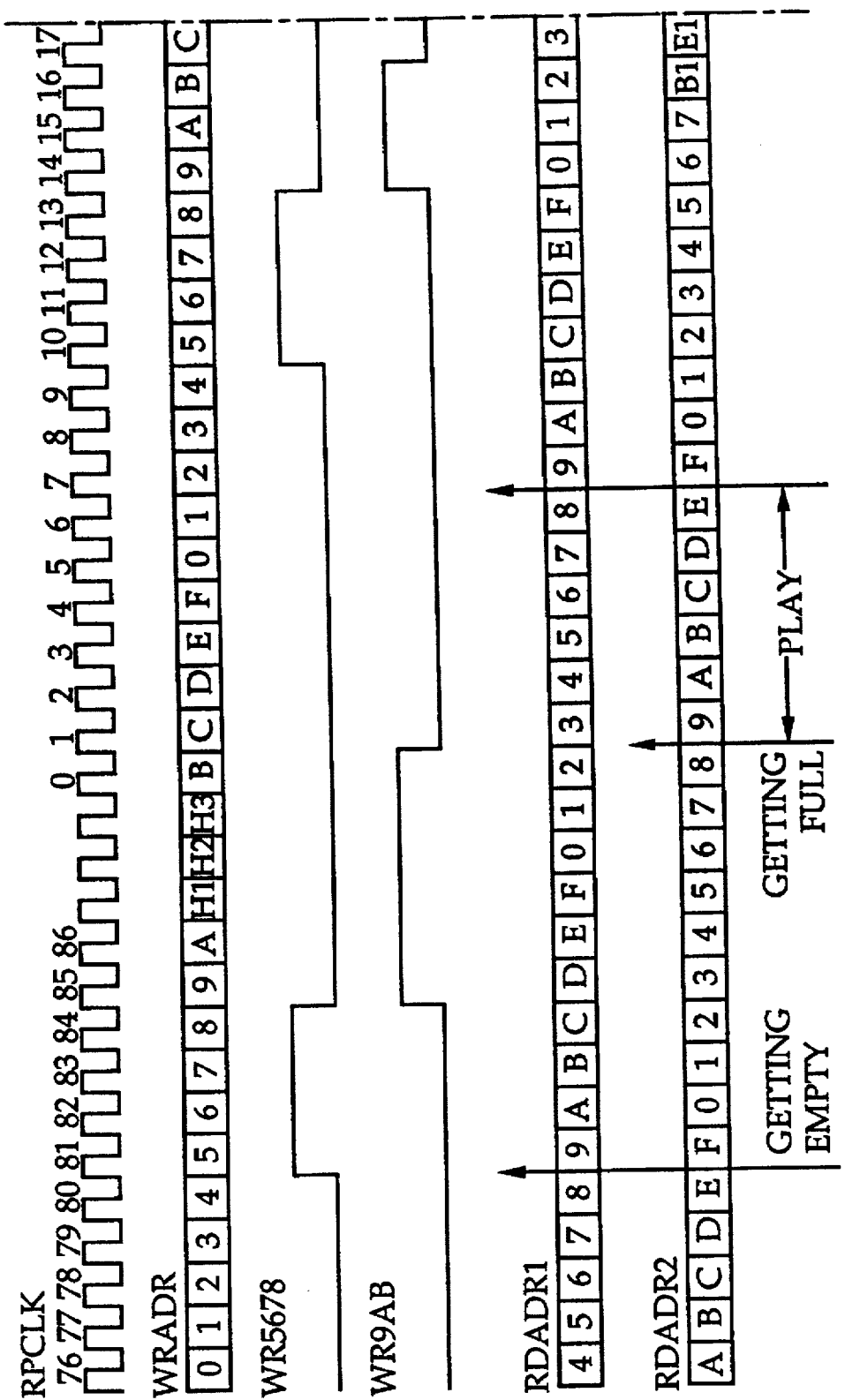
FIGS. 25a, 25b, and 25c when viewed together in the orientation indicate by FIG. 25, show STS elastic store monitor timing, according to the present invention.
Figure 25B:
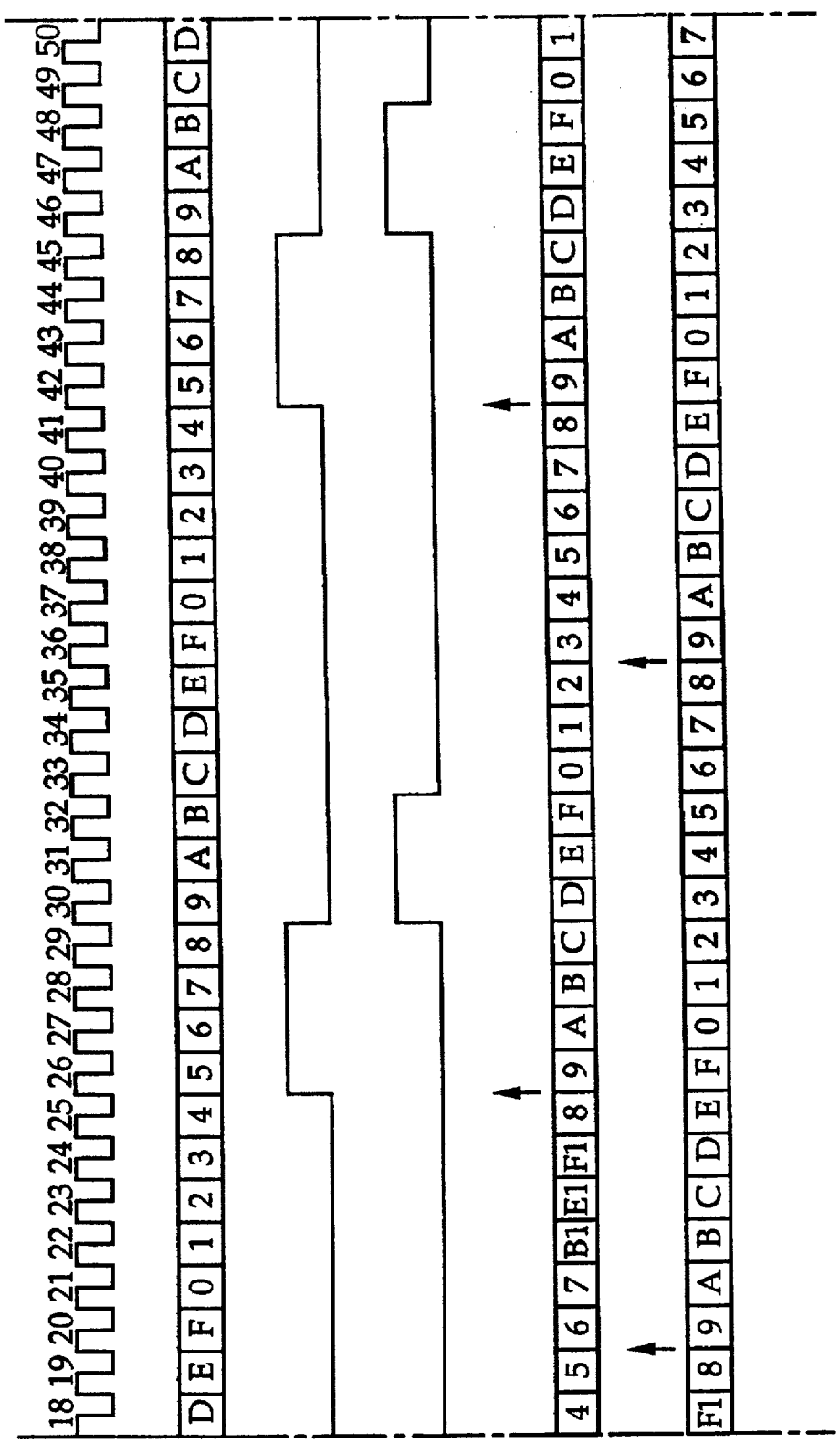
Figure 25C:
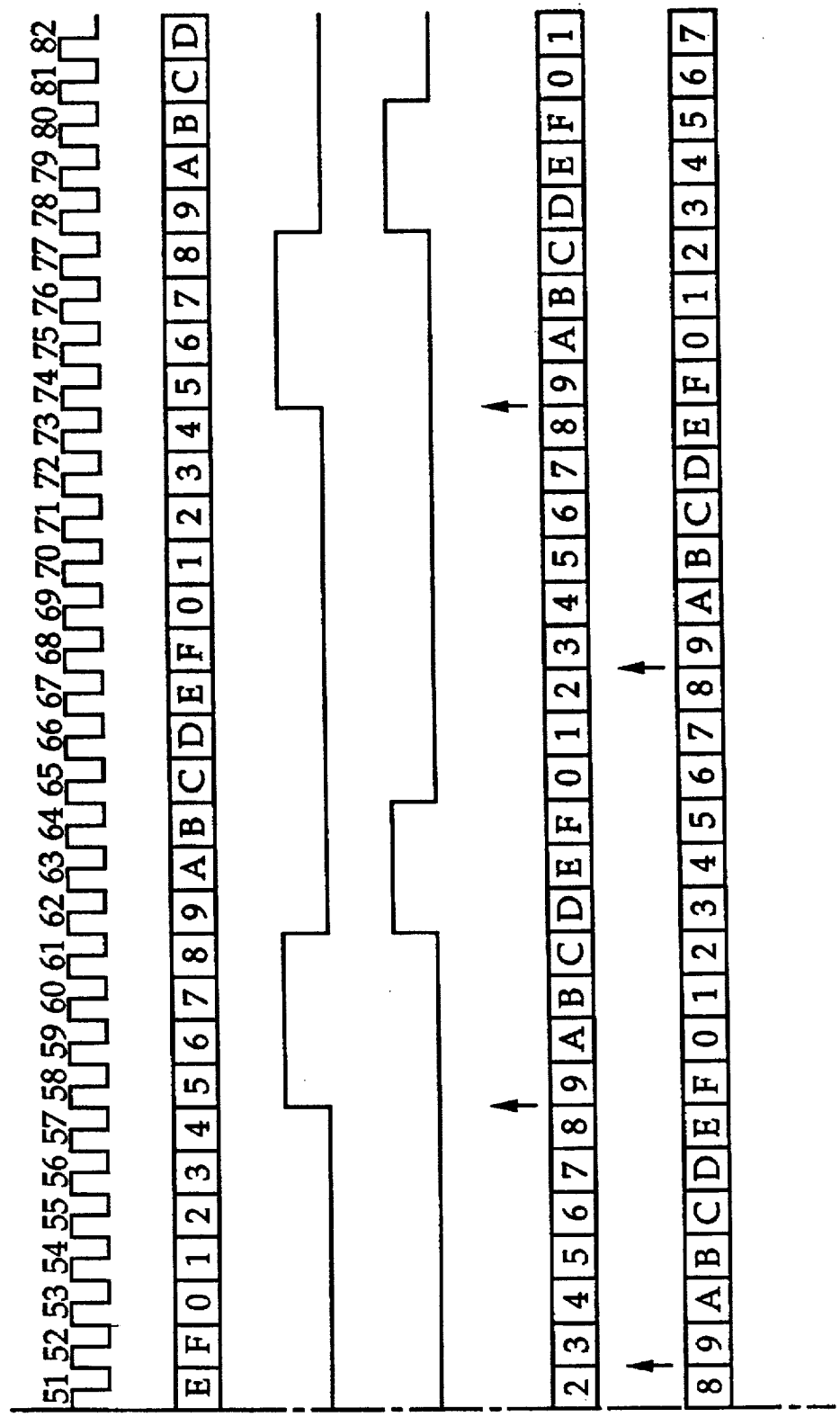
Figure 26A:
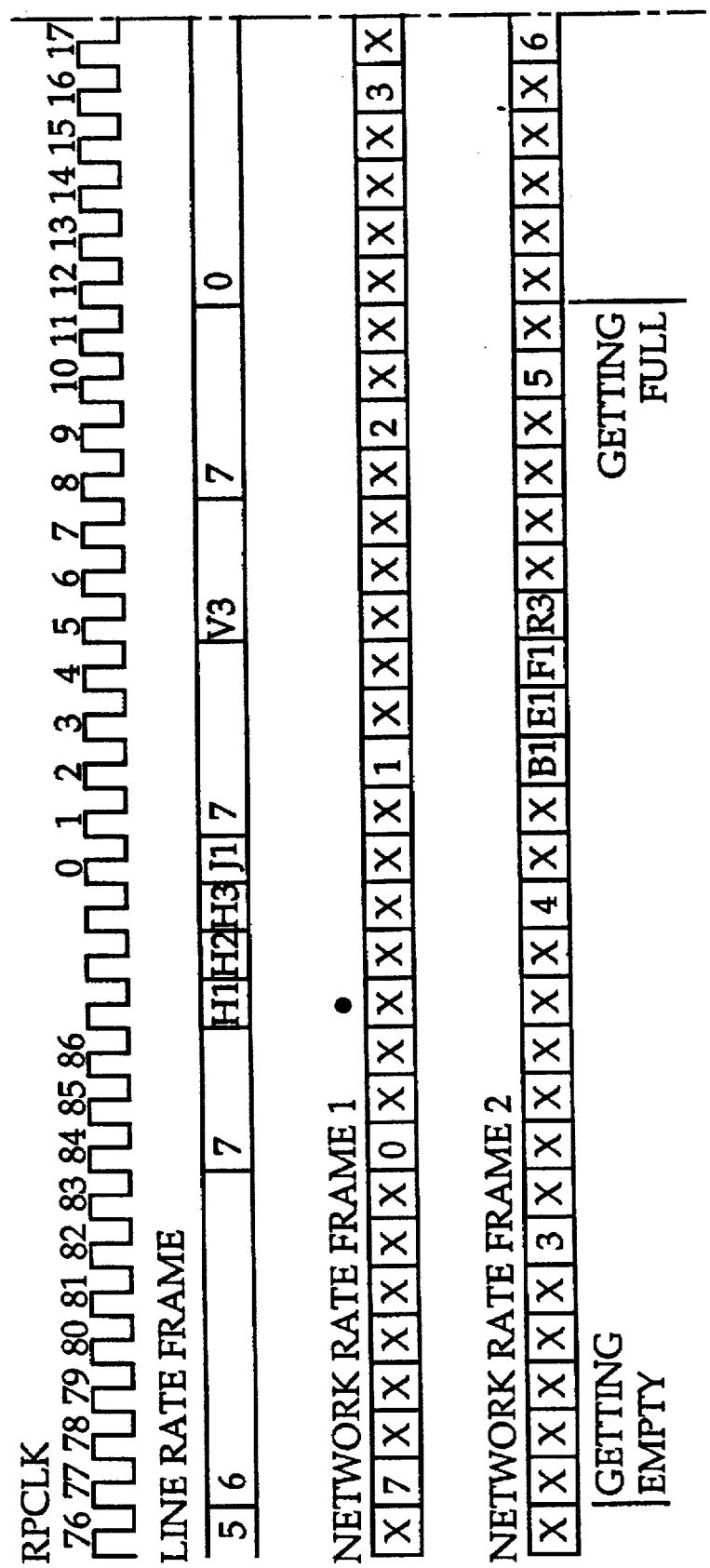
FIGS. 26a, 26b, and 26c when viewed together in the orientation indicate by FIG. 26, show VT elastic store monitor timing for VT6, according to the present invention.
Figure 26B:
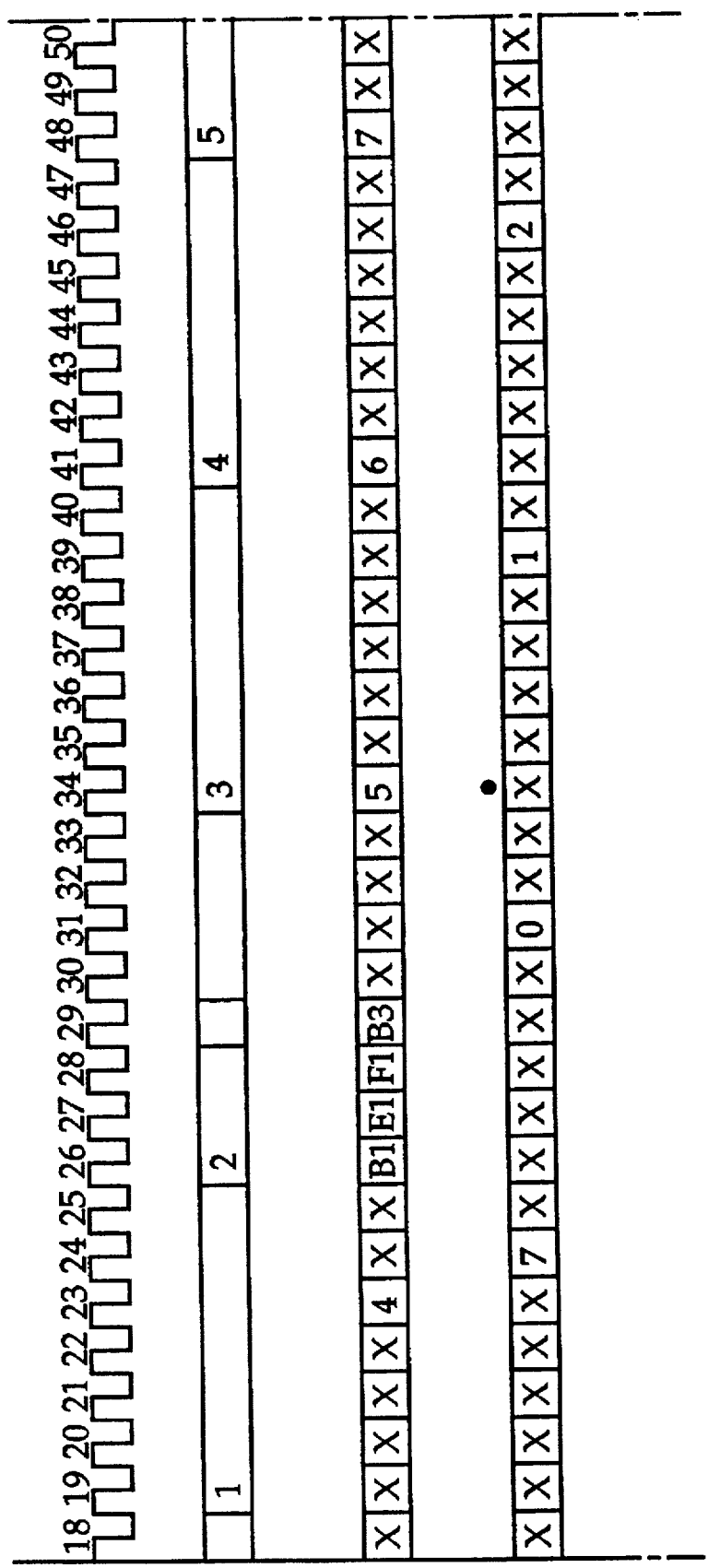
Figure 26C:
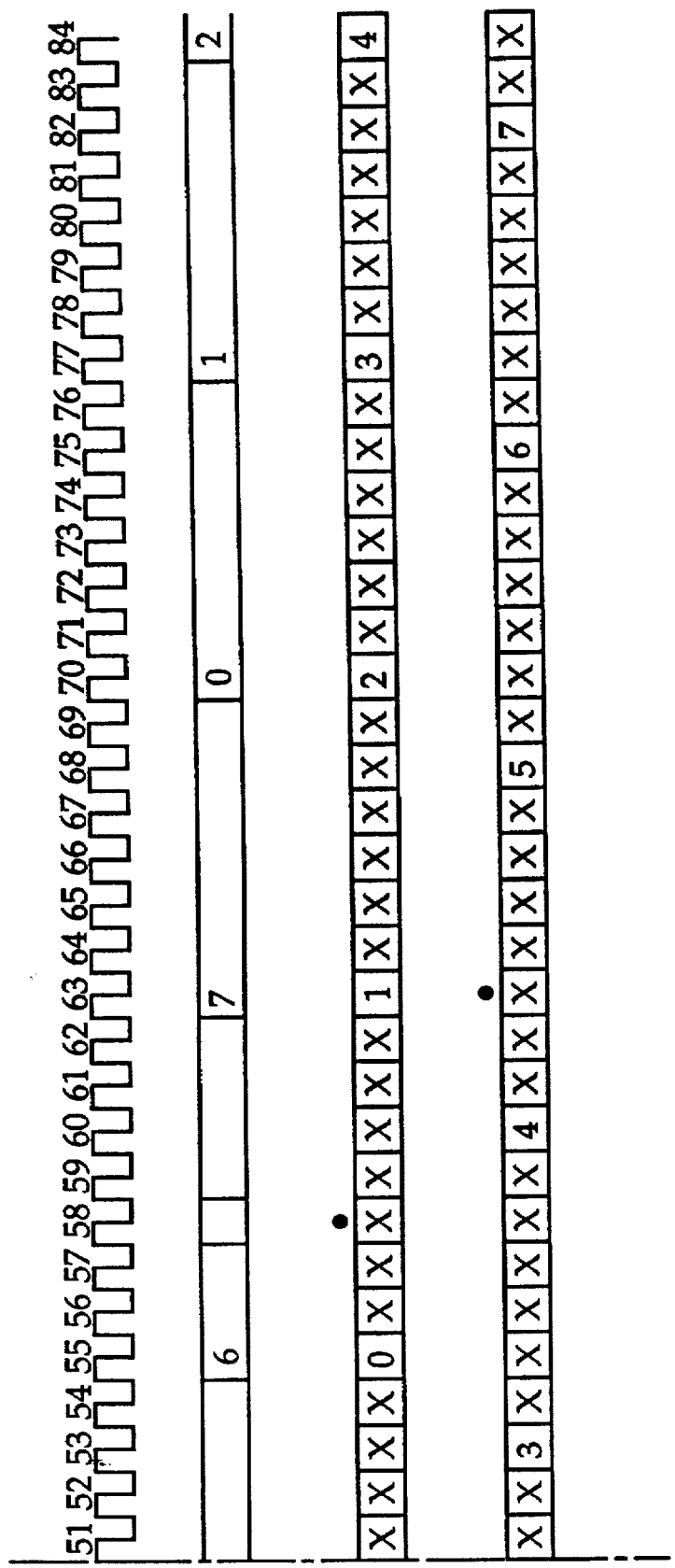

STS elastic store monitor timing is shown in FIGS. 25a and VT elastic store monitor timing for, for example, a VT6 is shown in FIG. 26a–26c.

Twenty-eight VT write counter addresses are multiplexed with the tributary addresses at the read side to output one write address at a time. In the VT pointer processing mode this address is subtracted 502 from the read side address and the result is filtered 504 to detect near-full and near-empty conditions of the buffer.

Referring now to FIG. 27, the receive STS1 interface timing block 146 of FIG. 4D is shown in detail. The synchronization into the internal network element rate (STS1 interface SONET frame) and the generation of the STS payload pointers are performed in this block 146.

A four-bit counter 1000 (Divide by 16 STS ELASTIC STORE READ COUNTER) that is enabled during payload locations is used to generate a 4 bit STS elastic store read address on a PLRDAD signal line 1002. This is used as the 4 least significant bits of the read address on line 10, the four most significant bits being "1110" as shown in FIG. 4C. The eight-bit VTDAT data signal on a line 1004 from the VT pointer generation block 4c and the J1 synchronization signal 4k from the elastic store are used to perform the STS pointer generation in the block 146 for STS pointer processing. Payload pointers will have a fixed value of 522 in VT mode in order to place the J1 STS path overhead byte after the C1 byte of the SONET frame in the VT pointer processing mode. Another fixed value could have been chosen.

The functions contained in the block 146 of FIG. 27 are as follows:

STS1** frame counting 1008,

SPE down counting 1010 for payload pointer generation,

NDF and normal NDF generation 1012 of payload pointers,

STS pointer increment and decrement insertion 1014,

STS path AIS insertion 1016,

SPE elastic store read address counting 1018, full coded H4 sequence generation 1020, B3 path BIP-8 parity generation 1022.

The frame address counter 1008 counts row and column addresses of the STS1** frame as synchronized with the global multiframe sync input (GMFSI) signal 4r (shown in FIG. 1b) which is a 2 kilohertz global multiframe sync input and is high for two frames and low for two frames. A GSYLOSS signal is also detected in this block (not shown). In addition to indicating the A1 pulse location, the 2 kilohertz global multiframe sync is used here to define the H4 multiframe timing. It resets the frame counter after it is retimed. The counter 1008 generates a payload enable signal (PLEN) on a line 1024 for STS pointer processing. In VT pointer processing mode, all the addresses related to the frame are decoded from this counter output.

The STS payload pointer value is determined using an SPE down counter 1010. It is reset with the J1 sync 4k coming from the elastic store and the value that it has reached during the H1 byte address are inserted to the outgoing STS1** frame as a payload pointer. It is enabled only during payload locations.

A frame decoder 1026 provides internal strobe signals decoded from the frame counter addresses. FCOL on a line 1028 and FROW on a line 130, provided by the frame counter 1008. The internal strobe signals are given below in Table V.

TABLE V

| A1ADR | : | row 0, column 0, |
|---|---|---|
| A2ADR | : | row 0, column 1, |
| J1ADR | : | row 0, column 3, |
| B1ADR | : | row 1, column 0, |
| H1ADR | : | row 3, column 0, |
| H2ADR | : | row 3, column 1, |
| B2ADR | : | row 4, column 0, |
| K1ADR | : | row 4, column 1, |
| K2ADR | : | row 4, column 2, |
| H4ADR | : | row 5, column 3, |
| VTPEN | : | column 4–31, column 33–60, column 62–89, |
| NVBYTE | : | column 4–31 for VT1.5, column 4–24 for VT2, column 4–17 for VT3, and column 4–10 for VT6 indicated by VTSIZE inputs. |
| NVPL1 | : | column 33–60 for VT1.5, column 25–31 and 33–46 for VT2, column 18–31 for VT31 and column 11–17 for VT6 indicated by VTSIZE inputs. |

As for the STS pointers generated by the frame decoder 1026, the following list summarizes the rules governing their generation.

Figure 28:
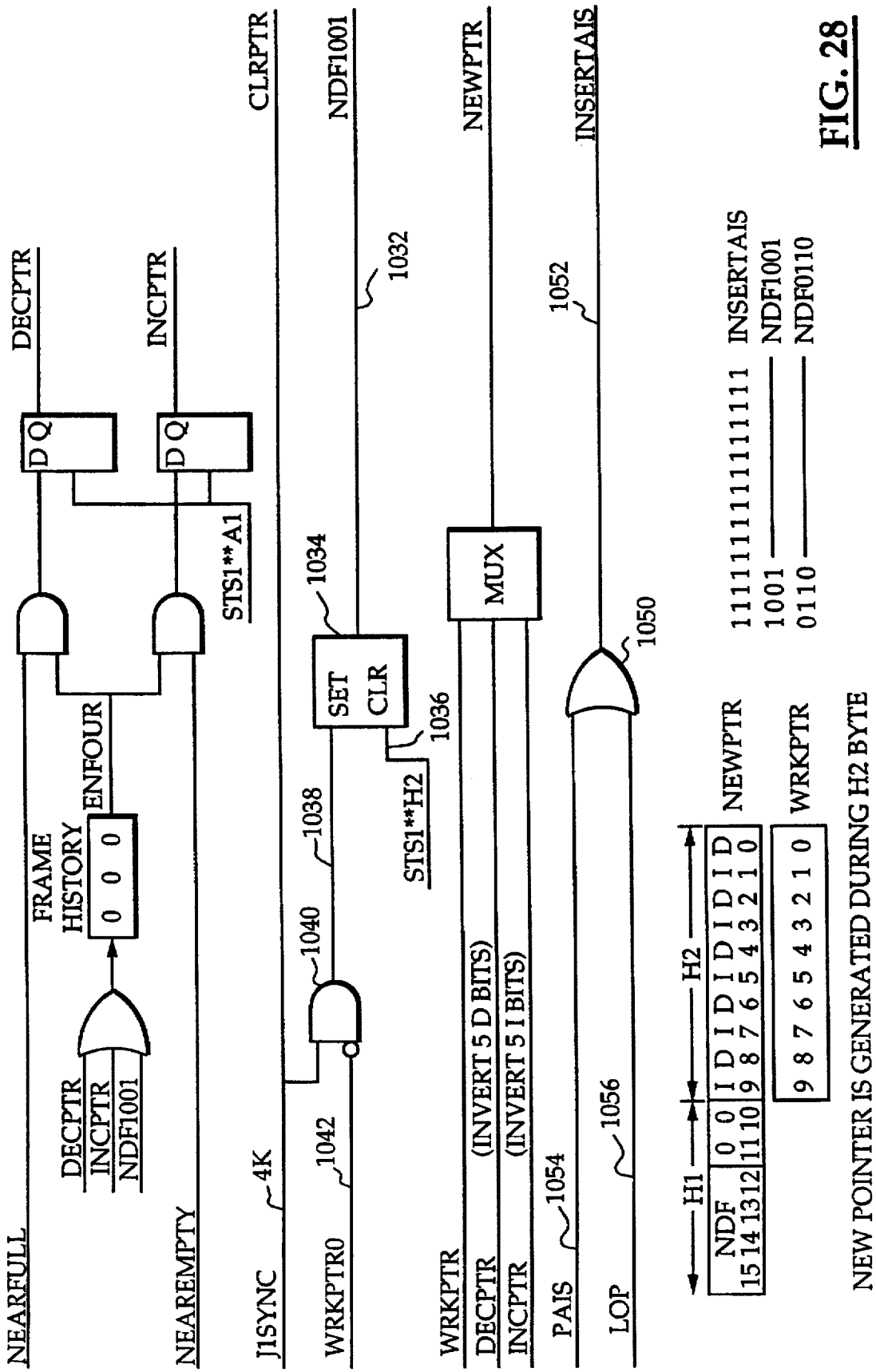
FIG. 28 shows the STS pointer generation algorithm, according to the present invention.

1. During normal operation, the pointer locates the start of the STS SPE within the STS envelope capacity. The NDF generation block 1012 output signal on a line 1032 has a normal value "0110". This signal is shown in FIG. 28 as being provided by an SC flip-flop 1034 responsive to an STS1** H2 address signal on a line 1036 and a signal on a line 1038 provided by a gate 1040. The J1 SYNC signal on the line 4k from the elastic store and a WRKPTRO signal on a line 1042 from DIV 783 DOWN COUNTER 1010 are provided to the gate 1040 for providing activation of NDF active signal on the line 1038 for the purpose of output of an active new data flag if payload counter is resynchronized. Thus, NDF is set when an unexpected J1 sync is received. The new pointer (NEWPTR) value on a line 1044 in FIG. 27 is inserted in the H1 and H2 time slot by the STS mode multiplexer for the purpose of providing the outgoing pointer value with adjustment as required.

2. The current pointer value as represented by the signal WRKPTR can only be changed by operations 4, 5, or 6 below.

3. The device of the present invention always generates STS-1 pointers. It does not generate a concatination indication.

4. If a positive stuff is required, the current pointer value is sent with the I-bits inverted and the subsequent positive stuff opportunity is filled with dummy information. Subsequent pointers contain the previous pointer value incremented by one. No increment or decrement operation is allowed for three frames following this operation.

5. If a negative stuff is required, the current pointer value is sent with the D-bits inverted and the subsequent negative stuff opportunity is overwritten with an SPE byte. Subsequent pointers contain the previous pointer value decremented by one. No increment or decrement operation is allowed for three frames following this operation.

6. If the alignment of the envelope changes for any reason other than rules 4 or 5 above, the new pointer value is sent accompanied by the NDF set to "1001". The set NDF only appears in the first frame that contains the new value. The new envelope begins at the first occurrence of the offset indicated by the new pointer. No subsequent increment or decrement operation is allowed for three frames following this operation.

Thus, the STS pointer increment and decrement decision is given related to the near-full and near-empty signals coming from the elastic store monitor block. It generates an additional enable or disable signal for the SPE down counter.

An STS path alarm indication signal (AIS) 1052 is inserted when a receiver failure occurs, or an STS path AIS 1054 or an STSLOP 1056 condition is detected in the receive STS-1 timing block 146. An STS path AIS can also be inserted under software control (for CCITT mode) when a loss of multiframe is detected in the receive VT timing block 476. The receiver failure condition is received from the STS3R2 device. STS path AIS will be active until the failure condition ceases. If the device of FIG. 4A–D is provisioned in VT pointer processing mode, the H1, H2 and H3 bytes will be excluded from the path AIS insertion (VT path AIS for all VTs).

The STS path AIS or VT path AIS for all VTs of the outgoing STS1** frame is inserted in an AIS insertion control block 1016 in FIG. 27 and as shown also in FIG. 28 by an OR gate 1050 providing an INSERTAIS signal on a line 1052 in response to a PAIS signal on a line 1054 or an LOP signal on a line 1056. Thus, the path AIS or VT path AIS is inserted depending on the input signal AISGEN coming from the STS3R2 IC related to the facility input failures, STSLOP, STS path AIS, and loss of multiframe detected in the device of FIG. 4A–D, and software enable mechanism.

FIG. 29 shows the path AIS insertion in the VT pointer processing mode and FIG. 30 in the STS pointer processing mode. Here, the numeral "1" is used to show all ones in a SONET frame byte.

Two counters are used in the H4 GENERATION COUNTER block 1020 to generate a full coded H4 byte on a line 1060 in FIG. 27. A five bit counter is used to generate a 3 millisecond H4 multiframe and a three bit counter is used to generate a four millisecond multiframe (European standard) sequence address at a time.

B3 path BIP-8 parity also calculated in the block 1022 to generate the B3* byte. The B3*STS path overhead byte is inserted only in VT pointer processing mode.

Referring now to the VT pointer generation block 476 of FIG. 4D, the block 476 generates 28 VT pointer values for VT 1.5 payload; 21 VT pointer values for VT 2 payload; 14 VT pointer values for VT 3 payload; and 7 VT pointer values for VT 6 payload. Different size VT groups cannot be processed in the same STS-1 payload and the size information which is provisioned by software overrides. The VT pointer generation block is shown in more detail in FIG. 31a. The functions contained in this block are:

Tributary counter 1200,

VT payload down counter 1202 for VT pointer generation,

NDF and normal NDF generation 1204 of payload pointers,

VT pointer increments and decrements insertion 1204,

VT path AIS insertion and VT size information insertion 1206,

VT elastic store read address counter 1207,

V1, V2, V3, V4 address decoding 1210,

VT BIP-2 error detection 1211.

VT pointer processing is done individually for each VT. Instead of repeating the same circuit 28 times, one circuit is implemented and states related to each tributary are stored in a VT location as shown.

The 2 kHz global multiframe sync is used to reset the tributary counter and it is enabled only during VT locations. The counter output is also used to address the RAM as shown.

The VT payload down counter is reset with the V5 sync 4k coming from the elastic store. The value that it has reached during V2 byte address is inserted to the outgoing STS1** frame. It is enabled only during VT payload locations.

Figure 32:
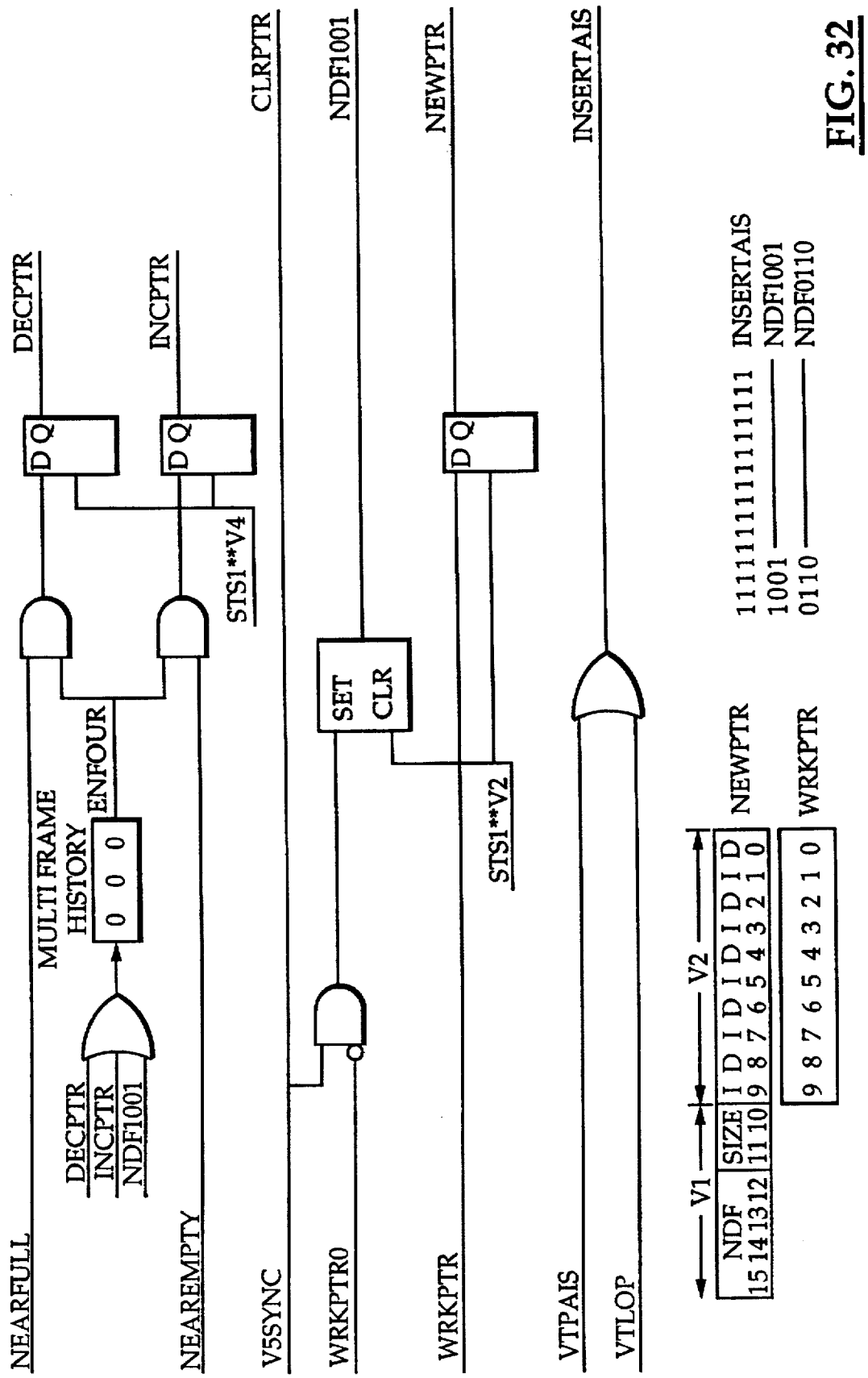
FIG. 32 shows a VT pointer generation algorithm, according to the present invention.

NDF is set as shown in FIG. 32 when an unexpected V5 sync is received. The new pointer value is inserted.

VT pointer increment and decrement decisions in block 1204 are given related to the near-full and near-empty signals coming from the VT elastic store monitor block 3d. It generates an additional enable or disable signal for the VT down counter 1202.

A VT path AIS is inserted for any VT when a VT path AIS or a LOP condition is detected in the VT pointer detection block.

VT size information provisioned by software is inserted into the size field of the V1 bytes of all tributaries.

VT elastic store read addresses are generated independently for each VT during its particular time slot as three bits.

V1, V2, V3, V4 addresses are generated by the V1–V4 DECODE block 1210 using the row zero signal and the two-bit H4 multiframe indication on line 1062 received from the receive STS1** interface timing block 146.

BIP-2 is calculated on a VT multiframe for every VT. The result is compared with the received VT5 byte BIP-2 bits and errors are inserted into the V4 bite per VT.

Referring back to FIG. 4B & 4D, two RAM blocks 302, 1300 are used to store VT pointer processing registers. The payload pointer interpretation 2e and payload pointer generation 4b functions have their own RAM blocks which are configured as 28 address locations. The last four locations are not used. The total number of states which will be stored for every VT will not be more than 38 bits.

The generation of the VT payload pointers is performed in the blocks shown in FIG. 31 along with the RAM 1300 of FIG. 4 which will be configured as 32*38.

Figure 35:
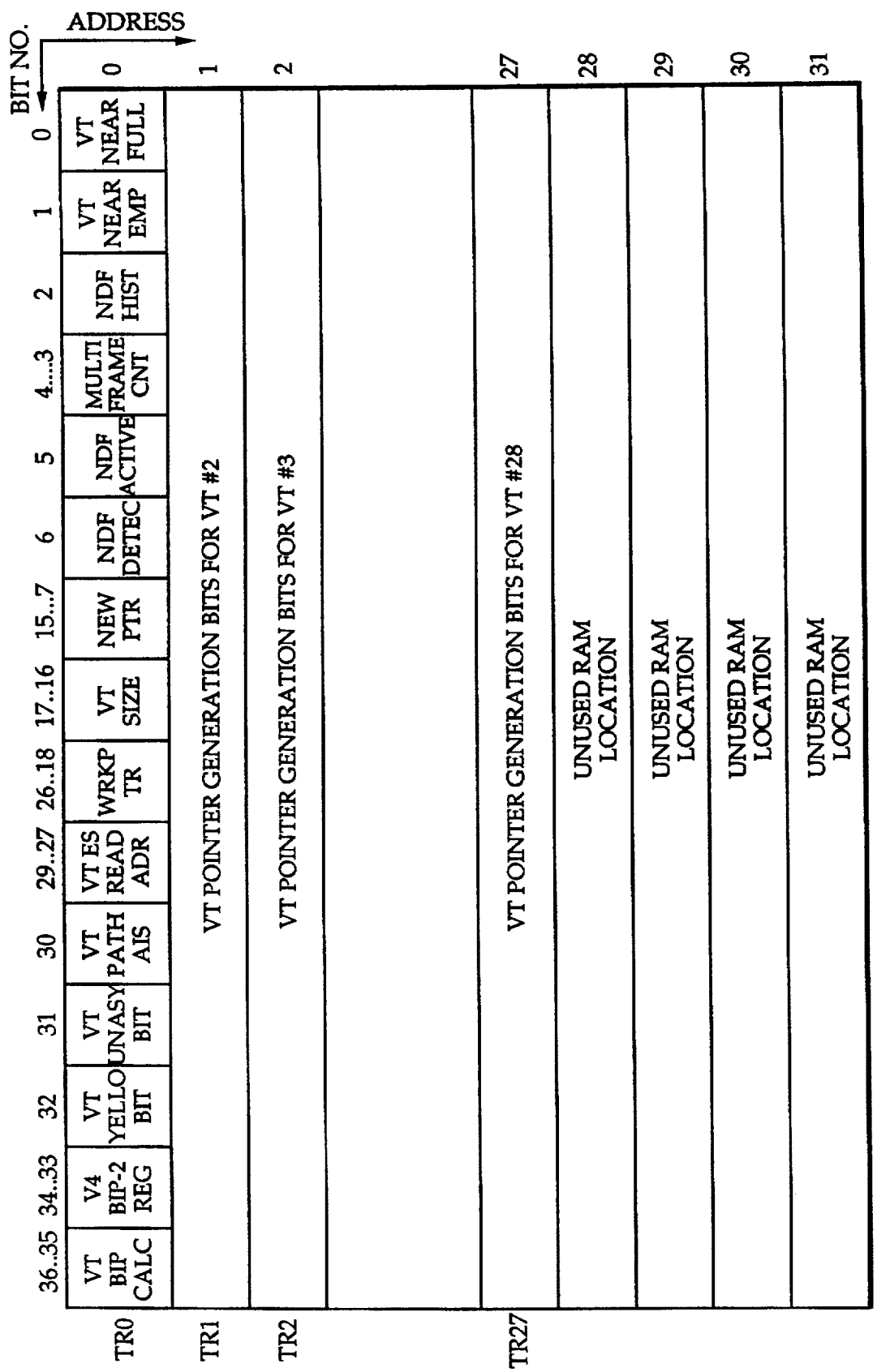
FIG. 35 shows VT pointer generation RAM utilization, according to the present invention.

The VT pointer generation circuit of FIG. 31 will thus be shared by all the tributaries in the payload up to 28. Each RAM location will store the states of the VT pointer generation circuit for a VT. The content of the RAM is shown in FIG. 35. The RAM content will be read first and processed and written back two clocks later while the other tributary states are being read.

The V1, V2, V3 and V4 VT pointer byte locations are decoded in the block 1210 using the H4 byte bits 1-0 and the ROW zero signal coming from RX STS1** timing block 146.

The five bit programmable tributary counter 1200 is used to generate the tributary addresses on a TRADR signal line 1302 which will be used as dual port RAM read and write addresses. The counter counts up to 28 for VT 1.5, 21 for VT 2, 14 for VT 3, and 7 for VT 6 as indicated by VT SIZE signal information provisioned by software on a line 1304.

The same rules of the STS pointer generation applies to the generation of VT pointers within the following modifications:

1. During normal operation, the pointer locates the start of the VT SPE within the VT envelope capacity. The NDF has the normal value "0110".

2. The device of FIG. 4A–D always generates VT pointers if it is provisioned to be in the VT pointer processing mode. It does not generate the concatination indicator.

3. The device of FIG. 4A–D always inserts VT size information provisioned by software.

4. An STS PTE constructs a VT path AIS by placing an all ones code in the entire VT, including the V1 through V4 bytes. On entering a failure state, a line AIS state, or an STS path AIS state, VT path AIS is generated by the STS PTE within 500 microseconds. VT path AIS is also initiated, at which point the VT PTE enters a VT path AIS state or VT loss of pointer state.

Deactivation of an outgoing VT path AIS occurs within 500 microseconds of the network element exiting the failure state, line AIS state, or STS path AIS state that causes the VT path AIS to be sent downstream. At VT path AIS deactivation, the VT pointer processor shall construct a valid pointer with valid VT size and NDF set to "1001", followed by normal pointer operations.

FIG. 32 shows the VT pointer generation algorithm and FIGS. 33 and 34 show its timing diagram. The functions are distributed into the down counter block 1202, the pointer adjust decision block 1204, the new pointer register block 1208 and VT NDF generation block 1204 in FIG. 31.

The STS1** overhead bytes K1*, K2*, A1*, A2*, B1*, and B2* are inserted in an STS1** overhead insertion and retiming block 1310.

K1* and K2* are received from the microcontroller interface. The K1* byte is overwritten with all ones if an UPFAIL input which indicates the time-out of a watchdog timer goes active high.

The detected STS path FEBEs are received in this block and inserted in the B1, overhead byte.

B2 is calculated on all of the STS1** frame, excluding section overhead bytes, as odd parity and inserted to its location.

The software can enable an AIS mechanism in this block which will insert all ones into every byte of the frame excluding A1, A2, C1, K1 and K2. The B2 byte is overwritten after it is calculated on the data which will be input from the device of FIG. 4. This AIS mechanism is built for the equipment loop case. The STS1** data is retimed to meet the timing requirements on this bus.

Figure 36:
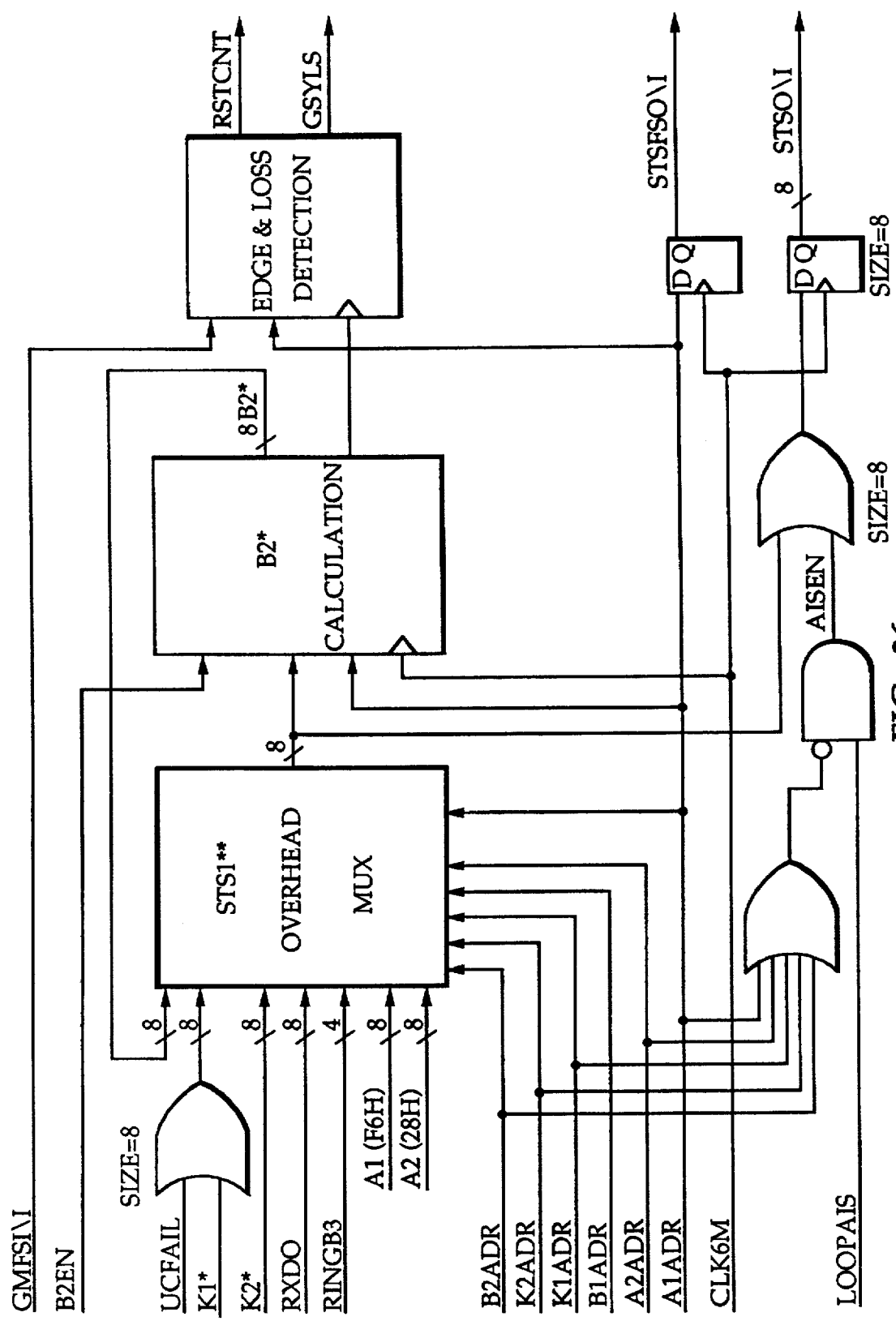
FIG. 36 shows STS1** overhead insertion and retiming, according to the present invention.

As shown in FIG. 36, the received STS1 data is processed for equipment protection and section, line and path overhead insertion. An STS1 overhead mux is controlled by a software equipment protection algorithm to choose between the received A and B sides. This algorithm uses the filtered K1* and K2* bytes and the B2* calculation is performed on both sides. The figure shows the STS1** selection with three different synchronization sources.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A synchronous optical network line interface (2), comprising:

a synchronous transport signal pointer interpreter (2e), responsive to an incoming signal (5) and to a line clock signal (6), for providing a first elastic store write address signal (2d), a virtual tributary number signal (2i) indicative of a virtual tributary count in a frame of the incoming signal, and a synchronous payload envelope synchronizing signal (2k);

a virtual tributary pointer interpreter (2j), responsive to the incoming signal (5) and responsive to said synchronous payload envelope synchronizing signal (2k), for providing a plurality of elastic store write address signals (2h) and a corresponding plurality of virtual tributary synchronizing signals (2mp);

an elastic store write address multiplexer (2g), responsive to said elastic store write address signals (2h) and to said virtual tributary number signal (2i), for providing a selected one (2f) of said elastic store write address signals (2h) as a second write address signal;

an elastic store write address multiplexer (2c), responsive to said first elastic store write address signal (2d) and to said second write address signal and responsive to a selected interface mode signal (2n) indicative of synchronous payload envelope or virtual tributary interface mode, for providing a multiplexed write address signal (9);

a virtual tributary synchronizing signal multiplexer (2mn), responsive to said virtual tributary synchronizing signals (2mp) and to said virtual tributary number signal (2i), for providing a selected virtual tributary synchronizing signal (2m); and a synchronizing signal multiplexer (2b), responsive to said selected interface mode signal (2n), said selected virtual tributary synchronizing signal (2m) and said synchronous payload envelope synchronizing signal (2k), for providing a synchronizing signal (2a) to an elastic store (3) for synchronizing the multiplexed write address signal (9) with the incoming signal (5).

2. A synchronous optical network local interface (4) responsive to an input data signal (4a) from an elastic store (3), comprising:

a synchronous transport signal pointer generator (4b), responsive to a local clock signal (8) having a local clock rate, an output synchronizing signal (4k) from the elastic store (3), a mode signal (2n) indicative of a selected synchronous payload envelope or virtual tributary mode, an elastic store near full signal (3c) from a first elastic store monitor (3a), and an elastic store near empty signal (3b) from the first elastic store monitor, for providing a first elastic store read address signal (4e), a virtual tributary number signal (4j) indicative of a virtual tributary count in a frame of the input data signal (4a) and a payload envelope pointer signal (4m);

a virtual tributary pointer generator (4c), responsive to said output synchronizing signal (4k), a first plurality of virtual tributary near full signals (3f) from a second elastic store monitor (3d) and a corresponding first plurality of near empty signals (3e) from the second elastic store monitor (3d), for providing a first plurality of read address signals (4h) and a first plurality of pointer signals (4np);

a virtual tributary pointer multiplexer (4nq), responsive to said pointer signals (4np) and to said virtual tributary number signal (4j), for providing a selected virtual tributary pointer signal (4n);

a read address multiplexer (4g), responsive to said first plurality of read address signals (4h) and to said virtual tributary number signal (4j), for providing a second elastic store read address signal (4f);

a read address multiplexer (4d), responsive to said mode signal (2n), said first elastic store read address signal (4e) and said second elastic store read address signal (4f), for providing a multiplexed elastic store read address signal (10) for reading said input data signal (4a) from the elastic store (3); and an output multiplexer (4p), responsive to said payload envelope pointer signal (4m), said selected virtual tributary pointer signal (4n) and said data output signal (4a) from the elastic store, for providing a multiplexed data output signal (7).

3. A receive device (1) for a synchronous optical network, comprising:

a receive line interface (2), responsive to a recovered line clock signal (6), and to a data input signal (5), for providing an elastic store write address signal (9), and for providing an elastic store synchronizing signal (2a);

an elastic store (3), responsive to said elastic store write address signal (9), said data input signal (5), said elastic store synchronization signal (2a) and an elastic store read address signal (10), for providing a data output signal (4a) having a local clock signal rate and for providing a pointer generator synchronizing signal (4k) having said local clock signal rate;

a first elastic store monitor (3a), responsive to a local clock signal (8), said elastic store write address signal (9) and said elastic store read address signal (10), for providing an elastic store near full signal (3c) and an elastic store near empty signal (3b); and a receive local interface (4), responsive to said local clock signal, said pointer generator synchronizing signal (4k), said data output signal (4a), said elastic store near full signal (3c) and said elastic store near empty signal (3b), for providing a multiplexed data output signal (7) timed to said local clock signal; and wherein said receive line interface (2) further comprises:

a synchronous transport signal pointer interpreter (2e), responsive to said data input signal (5) and to said recovered line clock signal (6), for providing a first elastic store write address signal (2d), a virtual tributary number signal (2i) indicative of a virtual tributary count in a frame of the data input signal (5) and a synchronous payload envelope synchronizing signal (2k);

a virtual tributary pointer interpreter (2j), responsive to said data input signal (5) and to said synchronous payload envelope synchronizing signal (2k), for providing a plurality of elastic store write address signals (2h) and a corresponding plurality of virtual tributary synchronizing signals (2mp);

a virtual tributary synchronizing signal multiplexer (2mn), responsive to said plurality of virtual tributary synchronizing signals (2mp) and to said virtual tributary number signal (2i), for providing a selected virtual tributary synchronizing signal (2m);

a write address multiplexer (2g), responsive to said plurality of elastic store write address signals (2h) and responsive to said virtual tributary number signal (2i), for providing a selected one (2f) of said plurality of elastic store write address signals (2h);

a write address multiplexer (2c), responsive to said first elastic store write address signal (2d) and to said selected one (2f) of said plurality of elastic store write address signals (2h) and responsive to a selected interface mode signal (2n) indicative of a selected synchronous payload envelope or virtual tributary interface mode, for providing said elastic store write address signal (9) to said elastic store (3); and a synchronizing signal multiplexer (2b), responsive to said selected interface mode signal (2n), said selected virtual tributary synchronizing signal (2m) and said synchronous payload envelope synchronizing signal (2k), for providing said elastic store synchronizing signal (2a); and wherein said receive local interface (4) further comprises:

a synchronous transport signal pointer generator (4b), responsive to said local clock signal (8), said pointer generator synchronizing signal (4k), said selected interface mode signal (2n), said elastic store near full signal (3c), and said elastic store near empty signal (3b), for providing a first elastic store read address signal (4e), a second virtual tributary number signal (4j) indicative of a virtual tributary count in a frame of the data input signal (5) and a payload envelope pointer signal (4m);

a virtual tributary pointer generator (4c), responsive to said pointer generator synchronizing signal (4k), a first plurality of virtual tributary near full signals (3f), and a first plurality of virtual tributary near empty signals (3e), for providing a first plurality of read address signals (4h) and a first plurality of pointer signals (4np);

a virtual tributary pointer multiplexer (4nq), responsive to said first plurality of pointer signals (4np) and to said second virtual tributary number signal (4j), for providing a selected virtual tributary pointer signal (4n);

a read address multiplexer (4g), responsive to said first plurality of read address signals (4h) and to said second virtual tributary number signal (4j), for providing a second elastic store read address signal (4f);

a read address multiplexer (4d), responsive to said selected interface mode signal (2n), said first elastic store read address signal (4e) and said second elastic store read address signal (4f), for providing said elastic store read address signal (10) for reading said data output signal (4a) from said elastic store (3); and an output multiplexer (4p), responsive to said payload envelope pointer signal (4m), said selected virtual tributary pointer signal (4n) and said data output signal (4a), for providing said multiplexed data output signal (7); and wherein said receive device (1) further comprises:

a second elastic store monitor (3d), responsive to said local clock signal (8), said plurality of elastic store write address signals (2h) and said first plurality of read address signals (4h), for providing said first plurality of virtual tributary near full signals (3f) and said first plurality of virtual tributary near empty signals (3e).

\* \* \* \* \*